United States Patent [19]
Sweet et al.

[11] Patent Number: 5,163,085
[45] Date of Patent: Nov. 10, 1992

[54] DIGITAL DICTATION SYSTEM WITH VOICE MAIL CAPABILITY

[76] Inventors: Alan F. Sweet, 130 Barrows St., Stratford, Conn. 06497; Albert J. Gobel, Jr., 254 Main St. #21, West Haven, Conn. 06516; Mark N. Vogel, 42 Hilltop Dr., Trumbull, Conn. 06611; Judith M. Eckert, 45-A Powder Mill Dr., Stratford, Conn. 06497; Emil F. Jachmann, 13 High St., Greenwich, Conn. 06830

[21] Appl. No.: 455,889

[22] Filed: Dec. 22, 1989

Related U.S. Application Data

[63] Continuation of Ser. No. 13,303, Feb. 10, 1987, abandoned.

[51] Int. Cl.⁵ .................... H04M 3/50; H04M 11/10
[52] U.S. Cl. ........................... 379/89; 379/67; 379/75
[58] Field of Search ............ 379/89, 88, 67, 94, 379/96, 75; 369/29

[56] References Cited

U.S. PATENT DOCUMENTS

| | | | |
|---|---|---|---|
| 3,403,383 | 9/1968 | Kienzle et al. | 364/200 |
| 3,728,486 | 4/1973 | Kraus | 379/69 |
| 3,816,664 | 6/1974 | Koch | 381/30 |
| 3,936,805 | 2/1976 | Bringol et al. | 364/900 |
| 4,041,249 | 2/1977 | Matz et al. | 369/24 |
| 4,130,739 | 12/1978 | Patten | 370/1 |
| 4,221,933 | 9/1980 | Cornell et al. | 379/84 |
| 4,247,910 | 1/1981 | Cornell et al. | 364/900 |
| 4,260,854 | 4/1981 | Kolodny et al. | 379/75 |
| 4,319,337 | 3/1982 | Sander et al. | 364/900 |
| 4,371,752 | 2/1983 | Matthews et al. | 379/89 |
| 4,375,083 | 2/1983 | Makemchuk | 364/900 |
| 4,392,218 | 7/1983 | Plunkett, Jr. | 379/75 X |
| 4,468,751 | 7/1984 | Plunkett, Jr. | 364/900 |
| 4,488,274 | 12/1984 | Plunkett, Jr. | 364/24 |
| 4,523,055 | 6/1985 | Hohl et al. | 379/89 |
| 4,547,880 | 10/1985 | De Vita | 370/96 |
| 4,549,047 | 10/1985 | Brian et al. | 379/88 |
| 4,573,140 | 2/1986 | Szeto | 364/900 |
| 4,574,284 | 3/1986 | Feldman | 370/79 |
| 4,580,012 | 4/1986 | Matthews et al. | 379/89 |
| 4,580,016 | 4/1986 | Williamson | 379/31 |
| 4,581,486 | 4/1986 | Matthews et al. | 379/88 |
| 4,582,959 | 4/1986 | Myslinski et al. | 379/88 |
| 4,585,906 | 4/1986 | Matthews et al. | 379/88 |
| 4,602,129 | 7/1986 | Matthews et al. | 379/88 |
| 4,621,350 | 11/1986 | Sevitsky et al. | 369/29 |
| 4,623,988 | 11/1986 | Paulson et al. | 364/900 |
| 4,627,001 | 12/1986 | Stapleford et al. | 364/513.5 |
| 4,815,121 | 3/1989 | Yoshida | 379/88 |
| 4,817,086 | 3/1989 | Oye et al. | 379/88 |
| 4,825,460 | 4/1989 | Carter et al. | 379/67 |
| 4,841,574 | 6/1989 | Pham et al. | 379/88 |
| 4,853,952 | 8/1989 | Jackmann et al. | 379/88 |

Primary Examiner—Thomas W. Brown
Attorney, Agent, or Firm—Robert H. Whisker; Melvin J. Scolnick; David E. Pitchenik

[57] ABSTRACT

A digitally implemented central dictation system wherein users designated as dictators may input Voice Files for later retrieval and transcription by a second group of users designated as transcriptionists. A system Supervisor has the capability to monitor operation of the system and allocate system resources. The system further includes an optional Voice Mail capability wherein selected dictators may input Voice Files for later retrieval by designated other dictators. The system further includes a plurality of telephone-like input/output devices used by system users for input and output of voice messages, which devices further include DTMF generators for input of command signals. Still further the system includes a Supervisory station for use by the system Supervisor in monitoring system activity and allocation of system resources, which station further includes a CRT type display and keyboard, and a printer for output of hardcopy reports by the system. The Supervisor station is also provided with a telephone-like input/output device for use by the system Supervisor. The telephone-like input out devices of the system users may be either conventional telephones which access the system through a conventional PBX or may be telephone-like devices which are directly connected to dedicated system ports.

11 Claims, 58 Drawing Sheets

FIG. 3

| | | | |
|---|---|---|---|
| 1 | 1 | PERFORMANCE MONITORING | 3-1 |
| 2 | 1 | HEADINGS | 3-2 |
| 3 | 2 | | |
| 4 | 1 | | |
| 5 | 2 | DATA | 3-3 |
| 6 | 3 | | |
| 7 | 4 | | |
| 8 | 5 | | |
| 9 | 6 | | |
| 10 | 7 | | |
| 11 | 8 | | |
| 12 | 9 | | |
| 13 | 10 | | |
| 14 | 11 | | |
| 15 | 12 | | |
| 16 | 13 | | |
| 17 | 14 | | |
| 18 | 15 | | |
| 19 | 16 | | |
| 20 | 17 | | |
| 21 | 1 | PROMPT | 3-4 |
| 22 | 1 | | |
| 23 | 2 | MENU | 3-5 |
| 24 | 3 | | |
| 25 | 1 | NOTIFICATION | 3-6 |

* IN USER SESSION OF OTHER PARTY

* IN USER SESSION OF OTHER INTERCOM PARTY

DATA FLOW DIAGRAMS:

PROCEDURE

PROCESS

PROCESS WITH
MULTIPLE ACTIVATIONS

DATA
TERMINATOR

TELEPHONE-LIKE TERMINAL

DATA STORE

DATA BASE
ACCESS ROUTINES

READ ACCESS

WRITE ACCESS OR
READ FOR UPDATE

READ ACCESS AND
WRITE ACCESS

- - - - - - - - - - - - - - ->

CONTROL FLOW FOR TRANSACTION CENTERS

INTERSESSION COMMUNICATION:

PRODUCER PROCESS            CONSUMER PROCESS

ASYNCHRONOUS COMMUNICATION — NO RESPONSE EXPECTED

PRODUCER PROCESS            CONSUMER PROCESS

SYNCHRONOUS COMMUNICATION — RESPONSE EXPECTED

COMMUNICATION INTERFACE

DIGITAL DICTATION SYSTEM WITH VOICE MAIL CAPABILITY

This application is a continuation of application Ser. No. 013,303, filed Feb. 10, 1987, now abandoned.

BACKGROUND OF THE INVENTION

The subject invention relates to a system for storage and retrieval of Voice Files. More particularly, it relates to a system having a class of users which includes dictators and transcriptionists, and wherein system resource allocation, including transcription capability, is controlled by a Supervisor.

Storage and retrieval of voice messages is well known. "Desktop" analog dictation units have been marketed by the Dictaphone Corp. of Rye, N.Y. for more than half a century. More recently, larger, "central" dictation systems for use by groups of dictators have been available. Such "central" systems typically include a plurality of telephone-like input/output stations for use by dictators, a central, analog storage medium for storage and retrieval of voice messages, a plurality of transcription stations for use by transcriptionists who are more or less permanently assigned to the system, and a Supervisor's station through which a Supervisor may monitor and, to some extent, control the operation of the system. However, because the storage medium in such system is analog, the flexibility of control in such systems is limited. Particularly, such systems lack flexibility in controlling the priorities for transcription of the voice messages, and in assigning voice messages to selected transcriptionists.

One such "central" dictation system presently available is the Nucleus system marketed by the Dictaphone Corporation. ("Nucleus" is a registered trademark of the Dictaphone Corporation.)

Digital storage and retrieval of voice messages, or of almost any analog signal, is also well known. Typically such systems have been used for Voice Mail applications as is taught in U.S. Pat. No. 4,371,752 for: Electronic Audio Communication System to: Matthews et al. issued: Feb. 1, 1983. In such systems voice messages are input by a user for later retrieval and output to other users identified on an associated address list. When such other users access the system, messages addressed to them may be retrieved and output.

Other systems for digital storage and retrieval of voice messages have also been developed and marketed. These systems are intended for the original equipment manufacture (OEM) market and provide the basic digital voice storage and retrieval functionalities, such as: analog to digital conversion, speech compression, storage and retrieval of voice message files, digital to analog conversion, and control of voice ports. Typical of such commercially available OEM digital voice storage and retrieval systems is the DSC 2000 "Voiceserver" marketed by the Digital Sound Corp. of Santa Barbara, Calif. (DSC 2000 and Voiceserver are trademarks of the Digital Sound Corporation.) This system, shown in FIG. 1, together with the operating system and voice message file handling software, also provided by DSC, provides capabilities for multi-channel, real time storage, retrieval and playback of voice messages. The DSC 2000 is intended for use by OEM suppliers in developing their own specialized systems, and has been used by DSC to develop a Voice Mail application.

Accordingly, it is an object of the subject invention to provide a system for digital storage and retrieval of Voice Files.

It is still another object of the subject invention to provide a system combining central dictation capabilities and Voice Mail capabilities.

It is another object of the subject invention to create a new dimension of Voice Mail capability which will allow the orginator of a Voice Mail Message to follow up or confirm the message with hardcopy text.

It is another object of the subject invention to create a further new Voice Mail capability which will allow the recipient of a Voice Mail Message to redistribute the message to selected other recipients in hardcopy form.

It is still another object of the subject invention to provide a system for the digital storage and retrieval of Voice Files which has increased capabilities, and flexibility and ease of use in the creation, access, editing and retrieval of Voice Files.

It is a further object of the subject invention to provide a central dictation system which incorporates existing OEM digital voice storage and retrieval systems.

It is still a further object of the subject invention to provide a central dictation system with increased flexibility of control.

More particularly, it is an object of the subject invention to provide a central dictation system having improved ability to assign priorities to Dictation Jobs awaiting transcription and to allocate transcription resources in accordance with changing requirements.

Still more particularly, it is an object of the subject invention to provide a central dictation system which allows a Supervisor increased flexibility in assigning priorities for transcription of Dictation Jobs, and in assigning Dictation Jobs to particular selected transcriptionists.

BRIEF SUMMARY OF THE INVENTION

The above objects are achieved and the disadvantages of the prior art are overcome in accordance with the subject invention by means of a system for storage and retrieval of Voice Files which includes input/output devices, which are preferably telephone-like devices, for input and output of the Voice Files, and input device for input of log-on signals and control signals, and storage and retrieval apparatus for storing the input Voice Files and for retrieving the stored Voice Files for output. The signal input device is preferably a dual tone multifrequency (DTMF) device in the telephone-like input/output devices, but it is also within the contemplation of the subject invention to use other apparatus for signal input; including, but not limited to, voice recognition apparatus. The system of the subject invention also includes a microprocessor based controller for; responding to the log-on signals to designate users of the system as dictators or as transcriptionists, controlling the storage and retrieval apparatus to store at least some of the Voice Files input by the dictators as Dictation Jobs, assigning the Dictation Jobs to selected transcriptionists in accordance with a predetermined scheduling algorithm, and responding to the log-on signals and control signals input by the transcriptionists to output the Dictation Jobs to the selected transcriptionists in accordance with the algorithm.

In another embodiment of the subject invention the system includes a microprocessor based controller for; responding to the log-on signals to designate users of the system as dictators or as transcriptionists, responding to control signals input by the dictators to designate at least some of the Voice Files as Dictation Jobs or as Voice Mail Messages, associating an address list designating others of said dictators as addressees for each of the Voice Mail Messages, controlling the storage and retrieval apparatus to store the Dictation Jobs for later retrieval and output to a selected transcriptionist, and responding to control signals input by the addressees to control the storage and retrieval apparatus to output the associated Voice Mail Messages to the addressees.

In a preferred embodiment of the subject invention the system further includes a Supervisory station through which a system Supervisor may access the system to control the allocation of resources within the system.

BRIEF DESCRIPTION OF THE DRAWINGS

FIG. 3 is a schematic illustration of windows used on the CRT screen of the Supervisory station of the subject invention.

DETAILED DESCRIPTION OF PREFERRED EMBODIMENTS

Figure 1:
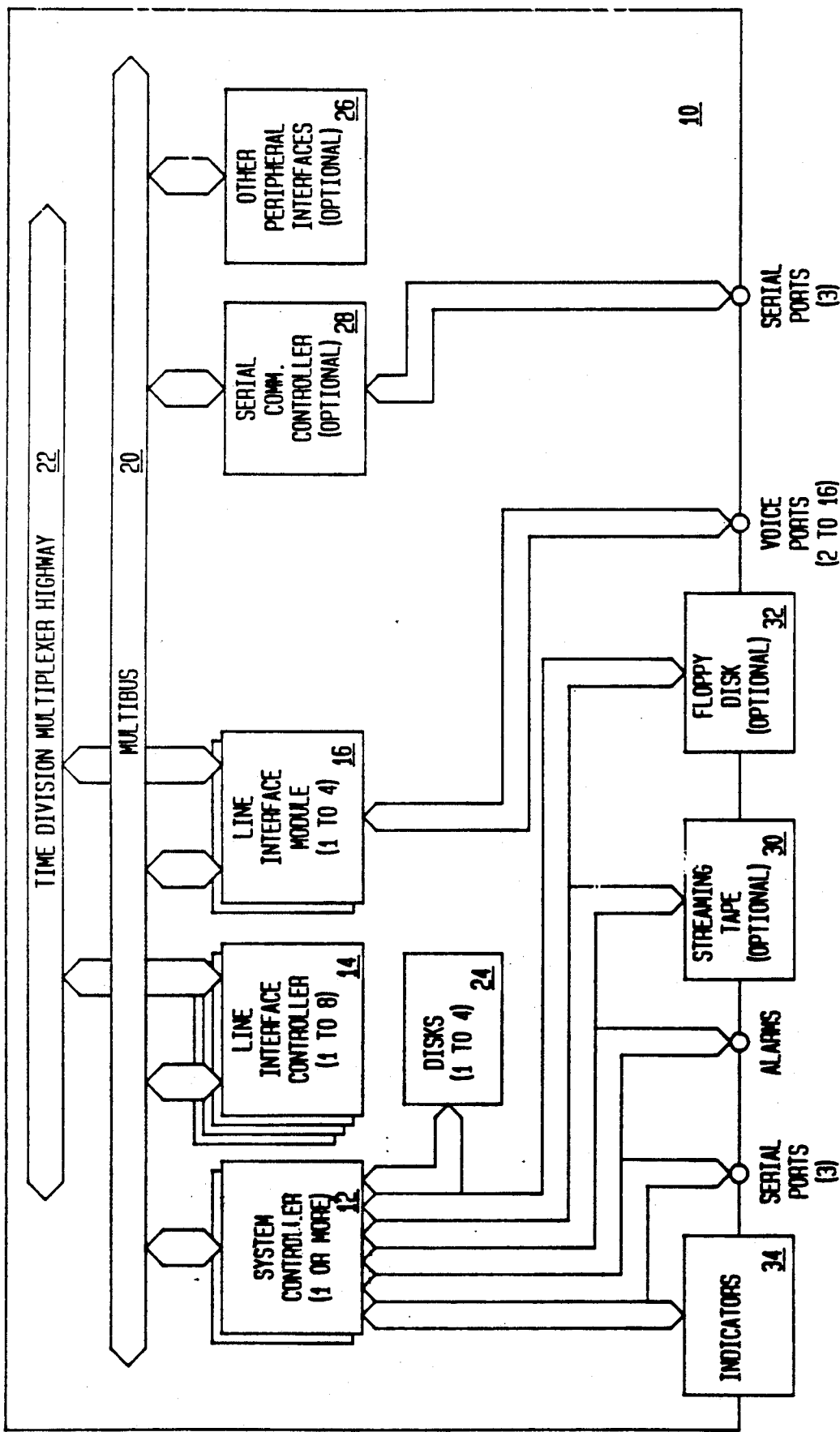
FIG. 1 is a schematic illustration of a known digital voice storage and retrieval system.

FIG. 1 shows a known, commercially available system 10 for digital storage and retrieval of Voice Files. In a preferred embodiment of the subject invention the system may comprise a DSC 2000 Voiceserver, as described above. System 10 includes a system controller 12, which is based on a 32 bit MC 68000 microprocessor including from 1 to 2 megabytes of RAM, 3 serial ports, interfaces for up to 4, 5 ¼ inch Winchester disc drives, indicators, and optional floppy disc and streaming tape drives. System controller 12 operates under real time enhanced UNIX System V and is capable of concurrent processing under UNIX. (MC 68000 is a trademark of the Motorola Corp. and UNIX is a trademark of ATT Corp.)

System 10 also includes from 1 to 8 line interface controllers 14 which compress incoming digitized voice signals, then reconstruct and playback digitized Voice Files. Controllers 14 also provide voice port management and data buffering. Line interface modules 14 interface external analog or digital voice signals to system 10 line interface controllers 14 through time division multiplex highway 22. Standard versions of line interface module 16 are available to interface with standard telephone lines and trunks. Each provides four voice ports.

System controller 12 interacts with line interface controllers 14 and line interface modules 16 through Multibus 20. (Multibus is a trademark of the Motorola Corporation and is the trade name for a well known parallel digital communications bus.) Multibus 20 also connects system controller 12 with other peripheral interfaces 26 and serial communications controller 28, which may be used to provide connection to printer 116 and Supervisory station 110, described below, in a conventional manner.

System controller 12 is interfaced to from one to four Winchester discs which comprise Voice File Storage 24. Controller 12 is further interconnected to a streaming tape which comprises Archive device 30. Optional floppy disc 32 is provided for easier uploading of software. Conventional indicators 34, such as power on, etc., are also interfaced to system controller 12.

System 10 is provided with a basic voice operating system, running under UNIX, which controls system 10 to provide the primative functions necessary for any digital voice storage and retrieval system: interface to trunk lines (or trunk-like input and output lines) analog to digital (A/D) conversion, signal processing (e.g., speech compression), storage of digitized Voice Files, retrieval of stored Voice Files, and digital to analog (D/A) conversion for output. These primitive functions allow a user of system 10 to input Voice Files and digitally store and retrieve them. Additional functionalities are provided in accordance with the subject invention to provide additional capabilities relating to such features as: addressing of Voice Mail Messages, editing, control of access to various system features, assignment of priorities for output, and Supervisory control, by means of two concurrently executing software modules hereinafter referred to as the Voice Session (VS) and the Supervisory Session (SS).

Since the basic voice operating system is in turn based on the well known UNIX operating system, the Voice Session and Supervisor Session are preferably written in an UNIX compatible language such as "C".

Figure 2:
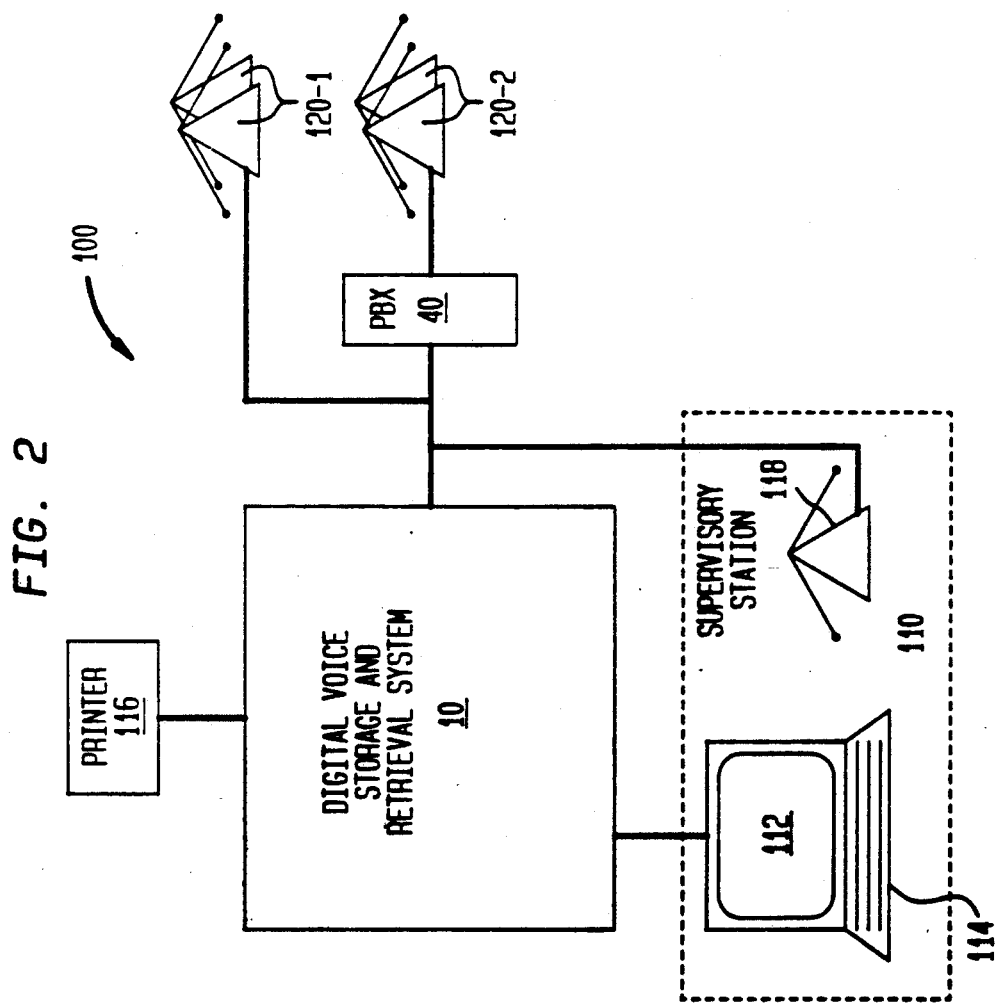
FIG. 2 is a schematic illustration of the digital dictation and Voice Mail system of the subject invention.

FIG. 2 shows a digital dictation system (DDS) 100 comprising system 10 connected to various input/output devices. The system Supervisor accesses DDS 100 through Supervisory station 110 which includes CRT 112 keyboard 114, and a telephone-like voice input/output device 118. Supervisor access is generally controlled by the SS. A conventional printer 116 is provided for generation of hardcopy reports.

System users access DDS 100 through telephone-like voice input out devices 120 which include conventional dual tone multi-frequency (DTMF) tone generators (not shown) for input of control signals. Devices 120 may include telephone-like devices 120-1 directly connected to dedicated ports of system 10 or conventional telephones 120-2 which access system 10 through a conventional PBX 40. As noted above voice signal inputs to system 10 may be either analog or digital.

Users access DDS 100 through the Voice Session, which recognizes two classes of users, dictators and transcriptionists. As will be more fully described below, dictators input Voice Files, classified as Dictation Jobs, (DJ's) which are then routed to transcriptionists for typing. Selected dictators also have the ability to input other Voice Files classified as Voice Mail Messages (VMM's) which may be retrieved by other dictators identified on an associated Address List. In a preferred embodiment a user may include a command when inputting a VMM which will cause the VMM also to be handled as a DJ.

Typically transcriptionists and the Supervisor will access DDS 100 through dedicated ports and for convenience will use devices 120 of the headset type.

Through Supervisory station 110, the system Supervisor provides control over the scheduling and routing of dictation for transcription; reporting and accounting functions; adding, modifying and deleting user's; and configuring and monitoring the system. DJ's and VMM's may be tracked using inquiries and hardcopy reports. Various selection, sorting and formatting alternatives may be used to tailor the inquiries and reports as needed. Cost allocation reports are available which provide chargeback information. Commands such as Prioritize, Finish, and Cancel may be used to alter the characteristics or progress of DJ's or VMM's. Editing functions can be used to correct data entry errors made by dictators in creating new dictation. A particularly important feature of the DDS allows the Supervisor to redefine scheduling rules to reflect current priorities and workloads.

The Supervisor may add users to the system and provide such users with various options, including the option of Voice Mail. These options may be modified by the Supervisor and users may be removed from the system. Inquiries and reports on users are available to Supervisor.

The Supervisor also has the capability to configure the system to meet local requirements. For example, voice ports may be configured to accept proprietary devices or PBX connections. The system parameters such as reserve voice capacity, cost factors, and alarm conditions may be set as needed. The Supervisor may also monitor the system performance of the DDS. Statistics including date and time, Voice File utilization, estimated turn around time, and other performance measures are available to the Supervisor.

Supervisor Session

These capabilities are provided to the Supervisor through the Supervisor Session software which implements various functions to provide the above described capabilities. These functions are classified into eight subgroups as follows:

1) Job Record Functions—Functions which allow the Supervisor to inquire for various job records, and edit and manipulate these job records.

2) Pool Functions—Pool functions provide the facilities to control job scheduling.

3) Report Processing Functions—Functions controlling reports on status and costing information.

4) Screen Processing Functions—Functions controlling screen generation at Supervisor station 110.

5) User Functions—Functions for defining each user (and the Supervisor) who has access to the DDS.

6) System Operations Functions—Functions for setting system parameters, configuring the system, and monitoring system status.

7) Miscellaneous Functions

8) Supervisory Voice Session Functions—Functions allowing the Supervisor to access a group of Voice Session functions.

When the Supervisor logs on a top level menu is presented. From this top level menu the Supervisor may select one of the sub-groups. Upon selection of a subgroup a menu displaying the functions available within that group will be displayed. (Note that preferably the Miscellaneous Functions are directly accessible from the top level menu.)

In systems where Voice Mail is available, functions relating to this option will be added to the Job Record Functions, Report Processing, and the User Functions.

JOB RECORD FUNCTIONS

The Job Record Functions display and manipulate job record information. The Job Record Functions consist of:
  Job Record Inquiry;
  Job Record Edit; and,
  Job Manipulation Functions.

Job Record Inquiry—enables the Supervisor to request display of the Job Records for DJ's or VMM's, or both. The Supervisor will have the ability to select job records for display in accordance with any attribute, or attributes, contained in the records, based on the equality or inequality of the attribute to a value, or the occurrence of the attribute within a range of values. (Note ranges are not applicable to alpha field types, e.g., dictator name).

The displayed Job Records will be displayed in accordance with sorting criteria based on a primary attribute and a secondary attribute and a sort order for each. For example, the Supervisor may request display of Job Records for department 10 having a typing length within a given range and sorted primarily by author identifier in ascending order and secondarily by subject identifier in descending order. Note that the Supervisor also specifies DJ's or VMM's or both, the default being the display of DJ Job Records. Also the Ready Job Pool Inquiry, which will be described below, is available both from Job Record Functions and Pool Functions.

Once a Job Record is displayed in response to a Job Record Inquiry all other Job Record functions are implemented by manipulation of the Job Records.

Job Record Edit—enables the Supervisor to modify selected attributes in Job Records which have been displayed in response to a Job Record Inquiry. The Supervisor may modify a single Job Record, or may use global editing commands to modify a group of Job Records. Only DJ's having a Ready, Signed-off or Finished status may be edited. (Jobs in a Ready status are ready for transcription, those in a Signed-off status have been transcribed, and those in a Finished status may be deleted from the system). VMM's can not be edited.

A Job Record Edit menu is available after a Job Record Inquiry has been invoked. The Supervisor will edit Job Records by specifying Editing Commands from the menu. These Editing Commands relate to a "marked record". When the Job Record Edit function is invoked by the Supervisor, the first record retrieved by the Job Record Inquiry function will be the "marked record". The "marked record" may be regarded as a line cursor or record cursor which can be moved about in an inquiry display. The Supervisor will have the ability to edit the single current "marked record", using a Modify Command described below. All single record modifications will affect only the "marked record" and to modify another record a new record must be marked. If the "marked record" incurs a data update in response to an event in the Voice Session, described below, while being edited the edit will not proceed and the Supervisor will be notified.

The Supervisor may also perform Job Record Edits on a group of records that are designated by the Job Record Inquiry. The group may be as small as a single record or as large as the entire group of Job Records retrieved by the inquiry. If a group edit is cancelled during a global edit command, the command will stop midway (i.e. records edited will stay edited and records not yet edited will not be edited). All global edit functions will result in a visual verification by automatic paging of the display through the Job Records retrieved by the Job Record Inquiry.

Database contention may occur while a global edit is being performed. In this event no two tasks will be allowed concurrent access to the same Job Record. If contention occurs between an update in response to an event in the Voice Session and the edit function, the update will have precedence. As updates occur some Job Records may no longer satisfy the Job Record Inquiry and will be removed from the display while others may be modified in response to Voice Session events to satisfy the Job Record Inquiry and be added to the display. If the "marked record" is updated so that it no longer satisfies the Job Record Inquiry, that record will be removed from the display if it is not currently being edited and the next record will become the "marked record". The Edit Commands available to the Supervisor include:

Mark Up—Moves the "marked record" to the previous Job Record.

Mark Down—Moves the "marked record" to the next Job Record.

Modify—Causes the DDS to display as a form the attributes of the "marked record" which may be edited. The Supervisor may modify as many attributes as desired. When the Supervisor enters a terminating key the Job Record will be updated and the original display will be restored with updated data.

Change All For Screen—Changes all occurrences of a specified value of a selected attribute to a specified new value for all records from and including the "marked record" to the last record displayed. The last record modified becomes the new "marked record", and all records will be updated on the display.

Change All For Inquiry—Changes all occurrences of a specified value of a selected attribute to a new value for all Job Records retrieved by the Job Record Inquiry. The last record modified will be the new "marked record".

Change Next—Changes the next occurrence of a specified attribute value to a new value. The system will search for the specified value from the current "marked record" to the end of the Job Records retrieved by the Job Record Inquiry. The modified Job Record, if any, will be the new marked record.

Find Next—Finds the next occurrence of a specified value for a specified attribute. The command will search from the current "marked record" to the end of the Job Records retrieved by the Job Record Inquiry. The Job Record where a match is found, if any, becomes the new "marked record".

Repeat—Repeats the last global Edit Command used. (All commands except Modify).

Job Manipulation—allows the Supervisor to manipulate Voice Files through their associated Job Records.

The Job Manipulation functions include:

External Job Entry—Enables the Supervisor to enter and track a Job Record for a job recorded on an external media (e.g. cassette tapes). Once entered the Job Records for External Jobs may be edited as described above, except the job ID may not be Modified.

Sign-Off—DJ's are signed off by a transcriptionist after they have been transcribed. External Jobs are Signed-off by the Supervisor.

(Note that jobs which have been Signed-off are retained for other purposes such as review, but when Voice File capacity falls below a preset limit the oldest Signed-off DJ's will be Finished until sufficient capacity is restored. Preferably a log message will be printed for the Supervisor.)

Dictation Finish—DJ's are Finished when the Voice File is no longer needed. The Supervisor may indicate, by work type, that some DJ's are to be Finished automatically at Signed-off. Other DJ's will be Finished by the Supervisor when the Supervisor determines that the Voice File is no longer needed.

Job Cancel—A DJ which is ready or a VMM may be cancelled by the Supervisor.

Prioritization—The Supervisor may assign priority levels to a ready DJ. (Priority levels and their interaction with Pools will be described further below.)

Job Record Archive—Allows the Supervisor to change the status of Job Records with a Finished or Cancel status to an Archive status and move these jobs to an external medium. VMM's which have been discarded will also be Archived.

Special Assignment—Allows the Supervisor to access Pool functions to assign a particular DJ or DJ's to a particular transcriber by defining a Pool with appropriate characteristics and placing that Pool first in the particular transcriptionist's Pool Assignment List.

A Job Manipulation menu is available after a Job Record Inquiry has been invoked. A Job Manipulation function is performed by marking a selection from the menu. The job to be manipulated is the "marked record" and is selected using the same global search functions as described in the Job Record Edit functions. DJ's and VMM's, which are manipulated, will be displayed for verification by the Supervisor.

POOLS FUNCTIONS

The Supervisor controls the scheduling and assignment of DJ's through a mechanism referred to herein as Pools. When a dictator finishes dictating the Job Record for the Voice File containing the dictation is placed in a Ready Job Pool. DJ's are assigned to various Pools from the ready Job Pool in accordance with attributes specified by the Supervisor for each Pool. A DJ may be assigned to more than one Pool and the DJ remains in the Ready Job Pool until it is given Pending status in one of its assigned Pools by the Supervisor Session. There is a single job with Pending status for each Pool. When the Pending job in a given Pool is attached to a particular transcriptionist the Supervisor Session gives Pending status in that Pool to the next DJ in the Ready Job Pool which meets the specified attributes for that Pool. If more than one DJ meets the requirements, the DJ having the highest priority will be made the Pending job in that Pool. At a particular priority level, DJ's are assigned Pending status on a first-in first-out basis.

Transcriptionists are assigned to one or more Pools by the Supervisor. When a transcriptionist Signs-on the Supervisor Session checks the Pools to which the transcriptionists is assigned in assignment order, and attaches, through the Voice Session, the Pending DJ in the first non-empty Pool. When a transcriptionist Signs-off, i.e. completes transcribing a DJ, the Sign-on function will, in general, be invoked again automatically to attach the next DJ.

Note that since DJ's remain in the Ready Job Pool until given Pending status, if a Pool definition is changed by the Supervisor, all future assignments will be made in accordance with the new Pool definition.

Pending DJ's will remain Pending, though they may no longer fit the definition of their Pools.

The following Pool functions are available to the Supervisor:

Pool Definition—allows the Supervisor to specify criteria to be used to divide DJ's into categories for assignment for transcription. The Supervisor specifies criteria based on a single attribute of a job to define a Pool. The criteria may be based on the attribute being equal not equal to a selected value, or within a given range of values. Pool definitions may be added, modified or deleted.

The Pool Definition function is invoked from a Pool Inquiry by choosing Add, Modified, or Delete Commands. The Supervisor is then prompted for a Pool number. If Delete has been chosen, the Pool is eliminated. If Add was chosen, the Supervisor specifies a single attribute and relationship defining the Pool (e.g. Job length from 1 to 25 units). If Modify is chosen, the relationship on the selected attribute may be modified by the Supervisor (e.g. a range may be broadened or narrowed). To change the attribute for an existing Pool, the Pool must be deleted and then added.

Pool Inquiry—displays the Pool definitions. Note that Pool Inquiries do not effect Pool definitions, but that as described above, the Pool Definition functions are invoked from the Pool Inquiry.

Transcriber Assignment—allows the Supervisor to specify the Pools to which each transcriber is assigned. The current assignments are displayed and the Supervisor may update the assignments to reallocate resources to particular Pools (i.e. particular classes of DJ's). Assignments may be modified using the Add, Modified, or Delete functions.

Ready Job Pool Inquiry—Displays the Job Records for all DJ's in the Ready Job Pool. The displayed Job Records may be edited, prioritized, cancelled, or specially assigned as described above.

REPORT PROCESSING FUNCTIONS

The Report Processing functions allow the Supervisor to define the contents of a report, store the definition, and recall the definition for report generation. Definitions will include such information as: attributes to display, records to include, ordering of attributes, and sorting criteria to be used.

The Report Processing functions available to Supervisor are:

Report Index—Displays a listing of all currently stored reports and provides the Supervisor with access to the Report Definition and Report Generation functions.

Report Definition—Provides the Supervisor with the ability to define the information contained in a report. A Report Definition must exist before a report can be generated. The Report Definition function will include four commands. The Create command allows the Supervisor to define a new report and add it to the Report Index. The Save command—allows the Supervisor to store a Created or Modified Report Definition for later retrieval. The Delete command—allows the Supervisor to delete a previously stored Report Definition. The Modify command—allows the Supervisor to change an existing Report Definition. A Modified Report Definition must be Saved, or the previous, unmodified Report Definition will still be stored.

A report may be one of three types: a Job Record report, which reports the job records meeting the selected criteria; a user Profile Report, in which reports the user's meeting the selected criteria; and a Cost Allocation report, which reports the Job Records together with their allocated costs for the Job Records meeting the selected criteria.

Report Generation—produces and prints a report in accordance with a Report Definition selected by the Supervisor. An intermediate representation of the selected Report Definition will be created and that intermediate representation will be interpreted to produce the desired report. Note that reports are generated and printed in background, and that if archive records are to be included in a report, the Supervisor will be prompted for the appropriate archive information.

During Report Generation the Supervisor will be provided with three report control commands. The Start command activates the printer. Unless a Start command is issued no reports will be printed even though the printer may be physically enabled. The Stop command halts report printing; reports generated but not printed wait in a spool queue until a new Start command is issued. The Kill command deletes the report currently printing and the next report in the spool queue will start printing.

Cost Allocation—Cost Allocation functions are invoked by specifying a Cost Allocation Report Definition. Two types of Cost Allocation may be specified in a Cost Allocation Report Definition; Post-Defined Cost and Unit Costing. Post-defined Cost Allocation allows the Supervisor to distribute a cost among DJ's occurring in a specific time period. The cost will be distributed over the DJ's in accordance with weighting factors for job length, priority, and work type. The DJ's over which the cost will be distributed and sub-totalling will be performed, will be selected in accordance with the Report Definition. Unit Cost Allocation is based on a defined unit cost specified by the Supervisor. For example, one unit of transcribed dictation might cost $0.5. The number of units for a DJ will be adjusted based on weighting factors for job length, priority and work type. The cost of a DJ will be the product of the adjusted number of units and the unit cost. For VMM, the unit cost will be defined per message. Job Record selection and subtotalling for the Cost Allocation Report will be performed according to the Report Definition. Note that unit costs will have their greatest applicability when the DDS is operated as a profit center.

SCREEN PROCESSING FUNCTIONS

The Screen Processing functions provide a standardized and flexible method by which displays for CRT 112 can be defined and generated. The Screen Processing Functions available to the Supervisor are:

Screen Definition—the screen of CRT 112 is preferably divided into six windows as shown in FIG. 3. The Screen Definition functions define the information which will be displayed in each window as described below.

Performance Monitoring window 3-1 displays performance monitoring information. Any attribute (e.g. percent of disc space available) of the Performance Monitoring function, described below, may be displayed in window 3-1 with selected text and in specified locations.

The Headings will display text headings for Data window 3-3. Headings are provided for three types of Data; column, form and matrix. Column headings are provided for each of a predefined number of columns;

form headings consist of two lines of specified text describing data window 3-3; and matrix headings are similar to column headings except that the left hand column is reserved for row headings.

Data for each screen will be displayed in Data window 3-3. As noted, data may be displayed in column, form, or matrix format. All data will be updated in real time. Note that data window 3-3 may only display a single record type. For example, data window 3-3 may contain Job Records or User Profile Records, but not both.

The Supervisor will have the capability to expand data window 3-3 to encompass records which exceed its width.

Prompt window 3-4 displays visual prompts, a command line, and menu and function key selection echos.

Menu window 3-5 displays menu selections, programmable key selections, and help information. The menu defines the functions currently available to the Supervisor and the corresponding key on keyboard 114 to invoke those functions. Programmable Function Key Selections are similar to menu selections except that the associated keys invoke a user defined programmable function. Help information is a brief description of a function selected by the Supervisor.

Notification window 3-6 will display notifications concerning system status, alarms, alerts, and errors.

(Note that the DDS of the subject invention may be implemented without allowing the Supervisor access to the Screen Definition functions. In such an embodiment the DDS will appear to the Supervisor to have fixed screen definitions.)

Screen Interpreter—interprets a Screen Definition and formats and displays all data values in the Screen Definition to produce the defined screen transparently to the Supervisor. As noted, the Screen Interpreter will also update all data values in real time. The Screen Interpreter will also provide the capabilities for moving from item to item and page to page as described above with respect to various types of inquiries.

USER FUNCTIONS

The User functions allow the Supervisor to add, delete, and edit User Profiles for users of the DDS. User Profiles define attributes for each user of the DDS, which profiles are used for various purposes such as determining data that is to be placed in Job Records, scheduling of DJ's and determining access rights to jobs. When the Supervisor selects the User Profile Inquiry the Add, Delete, Display, and Edit commands are available. In response to the Add command a data entry form with all User Profile attributes is displayed. In response to a Delete command, the Supervisor is prompted for a user ID; confirmation is requested of the entered ID; and the identified User Profile is deleted. The Display command provides an expanded display of a User Profile for a specified user. The edit commands are the same as described above for Job Record Edit.

User Profile Inquiry—Allows the Supervisor to display and manipulate the User Profile of one or more users of the DDS. User Profiles will be selected based on specified attributes in the manner described above in respect to Job Record Inquiry.

SYSTEM OPERATIONS FUNCTIONS

System Operations functions outside the Supervisor's normal operating environment. Most define parameters which are used by the Supervisor Session or by the Voice Session. The System Operations functions are:

Installation Set Up—The Installation Set Up functions control the initial configuration of the DDS by vendor personnel in conjunction with the customer at the time of installation. A redundancy command may be specified causing the system to copy Voice Files to a back-up disc after recording of the original Voice File is completed. Database and other initializations are performed and system parameters are defined using the Installation Set Up features. Preferably the Initialization Set Up functions are removed from the DDS after completion of installation.

System Activity—the System Activity functions consist of System Activity Display and Forced Disconnect. The System Activity Display displays a record for each port in the DDS. If a user has Logged-on to a port, the record will include information identifying the user. If the Supervisor learns of an inactive port the Forced Disconnect function will allow the Supervisor to disconnect that port. The Forced Disconnect function will cause the Voice Session to perform a Hang-up function as described further below. The Supervisor may learn of an inactive port either through the System Activity Display showing an off-hook port without a user, or through the Monitor function, described further below.

System Set Ups—The System Set-ups functions allow the Supervisor to define and/or access various system parameters. These parameters are:

Date and Time

Audit Trail—When set a log of critical system events is printed.

Backlog—the total number of lines in the DDS awaiting transcription.

Center Transcription Rate—the current rate at which the DDS is transcribing DJ's.

Log-on Timeout—the time allowed a user to complete Log-on.

Log-on Attempts—the number of attempts allowed a user to complete Log-on.

Alarms—levels which, if exceeded may degrade performance. For example, the Supervisor may define a level of Voice File storage which, if exceeded, will trigger an alarm.

Auto Finish—defines a class of DJ in terms of work type which is automatically Finished on Sign-off.

Weighting Factors—factors used in determining Cost Allocation.

Unit Cost—unit cost for Cost Allocation.

Keyboard Lock Password—password to allow access when keyboard 112 is locked.

Skip Increment—see Voice Session commands.

Voice Capacity Safety Margin—a percentage level of Voice File capacity above which the Supervisor Session will control the Voice Session to delete old Voice Files. Voice Files are deleted in the following order: VMM's, which exceed the Voice Mail Retention Period, Signed-off DJ's, all other VMM's, and Ready DJ's. Within each category Voice Files are deleted in first-in, first-out order.

Voice Mail Retention Period—see above.

Variable Length Information Items—the maximum length allowed for various data items such as user identifier, work type, etc.

Voice Port Configuration and Allocation—specifies the minimum number of ports reserved for transcriptionists and the Supervisor, the connection for each port (i.e. PBX, hardwired, or none), and, for each port, whether the port should be disconnected after it exceeds the Inactivity Timeout.

Inactivity Timeout—see above.

Acessible Work Types—specifies work types which may be listened to by users other than the dictator through the Review Dictation function (see Voice Session).

Performance Monitoring—enables the Supervisor to display and monitor system performance information in real time.

Performance Status—displays system performance attributes in Performance Monitoring window 7-1 (see Screen Definition above). These attributes include the percentage of available Voice File storage capacity used, total backlog, etc.

Performance Inquiry—allows the Supervisor to display detailed performance information. Alarm Notification functions cause a notification to be displayed in Notification window 3-6 (see Screen Definition above).

Function Key—enables sequences of commands to be executed by a single keystroke. Current definitions of Programmable Function Keys will be displayed on the menu (see Screen Definition above).

Work Hours Clock—captures turnaround time for DJ's in both clock time and working hours. Working hours are defined to be time during which the Supervisor is Logged-on to Supervisory station 110.

MISCELLANEOUS FUNCTIONS

Flash Report—prints an exact copy of CRT 114. The Flash Report will be printed in background.

Cancel—cancels some executing activities of the Supervisor Session. Effects of the Cancel function depend upon the current context. If a command has not been completely entered and the Cancelled function is invoked the current input is erased and the context remains the same. If an Add Modify, or Single Record Edit is cancelled before execution has started changes are erased from CRT 114 and no data is changed. If a command has completed and no new command has started, the Cancel function returns the system to the previous menu level. If a command which affects a single entity is executing when the Cancel function is invoked, the command will run to completion. If a command affecting multiple entities has not yet completed when the Cancel function is invoked, the command will be stopped when the current entity is completed. The effects of the executing command up until the time it stop will not be changed. No record will be partially affected by a command running when the Cancel function is invoked. Note that since report printing is done in background the Car.cel function will have no effect and the Kill function must be used to stop a report from printing.

Help—provides a description of the commands available to the Supervisor in the current context. The help information is displayed in Menu window 3-5 (see Screen Definition above).

Keyboard Lock—allows the Supervisor to disable access to the DDS. When the Keyboard Lock function is invoked only the Supervisor's password is recognized by the DDS. Receipt of the Supervisor's password unlocks the keyboard (see System Set-up above). Note that the current screen will continue to be displayed, including real time updates, while the Keyboard Lock function is invoked.

SUPERVISOR VOICE SESSION FUNCTIONS

The Supervisor Voice Session Functions are Voice functions which are available only to the Supervisor. These functions are mentioned here for completeness; for full details see the description of the Voice Session below. The Supervisor Voice Session Functions are:

Emulate—Enables the Supervisor to initiate a user session which imitates another user.

Intercom—Allows the Supervisor to communicate with any other Logged-on user or vice versa. No connection is made until the user responds.

Monitor—Enables the Supervisor to unobtrusively listen to voice activity on any port.

VOICE SESSION

Users interact with the DDS through the Voice Session using telephone-like devices having keypads and handsets. Users will be able to subscribe to one of two services; Dictation and Voice Mail. Users of the Dictation service are further grouped into two classes: dictators and transcriptionists. A user is identified by his ID as either a dictator or transcriptionist, and to have both capabilities the user must have two ID's. The Supervisor will have access to all Voice Session functions through the Emulate function described further below.

Each user will have access to a subset of Voice Session Functions. The brakedown of access by service and user class is described below in conjunction with description of particular functions.

During a Voice Session the users will be prompted. These prompts will take the form of prerecorded voice messages describing the actions necessary at that point.

Tones will also be heard at various times during a Voice Session. Tones will be played to announce prompts, indicate erroneous keystrokes, and as feedback or confirmation for some functions.

If a user is creating a Voice File and is at the point where he is able to insert voice into the file a Talk-down tone will sound continuously.

Dictators will have the ability during a Voice Session to create Voice Files using the Create function. The dictator can access these files at any time until the Voice File is deleted. While a dictator is accessing a Voice File through the Create function all Movement and Play commands are available. The dictator can also use all of the Edit commands. The Edit commands allow the dictator to add or delete voice from a Voice File. Dictators who are also subscribers to the Voice Mail service may use the Hardcopy command, as will be described further below. Transcriptionists Sign-on to a Voice File for the purpose of transcribing that file. Once a transcriptionist has Signed-on the transcriptionist may use any Movement and Play function except for the Review-last-insertion and Move-to last-cut commands. Transcriptionists will not have the capability to edit a Voice File. Once a transcriptionist has signed-on to a Voice File he may issue a Sign-off or Quit command. The Quit command leaves the transcriptionist in the Command mode, and the Sign-off function automatically invokes a Sign-on function so that the transcriptionist may transcribe the next Voice File.

A user may also subscribe to the Voice Mail service which allows the user to create and send VMM's to up to ten other Voice Mail subscribers. When creating a VMM the user will have all Movement, Play and Edit commands available. Before recording the VMM the user will be prompted for the addresses of the intended recipients. The user may add addressees to the address list up until the time the VMM is sent. A null address list will cause the VMM to be placed in the user's basket. A user will also be able to specify himself as a addressee.

A Voice Mail user who is also a dictator will be able to enter the Hardcopy command for a VMM; causing the Voice File to be treated as a DJ as well as a VMM. By treating a Voice File as both a DJ and VMM, the dictator/user is provided with the unique capability to confirm or follow-up a VMM with a hardcopy text of the message. Such hardcopy text is highly advantageous in that it provides the originator and recipients with permanent copies of the message, reduces the possibilities of error inherent in verbal messages, and provides an alternate delivery channel to the recipient which does not require positive action on the recipient's part. Recipient users who are also dictators may also create hardcopy text of VMM's they receive. Thus, recipients may also initiate further distribution of VMM's with all of the attendant advantages described above.

Users receive VMM's through the Review function. When the Review function is invoked the user will hear the number of messages he has in his basket. Then a sequence of "headers", one for each message, will be played. Each header identifies who the associated message is from, when it was sent, and its ID number. While the header is playing the user has any Movement or Play function available. When the header plays to the end or otherwise reaches the end, e.g. via a movement function, the system will automatically go to the next header. The user can go to the next header at any time by issuing a Quit or Discard command. A quit command will save the VMM in his basket and the Discard will delete the VMM from the user's basket.

At any time while a header is playing, the user may issue the Listen command and the VMM will begin playing. The user will have all of the Movement and Play functions available.

The user can leave off listening to a VMM at any time by issuing a Quit or Discard command. The Voice Session will then resume review of the headers for VMM's in the user's basket. The Quit command will leave the VMM in the user's basket and the Discard command will remove the VMM from his basket.

The functions for the Voice Session are divided into four major groups:

Session Control—functions which allow the user to Log-on, Log-off, and select a service (i.e. Dictation or Voice Mail).

Voice File Access—functions allowing the user to access a Voice File, change it, listen to it, and close it.

Supervisor—functions accessible only to the Supervisor or for a user to contact the Supervisor.

General—functions accessible by all users.

A user controls the operation of functions by issuing commands. The operation of some functions will vary according to parameters established by the Supervisor. Some parameters will be system-wide, affecting all users; others will be user-specific. Establishment of system-wide parameters has been described above. User-specific parameters are established by the Supervisor when a User Profile is created as described above.

Figure 4:
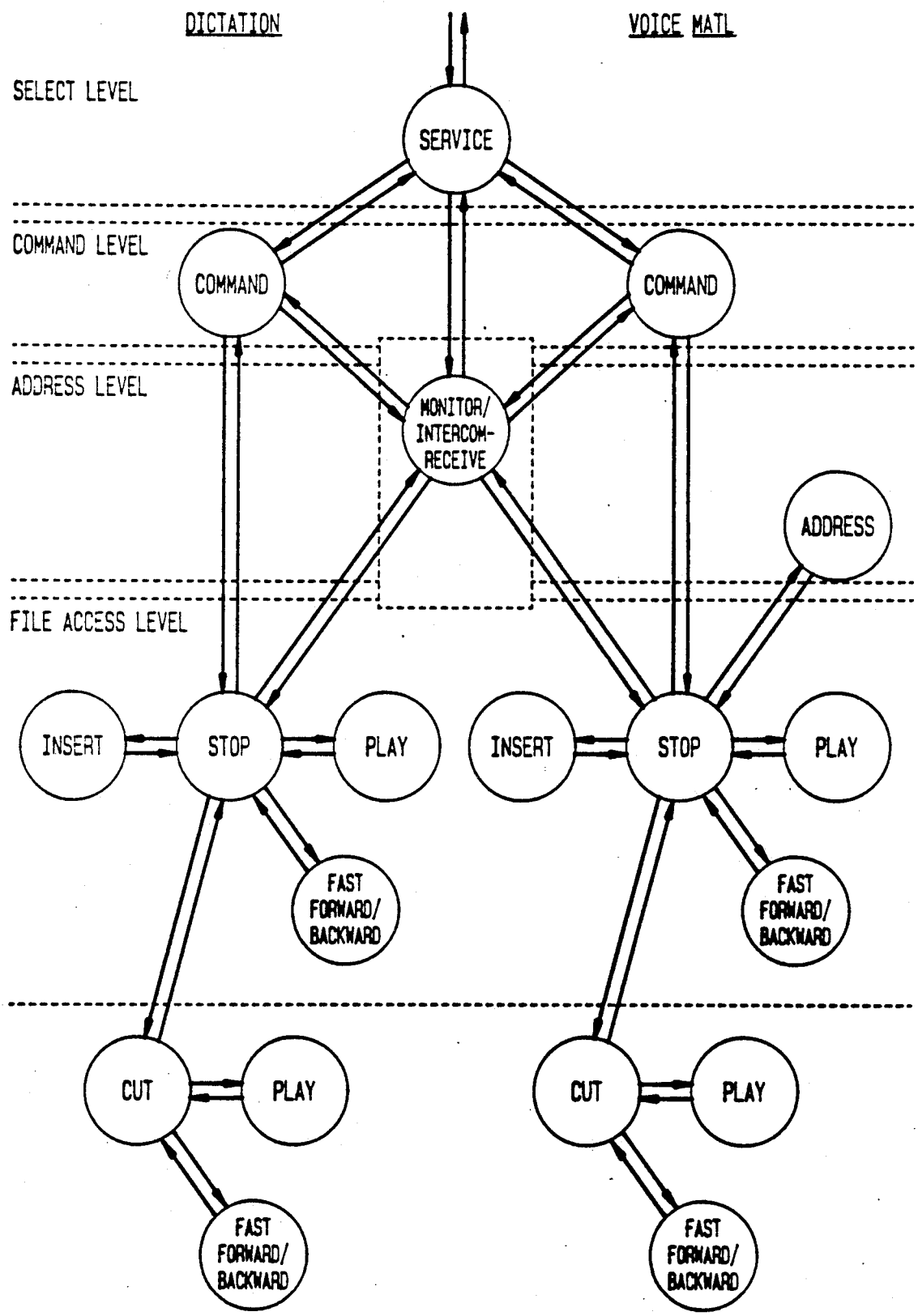
FIG. 4 is a state diagram of user modes for a Voice Session.

During a Voice Session the user will be in one of several modes. These modes are illustrated in FIG. 4. Closely related modes are grouped into levels. Each level has a homemode which is the mode originally entered when a new level is entered. It is also the mode to which a user returns as a result of the Cancel function. Note that the File Access level has a sublevel, whose homemode is Cut.

SESSION CONTROL FUNCTIONS

Log-on—allows a user to access the DDS. If a port is free a Voice Session will be initiated in response to the Log-on function. Once the user has access to a port he will be allowed a limited time and a limited number of attempts to enter the correct ID and password. The maximum time and number of attempts for a user to complete Log-on is a system-wide parameter set by the Supervisor, as described above. If the user fails to successfully Log-on within these limits he is disconnected from the DDS and the Supervisor is notified.

The first time a user Logs-on to the DDS he will be prompted to record his name and ID in his own voice. This Voice File may then be included in any headers attached to DJ's and VMM's created by that user. Users will also be prompted to establish their own password during their initial Voice Session.

After the initial Voice Session each time a user Logs-on he will be prompted to choose either Dictation or Voice Mail service. A default choice may be established for a user so that he will not need to enter a choice for each session, and users will be able to switch between the Dictation and Voice Mail services during the session. Of course, a user subscribing to only one service will automatically be connected to that service when he Logs-on.

Users who have the ability to create Voice Files will have an option of starting to dictate immediately upon selection of a service. The Supervisor will enable this option by setting an Auto-create parameter in the User Profile as described above. If the Auto-create option is not enabled the Voice Session will place the user in the Command mode when the Dictation command is issued.

When a transcriptionist completes Log-on the Sign-on function will automatically be invoked to Sign-on the transcriptionist to the next job to be transcribed in accordance with the pool algorithm described above.

After Log-on users who are subscribers to Voice Mail service will be prompted if they have any VMM's waiting. If the user has no VMM's waiting Log-on will continue as described above.

Log-off—disconnects the user from the DDS.

VOICE FILE ACCESS FUNCTIONS

The following functions provide for access to a Voice File:

Create—allows a user to create a new Voice File. This function may be invoked explicitly by the user; or may be invoked automatically when the user selects a service or completes creation of a previous Voice File, if the Auto-create parameter has been set in the User—s Profile by the Supervisor. If the user has selected the Dictation service he will be able to create and complete more than one DJ without Logging-off. The User Profile will have initial default values for work type, subject, ID, and department number in their User Profiles. System-wide parameters established by the Supervisor will indicate whether DJ—s require each of these items. User-specific parameters in the User profile indicate whether or not the dictator is to be prompted for each value. Default will cause the value for that item to be carried forward from the previous DJ, or for the first DJ in a session, the value in the User Profile will be selected. When a user has selected Voice Mail service he will be placed in the Address mode to create an address list for the VMM to be created.

Review—allows a user to hear a group of Voice Files. A user who has selected Dictation service may select a group of DJ's for review in accordance with one of the following attributes: Job ID (i.e. a specific job), Author ID, Subject ID, or Work type. All jobs that satisfy the specified criteria will be selected and Play will begin automatically. The user will have all movement and play functions available. The user may skip to the next Voice File by entering the Quit command.

If the user has selected Voice Mail service, the Review function will play the headers for the VMM's in the user's basket. The user will hear the number of VMM's in his basket; followed by the headers in first in—first out order. While a header is playing the user may invoke the Listen function to hear that message; he may invoke the Discard function to delete the header and corresponding message; or he may invoke the Quit function to skip to the next header. A user who is also a dictator may enter the Hardcopy command to send the Voice File for transcription as a DJ.

Sign-on—opens a DJ for transcription. The Sign-on function is invoked automatically for a transcriptionist at Log-on and Sign-off, unless the transcriptionist has the ability to self assign DJ's. While Signed-on to a DJ the transcriptionist has access to all Movement and Play functions but may not edit the DJ. If the Supervisor has assigned a specific DJ to the transcriptionist he will Sign-on to that DJ. If no specific job is assigned the transcriptionist will be assigned the Pending job from the first Pool in the transcriptionist's Pool list that has a Pending job.

Transcriptionists who have the ability to choose DJ's may select them in accordance with attributes in the manner described above with respect to the Review function. As each DJ is signed-off the next job satisfying the criterion will be automatically Signed-on. When the last self assigned job has been Signed-off the transcriptionist may transcribe from his regular Pool assignments or self assign another group of DJ's.

When a user who has accessed a Voice File through a Sign-on function is listening to the file a brief tone will be generated every six seconds during the last thirty seconds of play.

Listen—allows a user who has selected the Voice Mail service to hear a VMM. It may be entered from either the Command mode or from the Review function. All Movement and Play functions are available and Edit functions are not available during the Listen function.

The following functions allow a user to move around within a Voice File and to listen to it without changing the Voice File, once the file has been accessed. Each movement function is followed by an Auto-play function, unless the move is to the end of the file or the function is move-to-last-cut.

As described above, headers are Voice Files appended to, and containing information about other Voice Files. Headers are always played when a user accesses a VMM and are played when a transcriptionist Signs-on to a DJ, if the transcriptionist has a Play Header parameter turned on in his User Profile.

Move-to-beginning—moves the voice cursor (i.e. the point at which Play begins) to the beginning of the Voice File.

Move-to-end—moves the voice cursor to the end of the Voice File and puts the user in the Stop mode.

Move-half-forward and Move-half-backward—moves the voice cursor to the point half-way between the current location of the voice cursor and the end or beginning of the Voice File.

Review-last-insertion—moves the voice cursor to the beginning of the last segment inserted in the Voice File (i.e., the point at which the Insert command was last entered). Playback will continue to the end of the Voice File. The Move-to-last-cut function moves the voice cursor to the point at which the last Cut command was entered. There is no Auto-play following this function.

Move-to-cue—moves the voice cursor to the cue in the Voice File.

Fast-forward and Fast-backward—move the voice cursor forward or backward in the Voice File. When either of these functions is invoked a sequence of brief tones will be heard until a Stop command is issued. The voice cursor is then moved forward (or backward) ten seconds for each tone generated during the Fast-forward or Fast-backward function.

Play—plays back a Voice File. Play is continuous until a Stop command is issued or until the end of the file is reached, placing the user in the Stop mode.

Skip-forward and Skip-backward—move the voice cursor forward (or backward) by a set increment established as a system-wide parameter by the Supervisor. Skip-backward is automatically invoked when a user accessing a Voice File through the Sign-on function (i.e., a transcriptionist) enters a Stop command when playing a Voice File.

Compress-pauses and expand-pauses—decrease (increase) the percentage of a pause that is actually played. Each command will decrease (increase) the percentage of the recorded pause played by ten percent.

Slow-down and Speed-up—decrease (increase) the rate at which a Voice File is played back to a user. The rate will be decreased (increased) by ten percent of the original rate per command.

The following functions, which are available only during the creation of a Voice File, allow a user to edit the contents of a Voice File. A Voice File cannot be edited once it has been closed and these edit functions are not available to a transcriptionist. Editing functions always leave the user in the Stop mode and the user will hear a talk-down tone.

Insert—allows a user to add to a Voice File. Voice is recorded into the Voice File before the current position of the voice cursor. When the Stop command is issued the Insert function is ended and the user will be in the stop mode. The Review-last-insertion function can be used to listen to what was just inserted.

Cut—allows a user to remove a segment of voice from a Voice File. A user may mark the beginning of a segment to be cut by using the Cut command and then, using the Movement functions move forward or back from this mark. Issuing the Stop-cut command will mark that point and cut the segment between two marks.

Cut-to-end—cuts a segment from a Voice File between the current location of the voice cursor and the end of the file.

Cut-from-beginning—cuts a segment from a Voice File between the current location of the voice cursor and the beginning of the file.

Cue—places a non-audible cue in a Voice File. This allows a user to use the Move-to-cue command to locate the voice cursor at the cue position. Only one cue is allowed per Voice File. A second cue will automatically remove the first and the second cue will be placed in the Voice File. Editing of the Voice File will be allowed only past the cue. Any Edit function affecting the contents of the Voice File before the cue will automatically remove the cue from the file.

Delete-cue—removes the cue from a Voice File.

The following functions relate to editing an address list for VMM's. Here an address list is a list of the user ID's for each intended recipient. When Creating a VMM the user is initially placed in the Address mode and the following functions are available. Movement and Play functions are not available in the Address mode. The user may leave the address mode by issuing a Stop command, placing the user in the Stop mode at the File Access level.

Address—will return a user to the Address mode. The user will hear the current address list. When the end of the list is reached, the user will be prompted to issue an Add-to-list, Erase, Hardcopy, Address, or Stop command. The Address command will play the list again. The Stop command will place the user in the stop mode at the File Access level as described above.

Add-to-list—allows the user to add new ID's to the address list. Up to ten ID's may be included in the list.

Hardcopy—allows a Voice Mail user, who is also a dictator, to request a typed copy of a VMM. The Hardcopy command will cause the VMM to be treated as a DJ. The user may issue the Hardcopy command from the Address mode while Creating, and he may also issue it from the Stop mode while Reviewing or Listening to a VMM.

Erase—erases the address list associated with a VMM, including any Hardcopy function.

The following functions relate to termination of Voice File access.

Complete—closes a DJ and the status of the job is changed to ready and the DJ is placed in the Ready Job Pool for transcription.

Send—closes a VMM and its status is changed to Sent and it is routed to the addressees.

Sign-off—closes a Voice File to which a transcriptionist has Signed-on. The status of the file will become Sign-off and, generally, the Sign-on function will be automatically invoked.

Quit—closes a Voice File that has been accessed using the Listen, Sign-on, or Review functions. The Quit function leaves the user in the Command mode if the user Quits from Sign-on or Listen. If the Sign-on function was used the status of the Voice File is changed to Ready, even it was Pending when accessed. If the user enters the Quit command while Reviewing he skips to the next DJ or header. In the case of Voice Mail the Quit command leaves the VMM in the user's basket for future review.

Discard—removes a Voice File from the system. A user who is Creating a new DJ or VMM may Discard it and start over. The Discard function will leave the user in the Command mode. A user who is Reviewing the VMM's in his basket or Listening to a VMM may discard the VMM.

SUPERVISOR FUNCTIONS

The following functions relate to functions which are available to the Supervisor through the Voice Session.

Emulate—allows the Supervisor the imitate a specific user. The Supervisor enters an Emulate command and proceeds to enter further commands as if a particular user. To end Emulation the Supervisor Logs-off and is returned to the Supervisor Session.

Intercom—allows communication between any user and the Supervisor. Either party may initiate Intercom. Once connection is made the parties may talk or the initiator may play a Voice File for both parties. The Supervisor contacts a particular user by entering that user's ID. Users can only contact the Supervisor. The receiver must enter an Intercom-receive command before the communication link is completed. The link is broken either by Hang-up or by the Supervisor entering a Break command.

Monitor—allows the Supervisor to listen to the signal on a particular port. The Supervisor ends the Monitor function with the Break command.

Force Disconnect—allows the Supervisor to disconnect a user at any time. The Hang-up function for that user will be automatically invoked, as described further below.

GENERAL FUNCTIONS

The following functions can be invoked from any mode and are available to all users.

Cancel—terminates an executing function. The Cancel function restores the system to the state it was in before the Cancelled function was invoked and returns the user to the home made for that level.

Help—provides a prompt to the user which tells what mode the user is in and what commands are valid at that point.

Hang-up—ends a Voice Session. The effects of Hang-up depend on what the user was doing; basically an open Voice File will be closed and the user will be disconnected from the DDS.

If a user Hangs-up while Inserting voice into a Voice File the new segment will become part of the file. Any other function currently executing will be cancelled. One of two actions will then occur, depending upon the value of the Create Hang-up Option parameter in the User's Profile. Either the DJ will be completed and its status will become ready, or it will be Discarded. VMM's will either be sent to the addressees or will be Discarded. This also applies if the user Hangs-up while accessing the address list. The user will then be disconnected from the DDS.

If a user Hangs-up while listening to a file the Play function will be cancelled, the file will be closed and the user will be disconnected from the DDS. If a transcriptionist is Signed-on to a Voice File and Hangs-up the executing Play function will be cancelled, the file will be closed by the Quit function, and the job will be returned to the Ready status. The transcriptionist will be then disconnected from the DDS.

If a user Hangs-up while Reviewing VMM's the VMM currently being reviewed will remain in his basket. The user will be disconnected from the DDS. If either party hangs up while intercoming the connection is broken and a user who Hangs-up will be disconnected from the DDS.

If the Supervisor Hangs-up while Monitoring the connection to the port is broken and the Supervisor is disconnected from the DDS. If the user who is being Monitored Hangs-up the connection will be broken and the Supervisor will be able to continue with his session.

If the Supervisor Hangs-up while Emulating another user the Voice Session will be ended as if the Emulated user had Hung-up.

If a user Hangs-up before completing the Initial session the session will be erased and the next time that user Logs-on he will again be prompted for an Initial session.

SOFTWARE ARCHITECTURE

The subject invention is implemented on system 10 through software as will be described in detail below. The software architecture is described in terms of a hierarchical model comprising software modules and the data flows between modules. Modules are decomposed into submodules, which may in turn be further decomposed. Data flows may be described in terms of component data flows, which also may be further broken down into subcomponents. Transfer of control between modules is not shown explicitly except where necessary for the model to make sense.

The lowest level of submodules (i.e. modules which are not further decomposed) are considered sufficiently simple that they may easily be programmed by any person of ordinary skill in the art.

Figure 5:
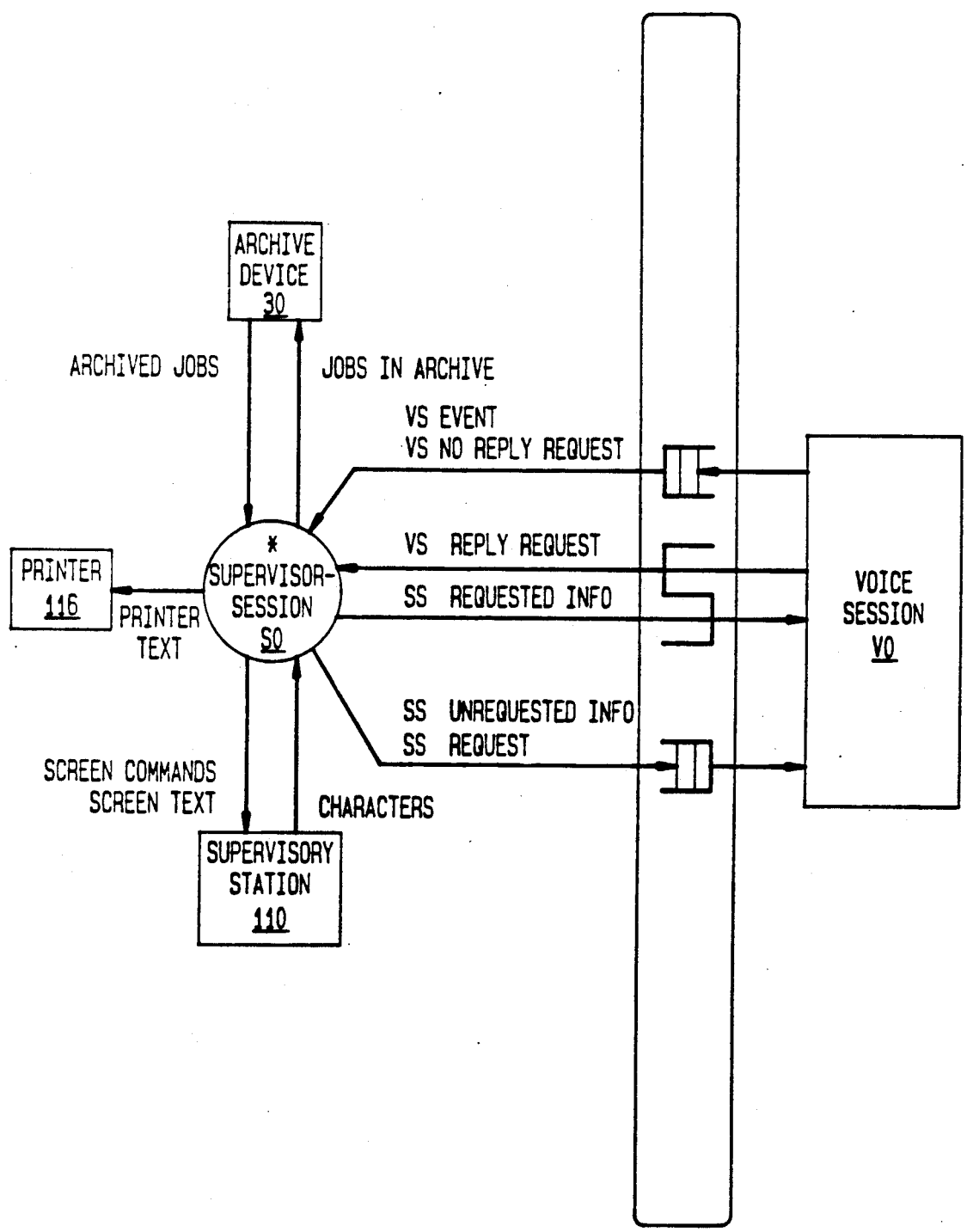
FIGS. 5-28 show a hierarchical model, including software modules and data flows, of the Supervisor Session software architecture.

As described above the software for the system of the subject invention comprises two primary software programs or systems referred to herein as the Supervisor Session (SS) and the Voice Session (VS). In FIG. 5 module S0 represents the Supervisor Session. SupervisorSession S0 performs all the non-real time functions, including data management and Supervisory functions.

Supervisory Station 110 outputs Characters to Supervisor Sessionmodule S0 and inputs Screen Commands and Screen Text from SupervisorSession S0. Printer 116 inputs Printer Text from SupervisorSession S0. Archive Device 80 outputs Archived Jobs and inputs Jobs To Archive. Inputs from the Voice Session are VS Event, VS No Reply Request, and VS Reply Request. Outputs from SupervisorSession S0 are SS Requested Info, SS Unrequested Info, and SS Request.

Figure 6:
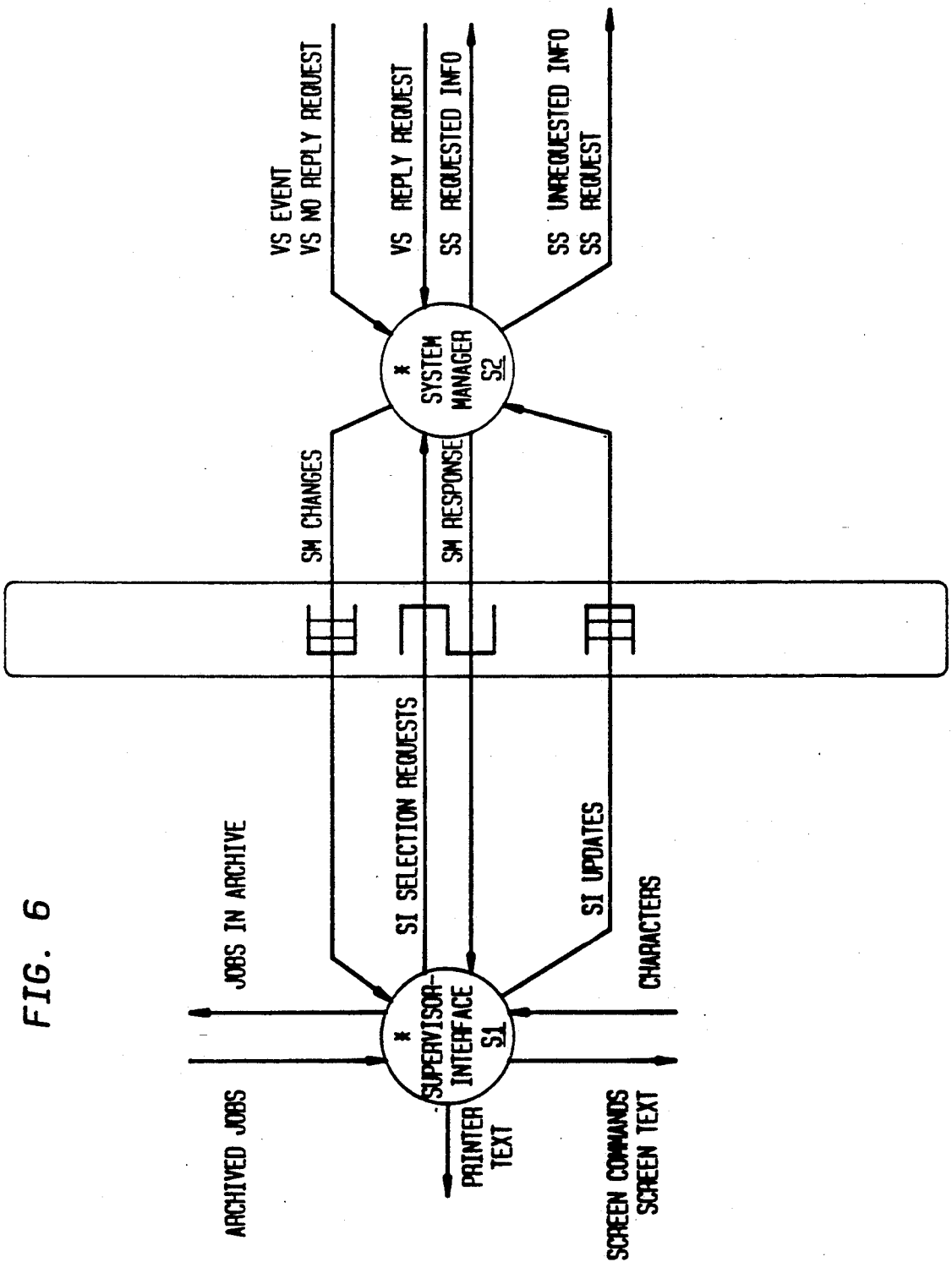

FIG. 6 shows SupervisorSession module S0 decomposed into SupervisorInterface module S1 and systemManager module S2. Module S1 handles inputs and outputs to Supervisory Station 110, including Printer 116 and Archive Device 30, while module S2 handles inputs and outputs to the Voice Session. More specifically, SupervisorInterface S1 manages the input/output interaction between the Supervisor and the system of the subject invention; including inquiries, reporting, and setting of system parameters. SystemManager module S2 manages databases and performs data management functions necessary for the Voice Session, and fulfills SupervisorSession S0 requests for databases reads and updates.

Inputs to SupervisorInterface module S1 from system-Manager S2 are SM Changes and SM Response. Inputs to system-Manager S2 from SupervisorInterface S1 are SI Selection Request and SI Updates.

Figure 7:
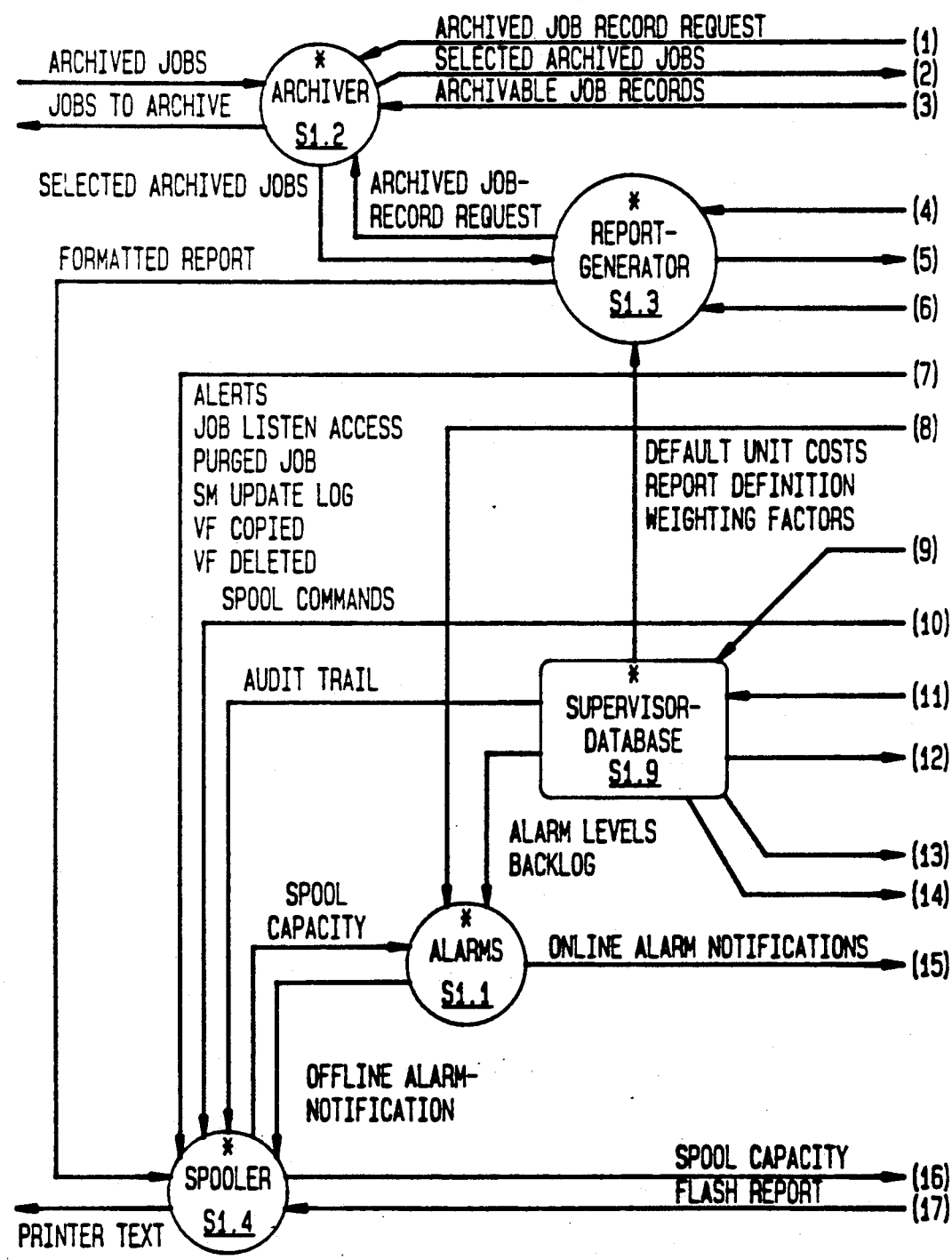
Figure 8:
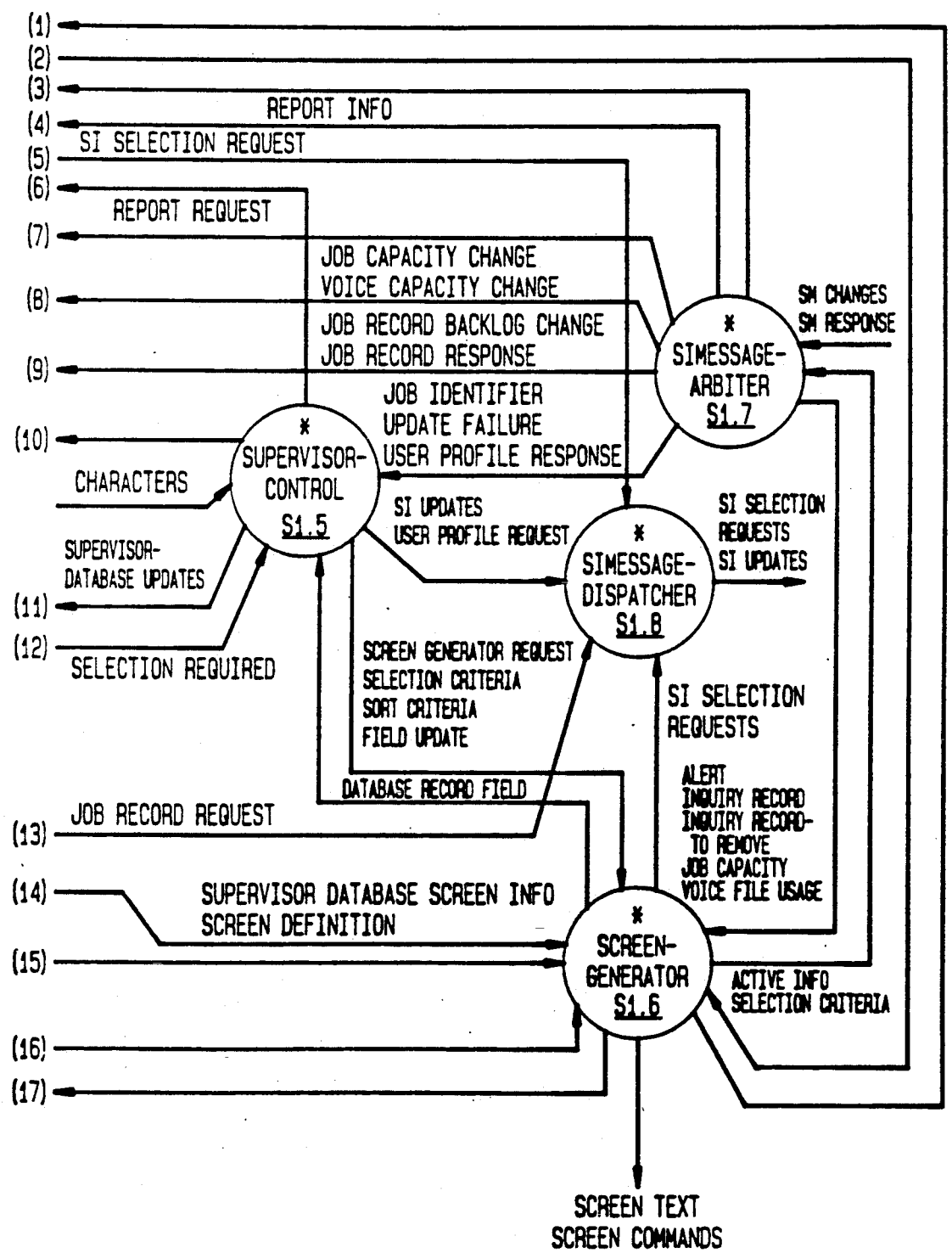

FIGS. 7 and 8 show a further decomposition of module S1 into alarms module S1.1, archiver module S1.2, reportGeneratorModule S1.3, spooler module S1.4, SupervisorControl module S1.5, screenGenerator module S1.6, siMessageArbiter module S1.7 siMessageDispatcher module S1.8 and SupervisorData-Base S1.9. Alarms module S1.1 tests conditions against allowable limits set by the Supervisor and when these conditions are met generates an appropriate message for each condition met and notifies the appropriate processes. Module 1.1 is described in MODULE SPECIFICATIONS set forth below.

Inputs to alarms module S1.1 are: Spool Capacity, Job Capacity Change, Voice Capacity Change, and Alarm Levels Backlog. Outputs from alarms module S1.1 are Offline Alarm Notification and Online Alarm Notification.

Archiver module S1.2 handles input and output to Archive Device 30. Other inputs to module S1.2 are Archived Job Record Request, Archivable Job Records, and Archived Job Record Request. Other outputs from module S1.2 are Selected Archived Jobs, which is output to reportGenerator module S1.3 and siMessageArbiter module S1.7.

ReportGenerator module S1.3 uses information defining reports to retrieve appropriate records from databases according to the report type and format a report to be printed.

Inputs to reportGenerator module S1.3 are: Selected Archived Jobs, Report Info, and Report Request. Outputs from module S1.3 are Archived Job Record Request, Formatted Report, and SI Selection Request.

Spooler module S1.4 monitors the spooling of reports and a log of the system events and outputs them to printer 116. Printing may be started, stopped, or a currently printing report may be cancelled under control of the Supervisor.

Inputs to spooler module S1.4 are: Formatted Report, Alerts, Job Listen Access, Purged Job SM Update Log, VF Copies, VF Deleted, Spool Commands, Audit Trail, Offline Alarm Notification, and Flash Report. Outputs of module S1.4 are: Printer Text, Spool Capacity, and Flash Report.

SupervisorControl module S1.5 manages the user interface, and the editing and manipulation functions (e.g. Job Record Edit). It receives the Characters input from Supervisory Station 110. Other inputs are Job Identifier, Update Failure, User Profile Response, Database Record Field and Selection Required. Outputs are Supervisor Database Updates, Report Request, SI Updates, User Profile Request, Screen Generator Request, Selection Criteria Sort Criteria, Field Update, and Spool Commands.

ScreenGenerator module S1.6 controls all output to Supervisory Station CRT 112 and interfaces to database routines for inquiry information. Inputs to module S1.6 are: Screen Generator Request, Selection Criteria, Sort Criteria, Field Update, Alert, Inquiry Record, Inquiry Record To Remove, Job Capacity, Voice File Usage, Selected Archived Jobs Spool Capacity, Online Alarm Notifications, Supervisor Database Screen Info, and Screen Definition. Screen Text and Screen Commands are output by screen- Generator S1.6 to CRT 112. Other outputs are: Flash Report, Database Record, Field, SI Selection Requests, Active Info, Selection Criteria, and Archived Job Record Request.

siMessageArbiter module S1.7 receives messages from systemManager module 2 and distributes them to the proper submodules of SupervisorInterface module 1. Module S1.7 is specified in MODULE SPECIFICATIONS set forth below.

Inputs to module S1.7 from system Manager S2 are SM Changes and SM Response. Other inputs are Active Info and Selection Criteria. Outputs from module S1.7 are: Alert, Inquiry Record, Inquiry Record To Remove, Job Capacity, Voice File Usage, Job Identifier, Update Failure, User Profile Response Job Record Backlog Change, Job Record Response, Job Capacity Change, Voice Capacity Change, Alerts, Job Listen Access, Purged Job, SM Update Log, VF Copied, VF Deleted, Report Info, and Archivable Job Records.

siMessageDispatcher module S1.8 collects and outputs all messages to systemManager module S2. Module S1.8 is specified in MODULE SPECIFICATIONS set forth below.

Outputs to systemManager module S2 are SI Selection Request and SI Updates. Inputs to siMessageDispatcher module S1.8 are: SI Selection Requests, SI Updates, User Profile Request, Job Record Request, and SI Selection Requests.

SupervisorDataBase module S1.9 maintains data used only within SupervisorInterface module S1. Module S1.9 is specified in MODULE SPECIFICATIONS set forth below.

Outputs from SupervisorDataBase S1.9 are: Alarm Levels, Backlog, Supervisor Database Screen Info, Screen Definition, Job Record Request, Selection Required, Default Unit Costs, Report Definition, Weighting Factors, and Audit Trail. Inputs to module S1.9 are Supervisor Database Updates, Job Record Backlog Change, and Job Record Response.

Figure 9:
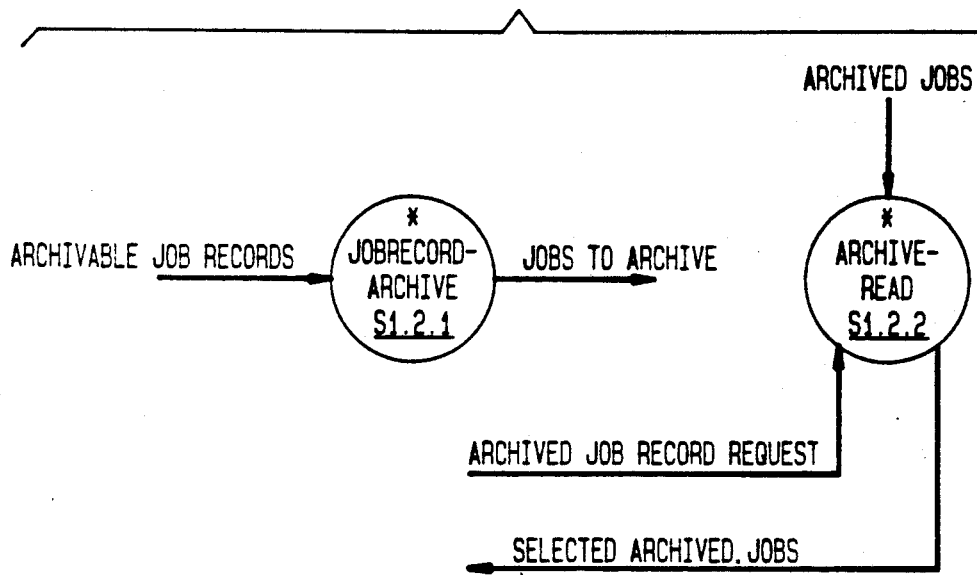

FIG. 9 further decomposes archiver module S1.2.

JobRecordArchive module S1.2.1 receives archivable job records and formats them for storage on Archive Device 30. Module S1.2.1 is specified in MODULE SPECIFICATIONS set forth below.

Outputs from module S1.2.1 are Jobs to Archive and inputs are Archivable Job Records.

ArchiveRead module S1.2.2 receives requests for archived job records and extracts them from Archive Device 30, then reformats them for inquiries or reports. Module S1.2.2 is specified in MODULE SPECIFICATIONS set forth below.

Output from module S1.2.2 is Selected Archived Jobs and inputs are Archived Jobs and Archived Job Record Request.

Figure 10:
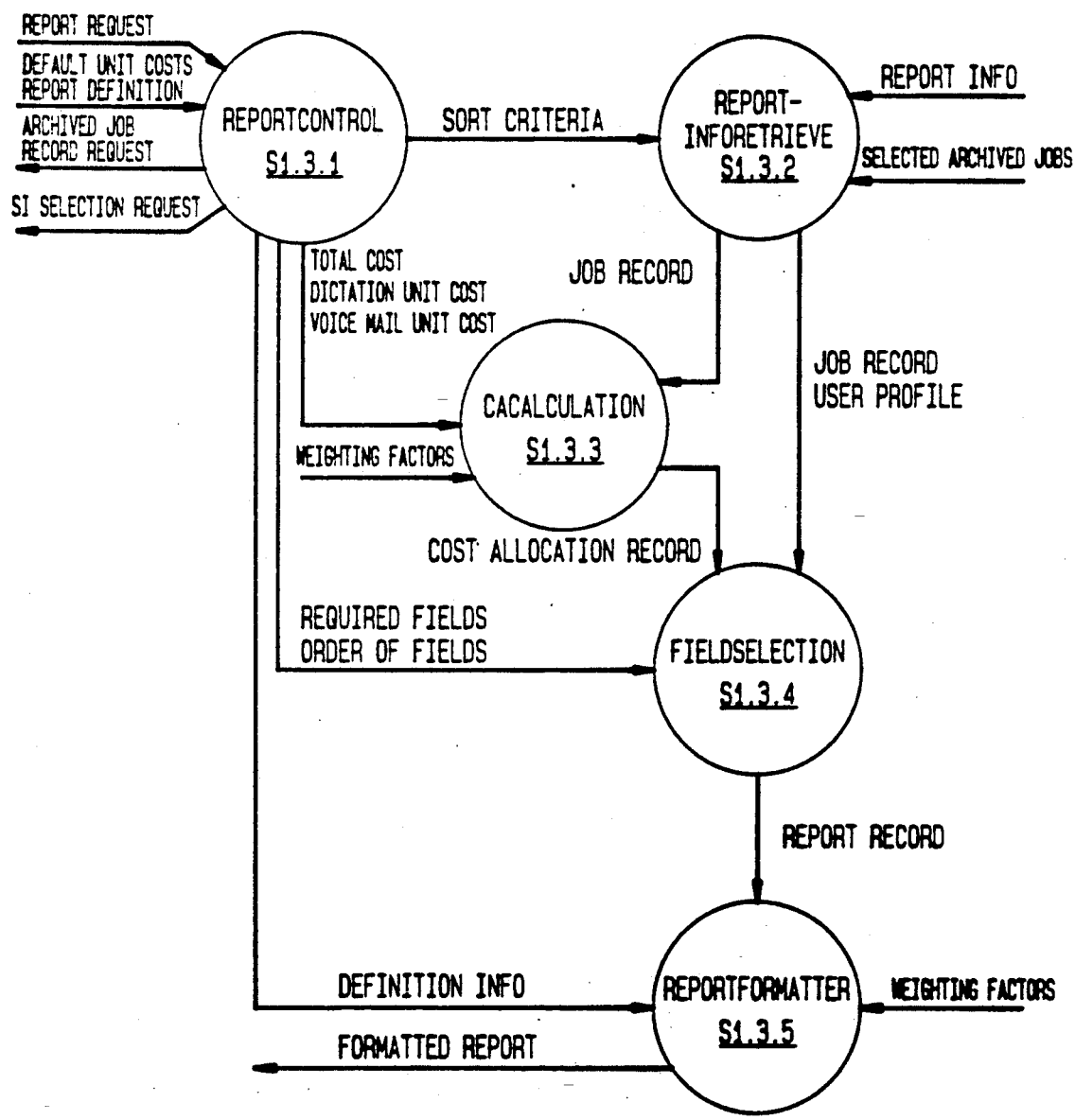

FIG. 10 further decomposes reportGenerator modules 1.3 into reportControl module 1.3.1, reportInfoRetrieve module S1.3.2, caCalculation module S1.3.3, fieldSelection module S1.3.4, and report Formatter module S1.3.5.

ReportControl module S1.3.1 retrieves the report definition and requests User Profile, Job Record, or Archived Jobs based on the report type and selection criteria. Module S1.3.1 is specified in MODULE SPECIFICATIONS set forth below.

Outputs from reportControl module S1.3.1 are Archived Job Record Request, SI Selection Request, Definition Info, Required Fields, Order of Fields, Total Cost, Dictation Unit Cost, Voice Mail Unit Cost, and Sort Criteria. Inputs to module 1.3.1 are Report Request, Default Unit Cost, and Report Definition.

ReportInfoRetrieve module S1.3.2 receives Report Info or Selected Archived Jobs and sorts the received records according to sorting criteria. Module S1.3.2 is specified in MODULE SPECIFICATIONS set forth below.

Outputs from reportInfoRetrieve module S1.3.2 are Job Record and User Profile. Inputs to module S1.3.2 are Sort Criteria, Report Info, and Selected Archived Jobs.

caCalculation module S1.3.3 performs necessary calculations for cost allocation reports for VMM's and DJ's. Module S1.3.3 is specified in MODULE SPECIFICATIONS set forth below.

The output of caCalculation module S1.3.3 is Cost Allocation Record. Inputs to module S1.3.3 are: Total Cost, Dictation Unit Cost, Voice Mail Unit Cost, and Weighting Factors.

FieldSelection module S1.3.4 receives records and selects and orders the required fields for output. Module 1.3.4 is specified in MODULE SPECIFICATIONS set forth below.

Inputs to fieldSelection module S1.3.4 are: Required Fields, Order of Fields, Cost Allocation Record, Job Record, and User Profile. The output of fieldSelection module S1.3.4 is Report Record.

ReportFormatter module S1.3.5 formats Report Records into report pages and outputs the formatted reports to spooler S1.4. Module S1.3.5 is specified in MODULE SPECIFICATIONS set forth below.

Figure 11:
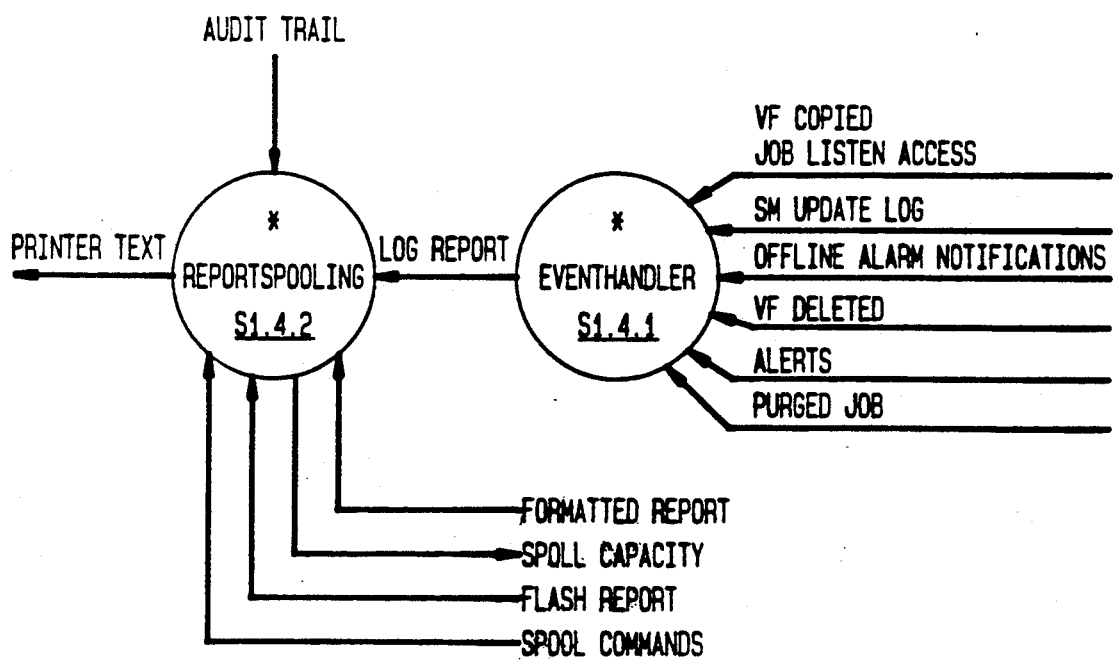

FIG. 11 further decomposes spooler module S1.4 into eventHandler module S1.4.1 and reportSpooling module S1.4.2.

EventHandler module S1.4.1 receives system events to be logged and formats them into a log report. Module S1.4.1 is specified in MODULE SPECIFICATIONS set forth below.

The output of eventHandler S1.4.1 is Log Report. The inputs to eventHandler module S1.4.1 are: VF Copied, Job Listen Access, SM Update Log, Offline Alarm Notifications, VF Deleted, Alerts, and Purged Job.

ReportSpooling module S1.4.2 receives various reports, and prioritizes and spools them to printer 116. Module S1.4.2 is responsive to Audit Trail to determine if an audit trail should be printed and to commands from the Supervisor to control printing. Module S1.4.2 is specified in MODULE SPECIFICATIONS set forth below.

The outputs of reportSpooling module S1.4.2 are Printer Text to Printer 116 and Spool Capacity. Inputs are: Audit Trail, Log Report, Formatted Report, Flash Report, and Spool Command.

Figure 12:
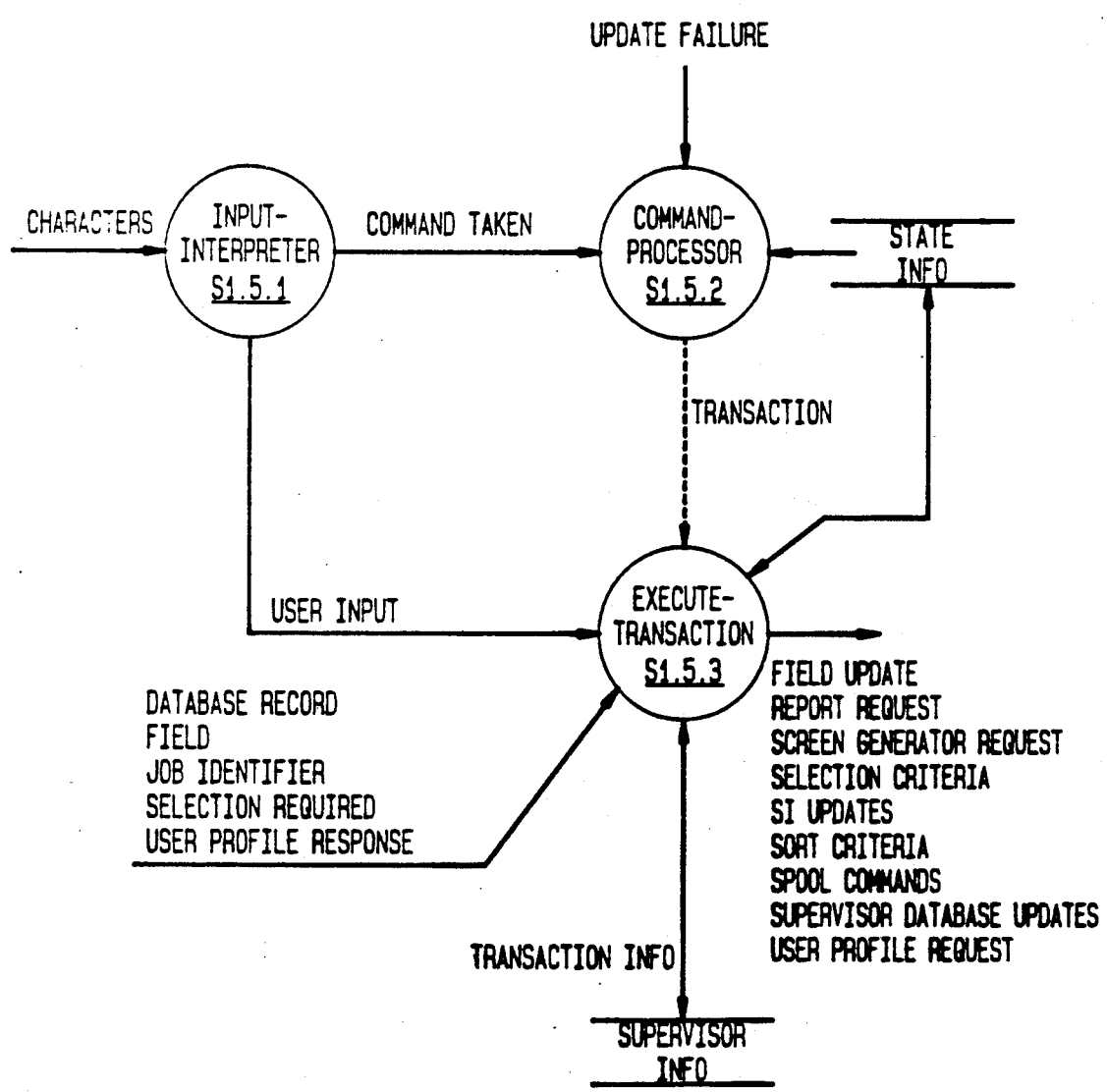

FIG. 12 further decomposes SupervisorController module 1.5 into inputInterpreter module S1.5.1, commandProcessor module S1.5.2 and executeTranscation module S1.5.3.

InputInterpreter module S1.5.1 collects Characters from Supervisory Station 110 and determines proper data values and command input tokens. Module S1.5.1 is specified in MODULE SPECIFICATIONS set forth below.

Outputs of input Interpreter S1.5.1 are Command Token and User Input and the input is Characters.

CommandProcessor module 1.5.2 interprets the Supervisor input (i.e. Command Token) and determines which function to perform, and invokes module S1.5.3 to execute the identified transaction. Module S1.5.2 is specified in MODULE SPECIFICATIONS set forth below.

The output of commandProcessor module S1.5.2 is Transaction, which identifies the transaction to be executed. The inputs are Command Token, Update Failure, and State Info (from the State Info data bank).

ExecuteTransaction module S1.5.3 executes transactions identified by module S1.5.2 and updates the state information with the current transaction status and function state. Outputs of executeTransaction module S1.5.3 are: Transaction Info (to Supervisor Info data bank), State Info (to State Info data bank), Field Update, Report Request, Screen Genertor Request, Selection Criteria, SI Updates, Sort Criteria, Spool Commands, Supervisor Database Updates, and User Profile Request. Inputs are: Transaction Info and State Info (from their respective data banks) and User Input, Database Record, Field, Job Identifier, Selection Required, User Profile Response, and Transaction. As noted Transaction transfers control to module S1.5.3 to execute the identified transaction.

FIGS. 13-20 further decompose module 1.5.3 into executeJobRecordTransaction module S1.5.3.1, executePoolTransaction S1.5.3.2, executeReportTransaction S1.5.3.3 executeUserProfileTransaction S1.5.3.4 executeSystemOpsTransaction S1.5.3.5, executeSupportTransaction module S1.5.3.6, executeInterruptTransaction S1.5.3.7, and executeEditTransaction module S1.5.3.8.

Figure 13:
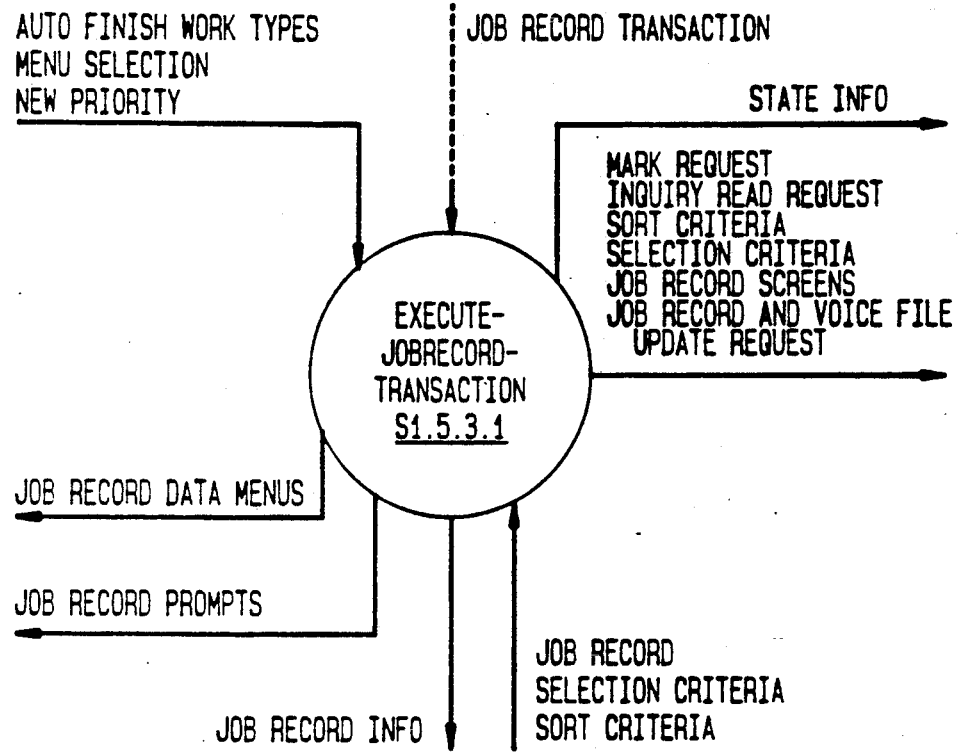

FIG. 13 shows executeJobRecordTransaction module S1.5.3.1, which executes a Job Record Transaction. Module S1.5.3.1 is specified in MODULE SPECIFICATIONS set forth below.

Outputs from modules 1.5.3.1 are: State Info, Mark Request, Inquiry Read Request, Sort Criteria, Selection Criteria, Job Record Screens, Job Record Request, Voice File Update Request, Job Record Prompts, and Job Record Data Menus. A Job Record Transaction input transfers control to modules 1.5.3.1. Other inputs are: Auto Finish Work Types, Menu Selection, New Priority, Job Record, Selection Criteria, and Sort Criteria.

Figure 14:
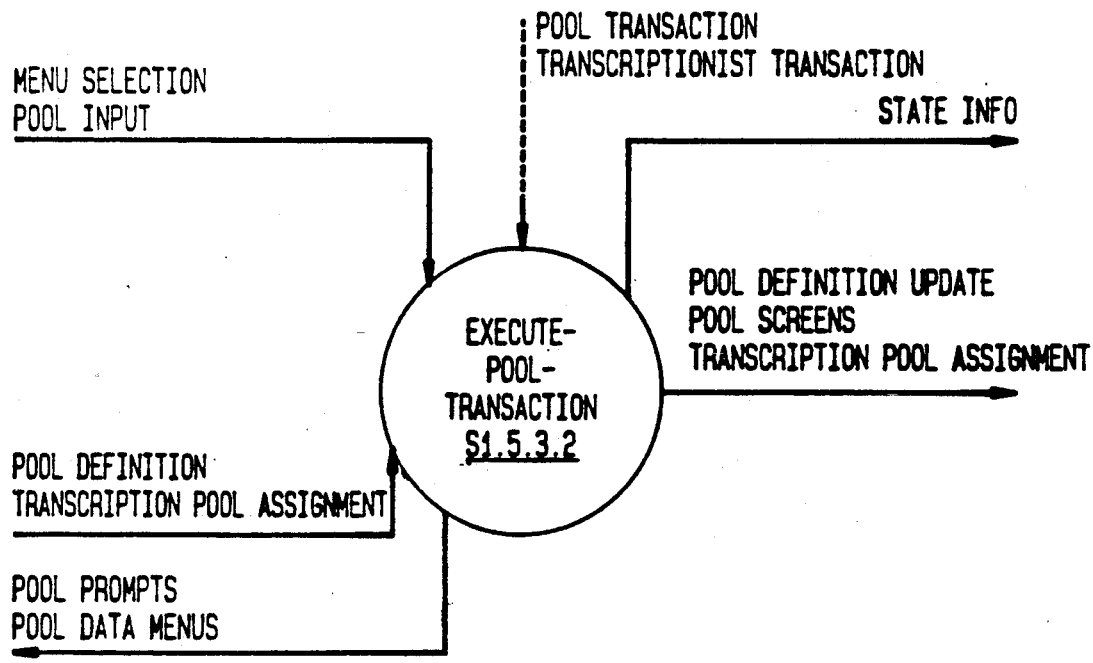

FIG. 14 shows executePoolTransaction module S1.5.3.2, which executes a Pool Transaction. Module S1.5.3.2 is specified in MODULE SPECIFICATIONS set forth below.

Outputs of module S1.5.3.2 are: State Info, Pool Definition Update, Pool Screens, Transcription Pool Assignment, Pool Prompts, and Pool Data Menus. A Pool Transaction or a Transcriptionist Transaction transfers control to modules 1.5.3.2. Other inputs are: Menu Selection, Pool Input, Pool Definition, and Transcription Pool Assignment.

Figure 15:
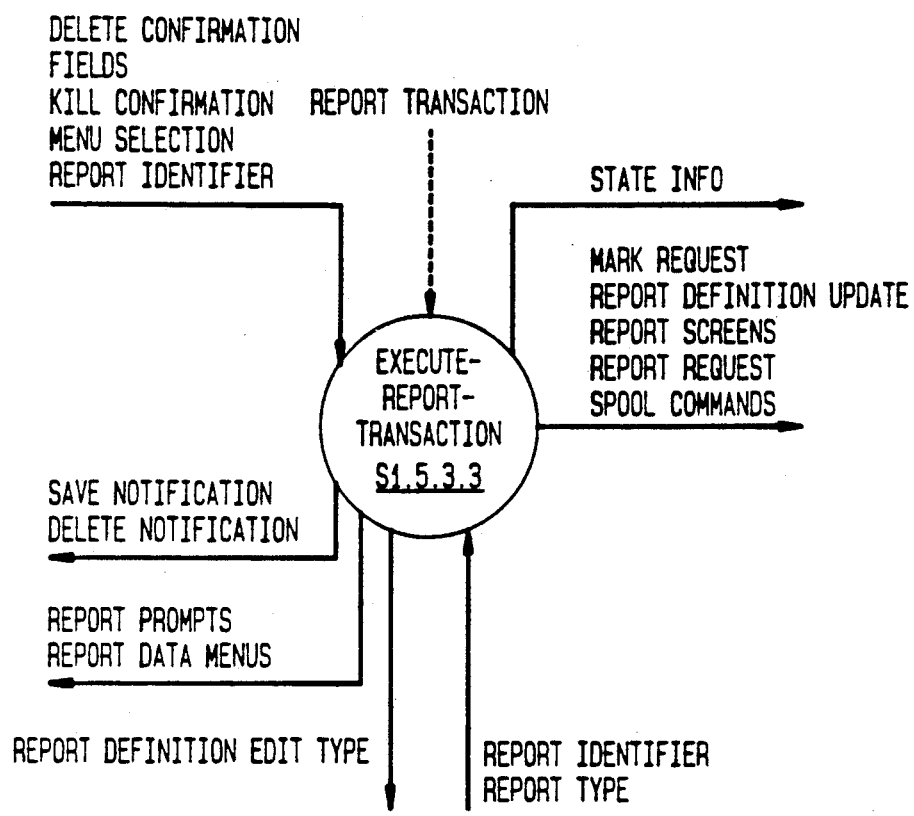

FIG. 15 shows executeReportTransaction module S1.5.3.3, which executes a Report Transaction. Module S1.5.3.3 is specified in MODULE SPECIFICATIONS set forth below.

Outputs from module S1.5.3.3 are: State Info, Mark Request Report Definition Update Report Screens, Report Request, Spool Commands, Report Definition Edit type, Report Prompts, Report Data Menus, Save Notification, and Delete Notification. A Report Transaction transfers control to execute Report Transaction S1.5.3.3. Other inputs are: Report Identifier, Report Type, Delete Confirmation, Fields, Kill Confirmation, Menu Selection, and Report Identifier.

Figure 16:
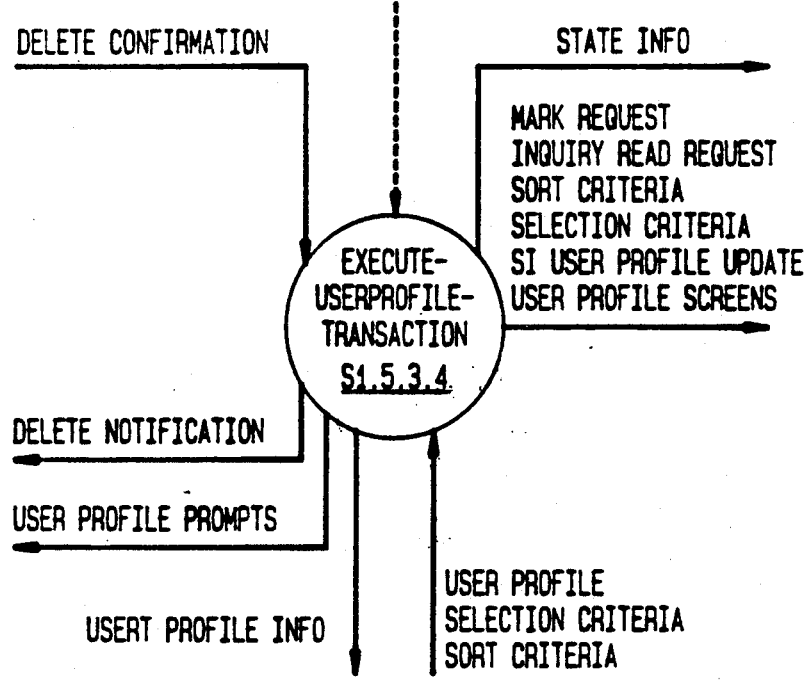

FIG. 16 shows executeUserProfileTransaction module S1.5.3.4, which executes a User Profile Transaction. Module S1.5.3.4 is specified in MODULE SPECIFICATIONS set forth below.

Outputs of executeUserProfileTransaction module S1.5.3.4 are: State Info, Mark Request, Inquiry Read Request, Sort Criteria, Selection Criteria, SI User Profile Update, User Profile Screens, User Profile Info, User Profile Prompts, and Delete Notification. A User Profile Transaction transfers control to module S1.5.3.4. Other inputs are: User Profile, Selection Criteria, Sort Criteria, and Delete Confirmation.

Figure 17:
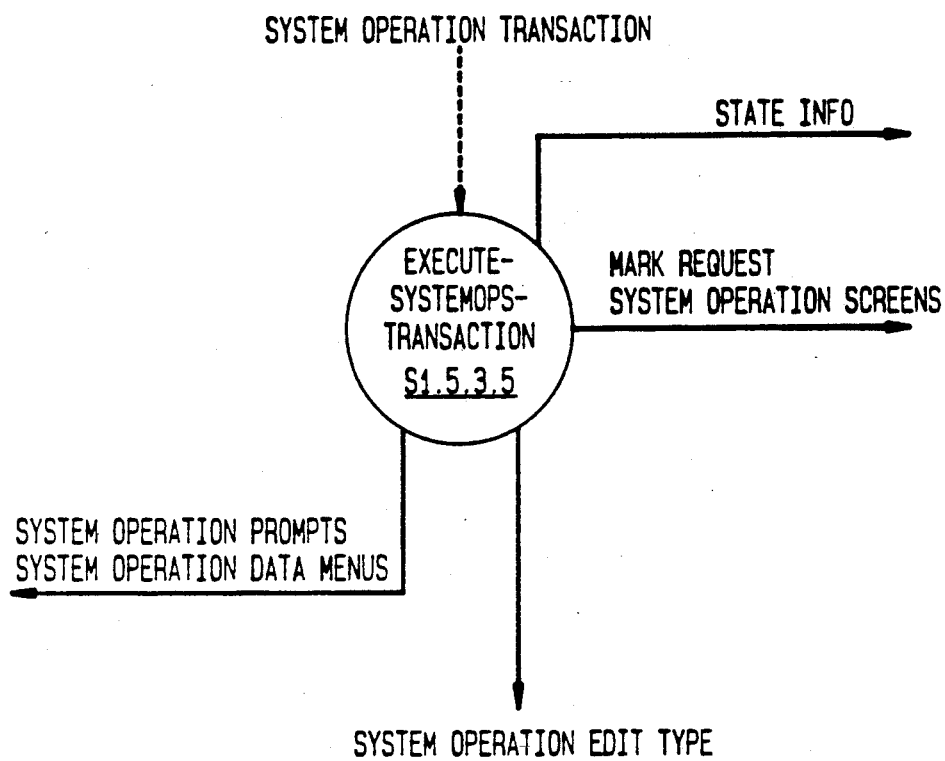

FIG. 17 shows executeSystemOpsTransaction module S1.5.3.5, which executes a System Ops Transaction. Module S1.5.3.5 is specified in MODULE SPECIFICATIONS set forth below.

Outputs of module S1.5.3.5 are: State Info, Mark Request, System Operation Screens, System Operation Edit Type, System Operation Prompts, System Operation Data Menus. A System Operation Transaction transfers control to module S1.5.3.5.

Figure 18:
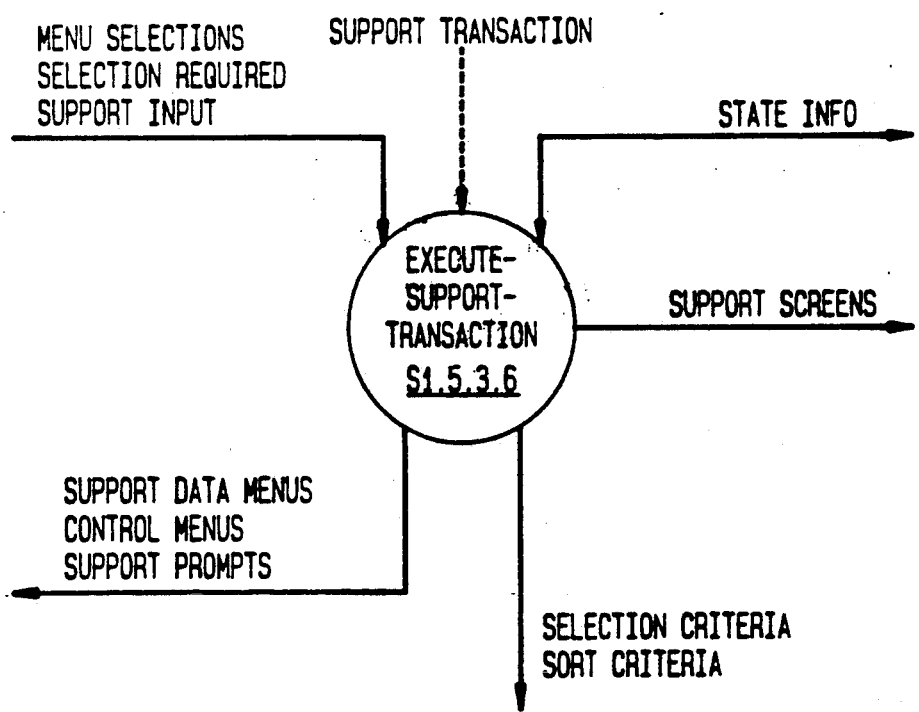

FIG. 18 shows executeSupportTransaction module S1.5.3.6 which executes a Support Transaction. Module S1.5.3.6 is specified in MODULE SPECIFICATIONS set forth below.

Outputs of executeSupportTransaction module S1.5.3.6 are: State Info, Support Screens, Selection Criteria, Sort Criteria, Support Data Menus, Control Menus, and Support Prompts. A Support Transaction transfers control to module 1.5.3.6. State Info is also an input to module 1.5.3.6.

Figure 19:
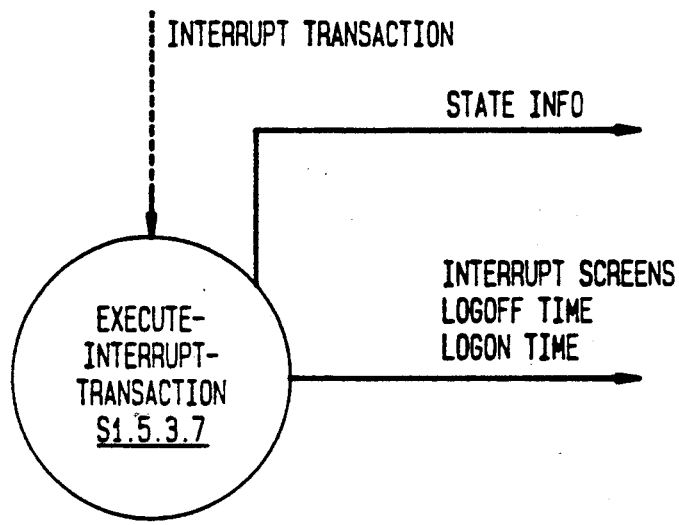

FIG. 19 shows executeInterruptTransaction module S1.5.3.7, which executes an Interrupt Transaction. Module S1.5.3.7 is specified in MODULE SPECIFICATIONS set forth below.

Outputs of executeInterruptTransaction module S1.5.3.7 are: State Info, Interrupt Screens, log-off Time, and Log-on Time. An Interrupt Transaction transfers control to module S1.5.3.7.

Figure 20:
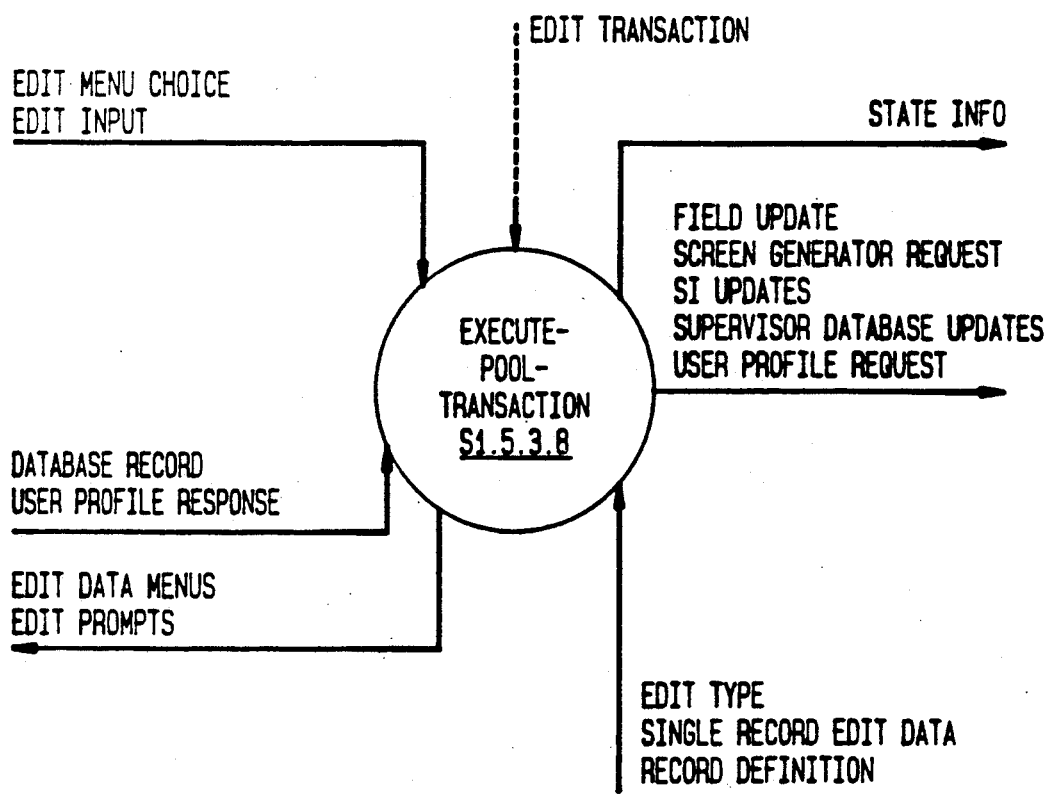

FIG. 20 shows executeEditTransaction module S1.5.3.8, which executes an Edit Transaction. Outputs of executeEditTransaction module S1.5.3.8 are: State Info, Field Update, Screen Generator Request, SI Updates, Supervisor Database Updates, User Profile Request, Edit Data Menus, and Edit Prompts. Control is transferred to module S1.5.3.8 by an Edit Transaction. Other inputs are: Edit Type, Single Record Edit Data, Record Definition, Database Record, User Profile Response, Edit Menu Choice, and Edit Input.

Figure 21:
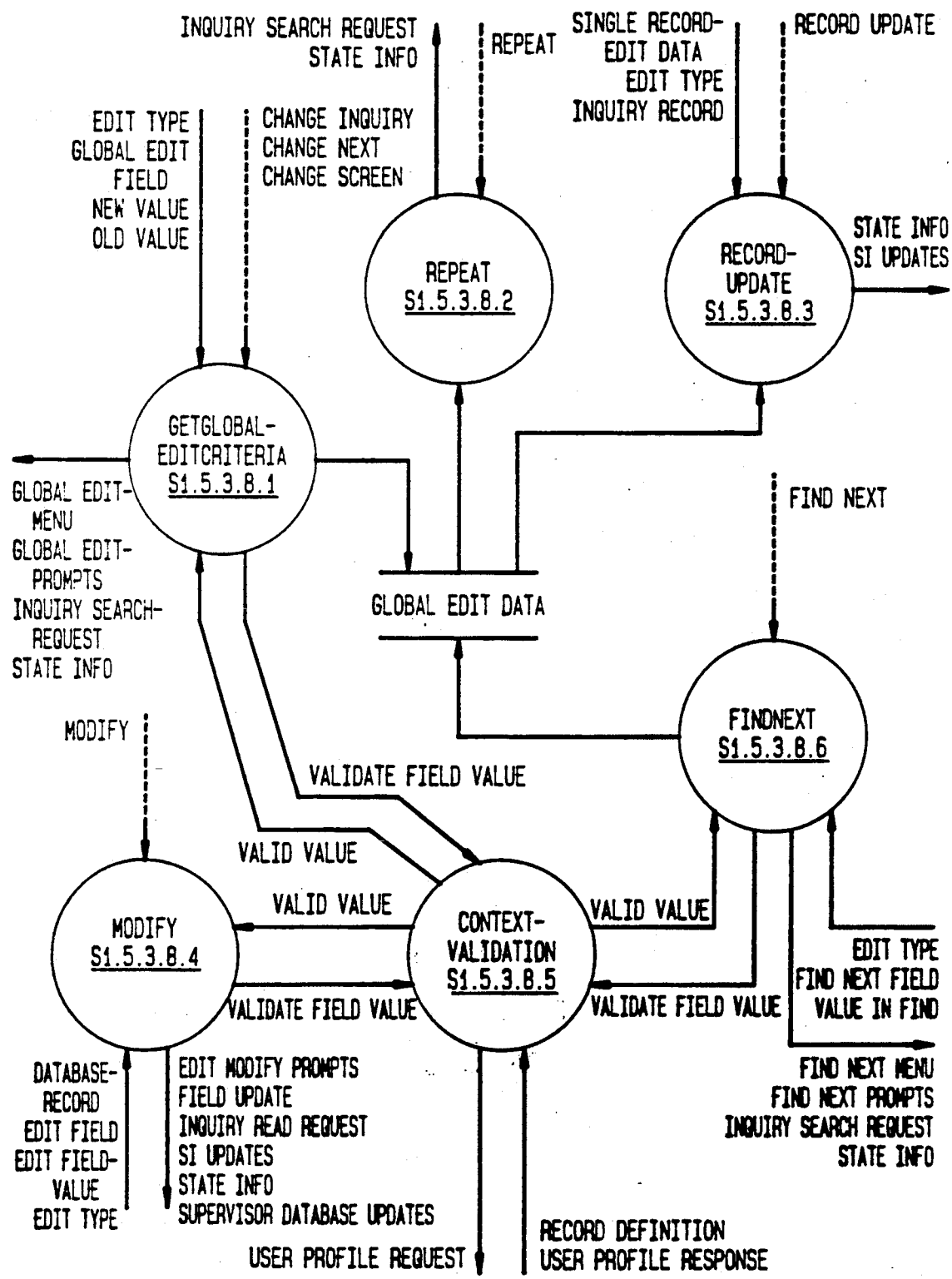

FIG. 21 further decomposes executeEditTransaction module S1.5.3.8 into getGlobalEditCriterial module S1.5.3.8.1, repeat module S1.5.3.8.2, recordUpdate module S1.5.3.8.3, modify module S1.5.3.8.4, contextValidation module S1.5.3.8.5, and findNext module S1.5.3.8.6.

GetGlobalEditCriteria module S1.5.3.8.1 requests the Supervisor to enter data necessary to perform a global update. Module S1.5.3.8.1 is specified in MODULE SPECIFICATIONS set forth below.

Outputs from module S1.5.3.8.1 are: Global Edit Data (to Global Edit Data data store), Validate Field Value, Global Edit Menu, Global Edit Prompts, Inquiry Search Request, and State Info. Control is transferred to module S1.5.3.8.1 by a CHANGE INQUIRY, CHANGE NEXT, or CHANGE SCREEN command. Other inputs are: Valid Value, Edit Type, Global Edit Field, New Value and Old Value.

Repeat module S1.5.3.8.2 sends the last global edit command data that was entered by the Supervisor. Module S1.5.3.8.2 is specified in MODULE SPECIFICATIONS set forth below.

Outputs of repeat module S1.5.3.8.2 are Inquiry Search Request and State Info. Control is transferred to module S1.5.3.8.2 by a REPEAT command. Global Edit Data from a data store is also an input to module S1.5.3.8.2.

RecordUpdate module S1.5.3.8.3 performs updates on Inquiry Records and sends update messages to the appropriate database in systemManager module 2. Module 1.5.3.8.3 is specified in MODULE SPECIFICATIONS set forth below.

Outputs of module S 1.5.3.8.3 are State Info and SI Updates. Control is passed to module S 1.5.3.8.3 by a RECORD UPDATE command. Other inputs are Global Edit Data (from a data store), Single Record Edit Data, Edit Type, and Inquiry Record.

Modify module S1.5.3.8.4 handles modifications of fields displayed on the screen of CRT 112 and sends an update message to the appropriate database after the Supervisor finishes updating the screen. Module S1.5.3.8.4 is specified in MODULE SPECIFICATIONS set forth below.

Outputs of modify module S1.5.3.8.4 are: Validate Field Value, Edit Modify Prompts, Field Update, Inquiry Read Request, SI Updates, State Info, and Supervisor Database Updates. Control is transferred to modify module S1.5.3.8.4 by a MODIFY command. Other inputs are: Database Record, Edit Field, Edit Field Value, Valid Value and Edit Type.

ContextValidation module S1.5.3.8.5 verifies that the Field Value entered by the Supervisor is within legal bounds. Module S1.5.3.8.5 is specified in MODULE SPECICATIONS set forth below.

Outputs of context Validation module S1.5.3.8.5 are Valid Value and User Profile Request. Inputs are Validate Field Value, Record Definiton, and User Profile Response.

FindNext module S1.5.3.8.6 requests that the Supervisor enter the data necessary to perform a FIND NEXT command. Module S1.5.3.8.6 is specified in MODULE SPECIFICATIONS set forth below.

Outputs of module S1.5.3.8.6 are: Global Edit Data to a data store, Validate Field Value, Find Next Menu, Find Next Prompts, Inquiry Search Request, and State Info. Module S1.5.3.8.6 is invoked by a FIND NEXT command. Other inputs are Valid Value Edit Type, Find Next Field, and Value To Find.

Figure 22:
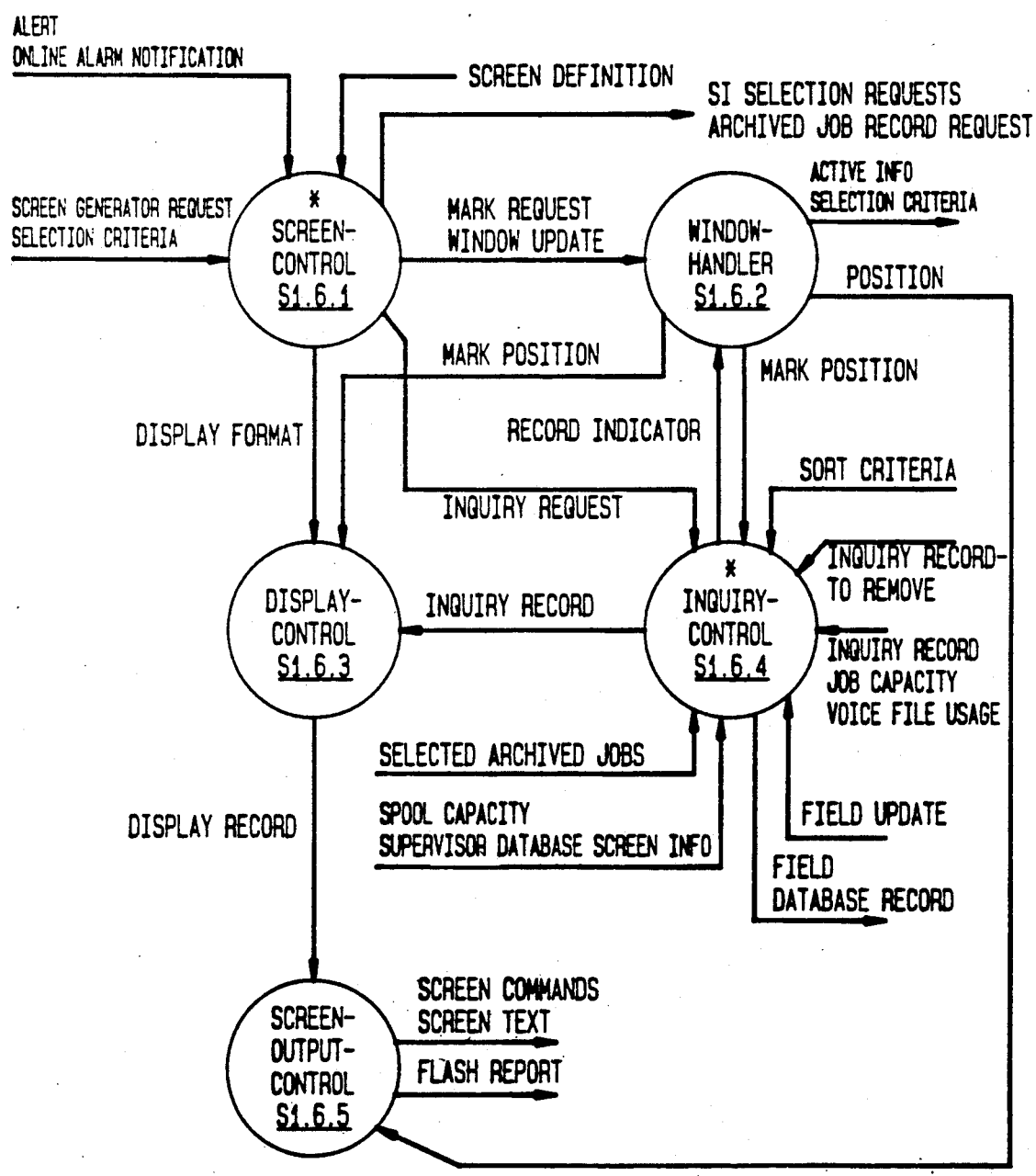

FIG. 22 further decomposes screenGenerator module S1.6 into screenControl module S1.6.1, windowHandler module S1.6.2, displayControl module S1.6.3, inquiryControl module S1.6.4, and screenOutputControl module S1.6.5.

ScreenControl module S1.6.1 controls execution of Screen Generator Request, Requests inquiry data and coordinates the screen generator components. Module S1.6.1 is specified in MODULE SPECIFICATIONS set forth below.

Outputs of screenControl module S1.6.1 are: SI Selection Requests, Archived Job Record Request, Mark Request, Window Update, Inquiry Request, and Display Format. Inputs to module S1.6.1 are: Alert, Online Alarm Notification, Screen Definition, Screen Generator Request, and Selection Criteria.

WindowHandler module S1.6.2 maintains the current window definitions for each of the screen windows, which includes informing other modules of what is currently displayed on the screen and servicing Mark Request. Module S1.6.2 is specified in MODULE SPECIFICATIONS set forth below.

Outputs of module S1.6.2 are: Active Info, Selection Criteria, Position, and Mark Position. Inputs are Mark Request, Window Update, and Record Indicator.

DisplayControl module S1.6.3 converts an Inquiry Record to the format required for display. Module S1.6.3 is specified in MODULE SPECIFICATIONS set forth below.

The output of displayControl module S1.6.3 is Display Record. Inputs are Display Format, Mark Position, and Inquiry Record.

InquiryControl module S1.6.4 receives Inquiry Records and maintains a display inquiry buffer. Records are output as requested by display Control S1.6.3 and Supervisor Control S 1.5. Module S1.6.4 is specified in MODULE SPECIFICATIONS set forth below.

Outputs of module S1.6.4 are: Record Indicator, Field, Database Record, and Inquiry Record. Inputs are: Inquiry Request, Mark Position, Sort Criteria, Inquiry Record To Remove, Inquiry Record, Job Capacity, Voice File Usage, Field Update, Spool Capacity, Supervisory Database Screen Info, and Selected Archived Jobs.

ScreenOutputControl module S1.6.5 directs the display output to the proper location on CRT 112 and generates Flash Reports. Module S1.6.5 is specified in MODULE SPECIFICATIONS set forth below.

Outputs of module S1.6.5 are Screen Commands and Screen Text to CRT 112, and Flash Report. Inputs are Display Record and Position.

Figure 23:
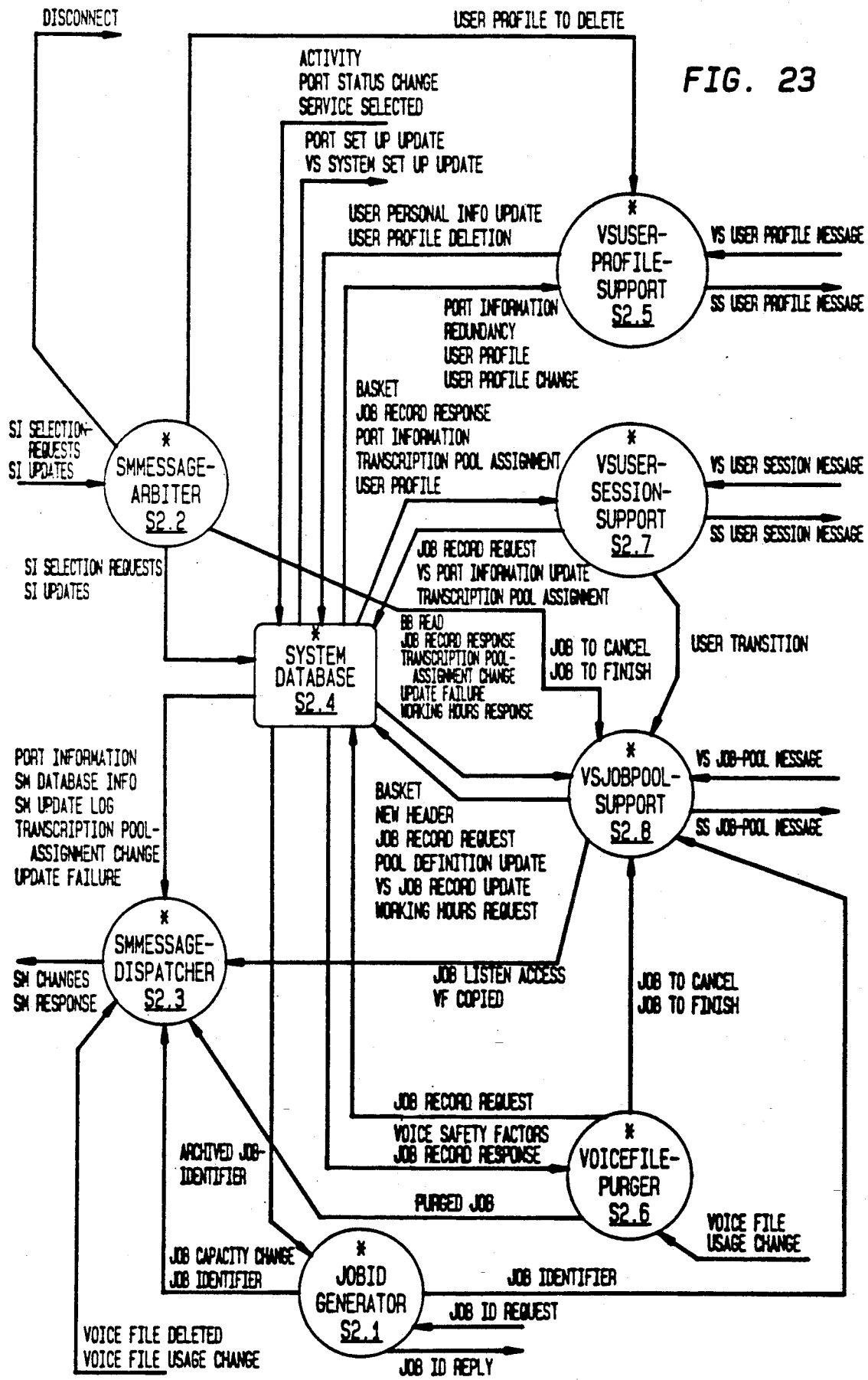

FIG. 23 further decomposes systemManager module S2 into jobIDGenerator module S2.1, smMessageArbiter module S2.2, SM smMessageDispatcher module, S2.3 systemDataBase module 2.4, vsUserProfileSupport module S2.5, voiceFilePurger module S2.6, vsUserSessionSupport module S2.7, and vsJob PoolSupport module S2.8.

JobIDGenerator module S2.1 distributes available job identifiers. Module S2.1 is specified in MODULE SPECIFICATIONS set forth below.

The outputs of module S2.1 are: Job Capacity Change, Job Identifier, and Job ID Reply. Inputs are Job ID Request and Archived Job Identifier.

smMessageArbiter module S2.2 receives messages from SupervisorInterface module S1 and distributes them to appropriate system Manager S2 submodules and voiceSession V0 submodules. Module S2.2 is specified in MODULE SPECIFICATIONS set forth below.

Outputs from module S2.2 are: Disconnect, User Profile To Delete, Job To Cancel, Job To Finish, SI Selection Request, and SI Updates.

smMessage Dispatcher module S2.3 collects messages from system Manager S2 and voice Session V0 and conveys them to SupervisorInterface S1. Module S2.3 is specified in MODULE SPECIFICATIONS set forth below.

Outputs of module S2.3 are SM Changes and SM Response. Inputs are: Port Information SM Database Info, SM Update Log, Transcription Pool Assignment Change, Update Failure, Job Listen Access, VF Copied, Purged Job Job Capacity Change, Job Identifier, Voice File Deleted, and Voice File Usage Change.

SystemDataBase module S 2.4 performs database management functions supporting Voice Session V0 and Supervisor Session S0.

Outputs of systemDataBase module S2.4 are: Port Information, SM Database Info, SM Update Log, Transcription Pool Assignment Change, Update Failure, Archieved Job Identifier, Voice Safety Factors, Job Record Response, DB Read, Job Record Response, Transcription Pool Assignment Change, Update Failure, Working Hours Response Basket, Job Record Response, Port Information, Transcription Pool Assignment, User Profile, Port Set Up Update, Redundancy, User Profile User Profile Change, and VS System Set Up Update. Inputs are: SI Selection Request, SI Updates, J Record Request, Basket, New Header Pool Definition Update, VS Job Record Update, Working Hours Request, VS Port Information Update, Transcription Pool Assignment, User Personal Info Update, User Profile Deletion, Activity Port Status Change and Service Selected.

vsUserProfileSupport module S2.5 handles changes to the User Profile involving Voice Session V0. Module S2.5 is specified in MODULE SPECIFICATIONS set forth below.

Outputs of module S2.5 are SS User Profile Message, User Personal Info Update, and User Profile Deletion. Inputs are: Port Information, Redundancy, User Profile, User Profile Change, User Profile To Delete, and DS User Profile Message.

VoiceFilePurger module S2.6 compares the currently available amount of voice storage to a limit set by the Supervisor and request deletion of Voice Files when necessary. Module S2.6 is specified in MODULE SPECIFICATIONS set forth below.

Outputs of module S2.6 are: Job To Cancel, Job To Finish, Job Record Request, and Purged Job. Inputs are: Voice Safety Factors, Job Record Response, and Voice File Usage Change.

vsUserSessionSupport module S2.7 handles changes to a user's connection to Voice Session V0. Module S2.7 is specified in MODULE SPECIFICATIONS set forth below.

Outputs of module S2.7 are: Job Record Request, VS Port Information Update, Transcription Pool Assignment, and SS User Session Message. Inputs are: Basket, Job Record Response, Port Information, Transcription Pool Assignment, User Profile, and VS User Session Message.

vsJobPoolSupport module S2.8 handles changes to jobs and pools involving Voice Session V0.

Outputs of module S2.8 are: SS Job-pool Message, Basket, New Header, Job Record Request, Pool Definition Update, VS Job Record Update, Working Hours Request, Job Listen Access, and VF Copied. Inputs are: DB Read, Job Record Response, Transcription Pool Assignment Change, Update Failure, Working Hours Response, Job To Cancel, Job To Finish, Job Indentifier, User Transistion, and VS Job-pool Message.

Figure 24:
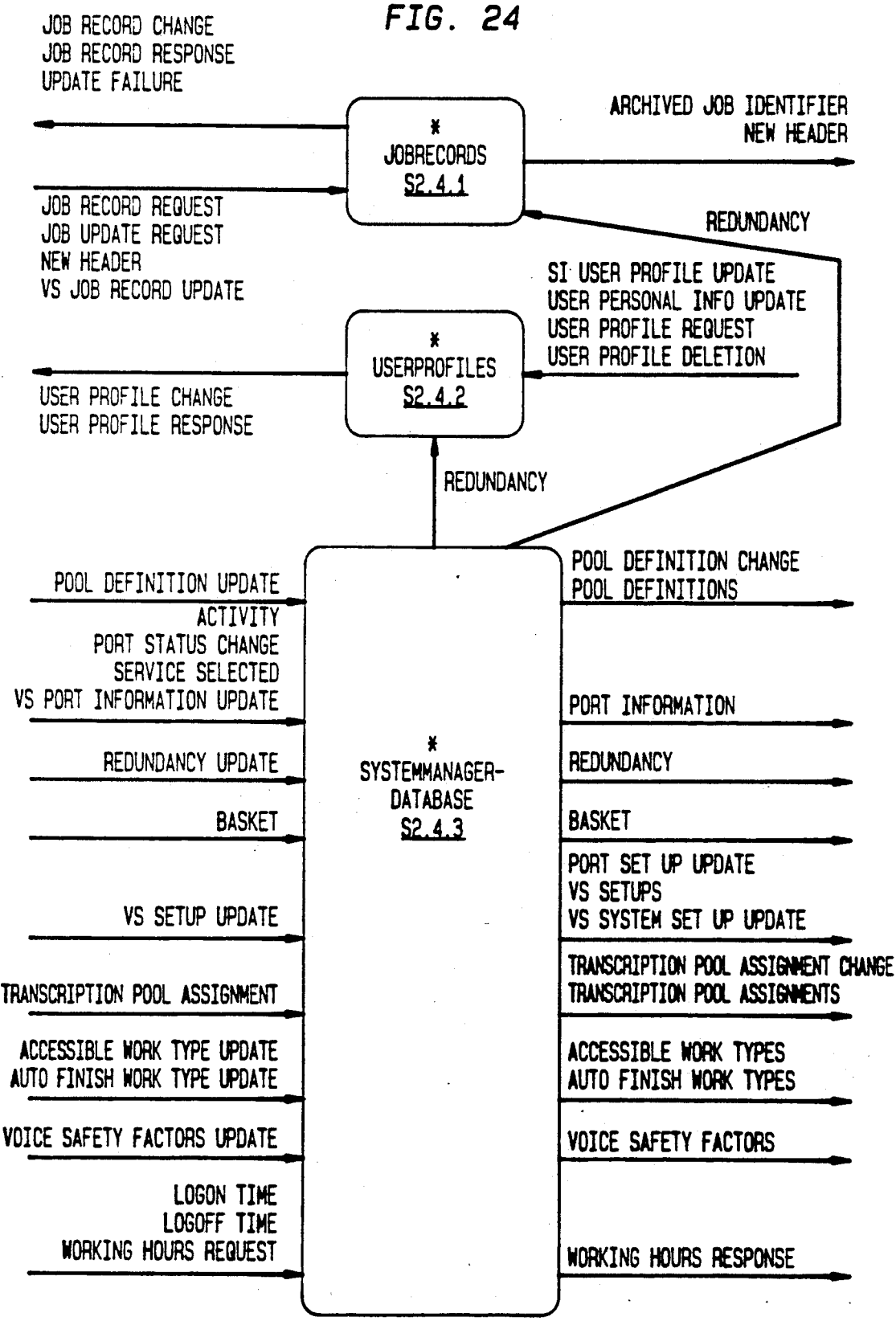

FIG. 24 further decomposes systemDataBase module S2.4 into jobRecords module S2.4.1, userProfiles module S2.4.2, and systemManagerDataBase S2.4.3.

JobRecords module S2.4.1 performs all job record database functions.

Outputs of module S2.4.1 are: Job Record Change, Job Record Response, Update Failure, Archived Job Identifier, and New Header. Inputs are: Job Record Request, Job Update Request, New Header, VS Job Record Update, and Redundancy.

UserProfiles module S2.4.2 performs all user profile database functions.

The outputs of module S2.4.2 are User Profile Change and User Profile Response. Inputs are: SI User Profile Update, User Personal Info Update, User Profile Request, User Profile Deletion, and Redundancy.

SystemManagerDataBase module S2.4.3 performs database functions for: Accessible Work Types, Auto Finish Work Types, Baskets, Pool Definitions, Port Information, Redundancy, Transcription Pool Assignments, Voice Safety Factors, VS Set Ups, and Working Hours. Module 2.4.3 is specified in MODULE SPECIFICATIONS set forth below.

Outputs of module S2.4.3 are: Redundancy, Pool Definition Change, Port Information, Basket, Port Set Up Update, VS Set Ups, VS System Set Up Update, Transcription Pool Assignment Change, Transcription Pool Assignments, Accessible Work Types, Auto Finish Work Types, Voice Safety Factors, and Working Hours Response. Inputs are: Pool Definition Update, Activity, Port Status Change, Service Selected, VS Port Information Update, Redundancy Update, Basket, VS Set Up Update, Transcription Pool Assignment, Accessible Work Type Update, Auto Finish Work Type Update, Voice Safety Factors Update, Log-on Time, log-off Time, and Working Hours Request.

Figure 25:
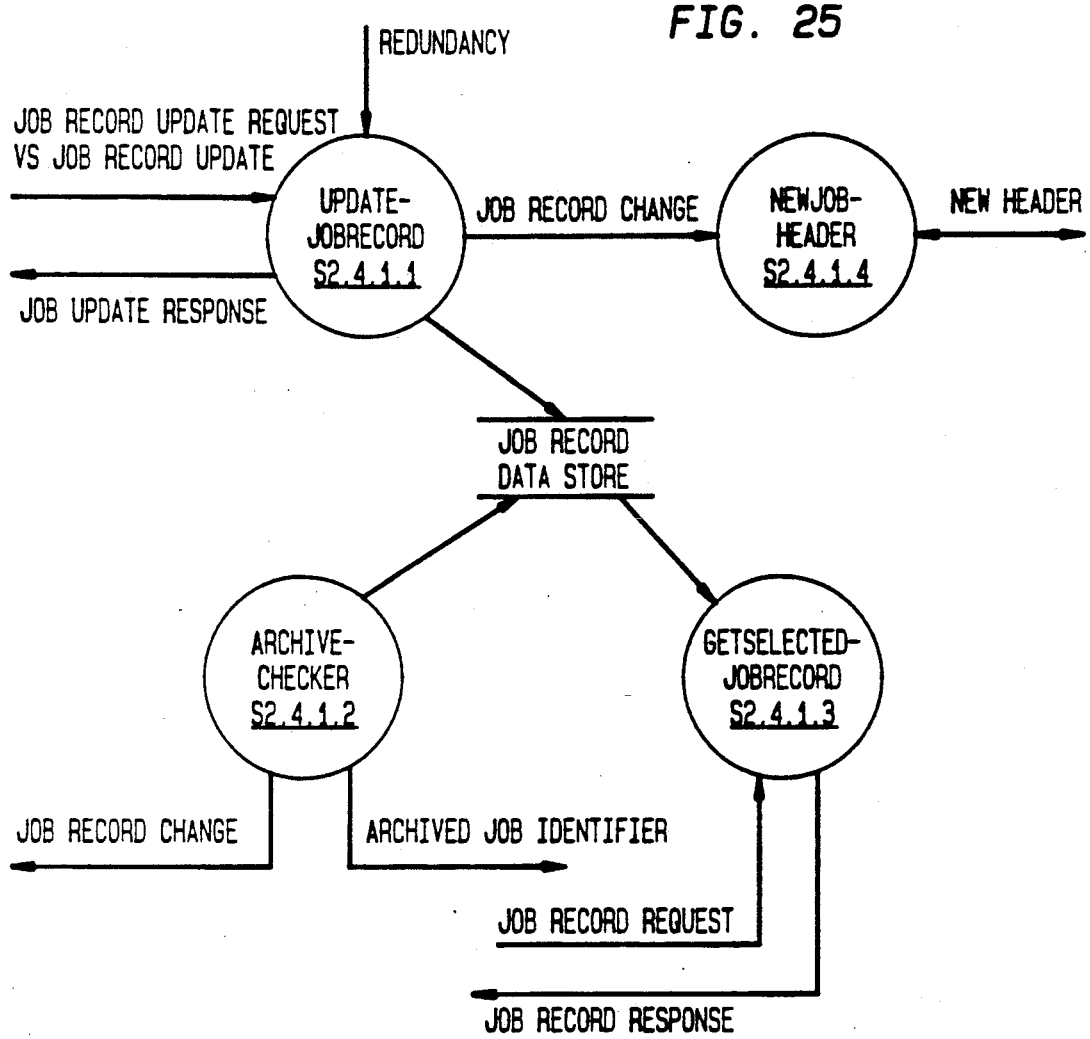

FIG. 25 further decomposes jobRecords module S2.4.1 into updateJobRecord module S2.4.1.1, archiveChecker module S2.4.1.2, getSelectedJobRecord module S2.4.1.3, and new jobHeader module S2.4.1.4.

UpdateJobRecord module S2.4.1.1 performs updates for job records. Module S2.4.1.1 is specified in MODULE SPECIFICATIONS set forth below.

Outputs of module S2.4.1.1 are Job Update Response and Job Record Change. Module S2.4.1.1 also outputs updated Job Records To Job Records S2.4.1 data store.

Inputs to module S2.4.1 are: Redundancy, Job Record Update Request, and VS Job Record Update.

ArchiveChecker module S2.4.1.2 deletes all archivable Job Records from the database and sends them to archiver module S1.2. The archived Job ID will be sent to jobIDGenerator module S2.1. Module S2.4.1.2 is specified in MODULE SPECIFICATIONS set forth below.

Outputs from module S2.4.1.2 are Job Record Change and Archived Job Identifier. Module S2.4.1.2 continuously monitors the data store of the Job Record Data Base to identify archived Job Records and has "read for update" access to the data store.

GetSelectedJob Record module S2.4.1.3 selects all Job Records that meet the selected criteria. Module S2.4.1.3 is described in MODULE SPECIFICATIONS set forth below.

The output of module S2.4.1.3 is Job Record Response. The input is Job Record Request and the module has read access to the data store of the Job Record Data Base.

NewJobHeader module S2.4.1.4 tracks changes made to Ready Jobs and creates new job headers if necessary. Module S2.4.1.4 is specified in MODULE SPECIFICATIONS set forth below.

The output of module S2.4.1.4 is New Header. Inputs are Job Record Change and New Header.

Figure 26:
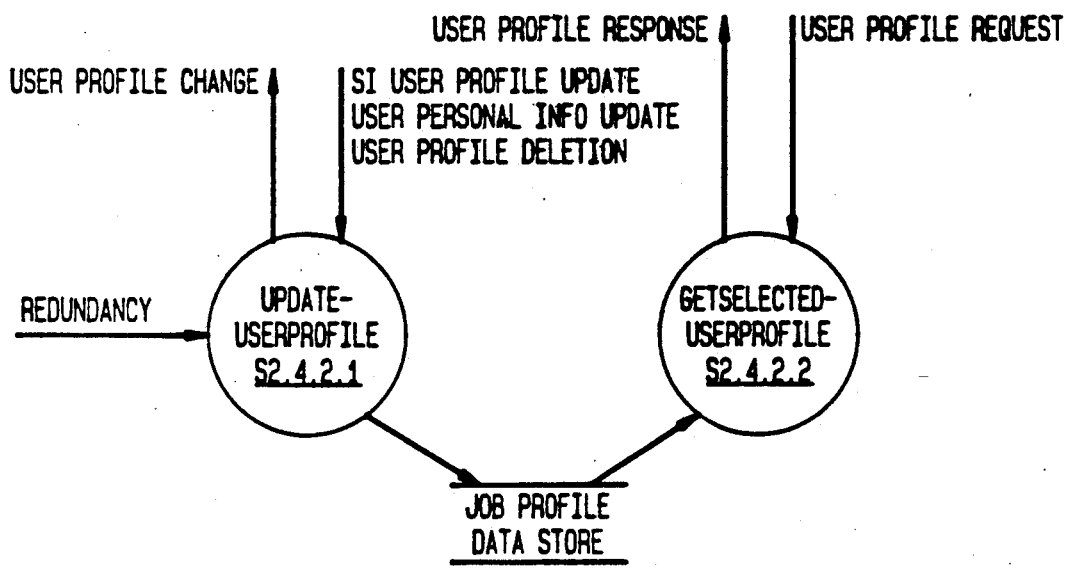

FIG. 26 shows the further decomposition of userProfileDataBase module S2.4.2 into updateUserProfile module S2.4.2.1 and get SelectedUserProfile module S2.4.2.2.

UpdateUserProfile module S2.4.2.1 updates User Profiles. Module S2.4.2.1 is specified in MODULE SPECIFICATIONS set forth below.

The output of module S2.4.2.1 is User Profile Change. The module also has write access to the data store of userProfileDataBase module S 2.4.2. Inputs are: SI User Profile Update, User Personal Info Update, and User Profile Deletion.

GetSelectedUserProfile module S2.4.2.2 selects all user profile records that meet the selected criteria. Module S2.4.2.2 is specified in MODULE SPECIFICATIONS set forth below.

The output of module S2.4.2.2 is User Profile Response. The Input is User Profile Request. The module also has read access to the data store of userProfileDataBase S2.4.2.

Figure 27:
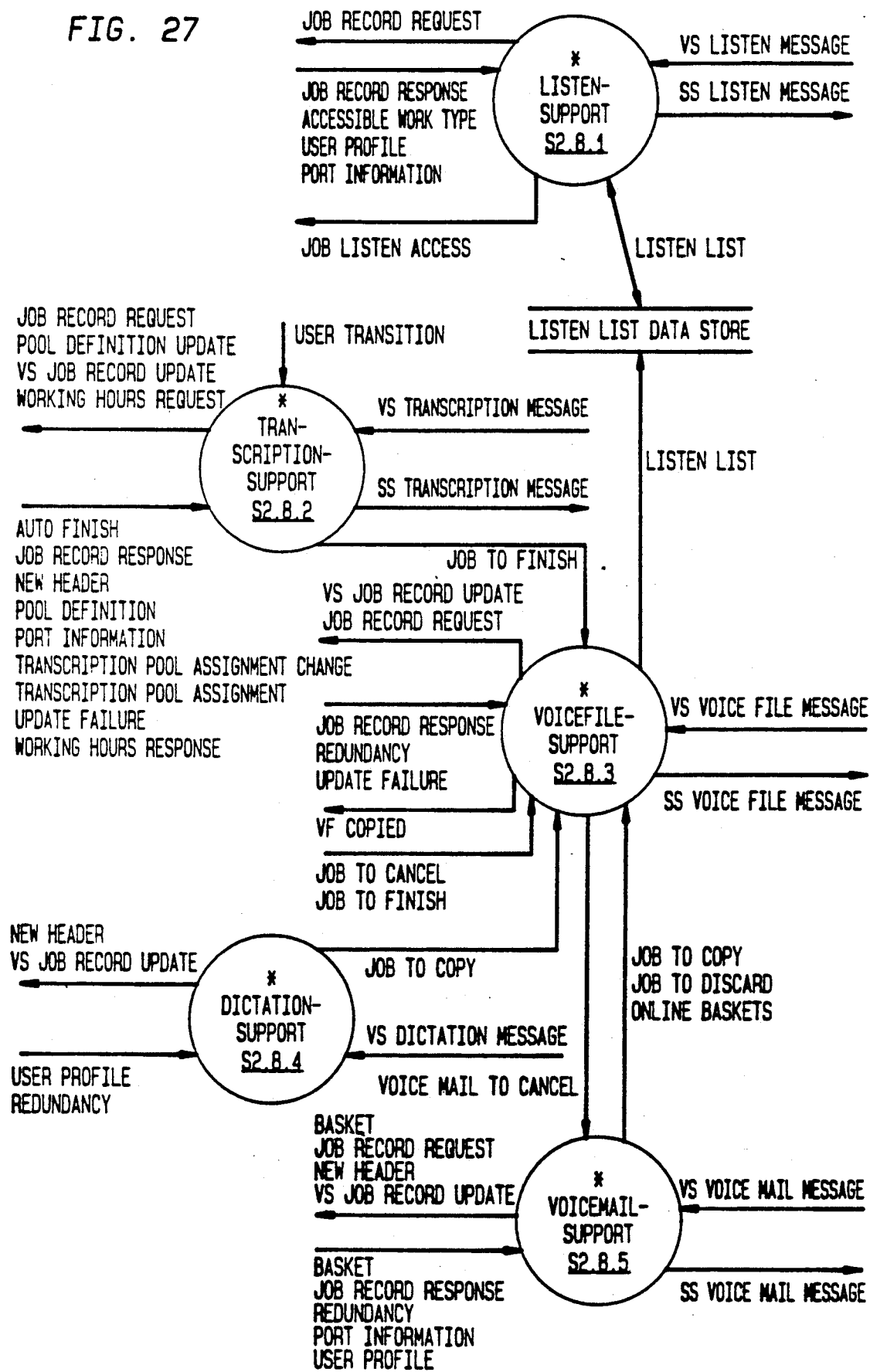

FIG. 27 shows the further decomposition of vsJobPoolSupport module S2.8 into listenSupport module S2.8.1 transcriptionSupport module S2.8.2 voiceFileSupport S2.8.3, dictationSupport module S2.8.4 and voiceMailSupport module S2.8.5.

ListenSupport module S2.8.1 supports the dictation service Review function of Voice Session V0. Module S2.8.1 is specified in MODULE SPECIFICATIONS set forth below.

Outputs of module S2.8.1 are: Job Record Request, Job Listen Access, Listen List, and SS Listen Message. Inputs are: Job Record Response, Accessible Work Type, User Profile, Port Information, VS Listen Message. The module also has read and write access to the Listen List Data Store.

TranscriptionSupport module S2.8.2 supports the transcription functions of Voice Session V0.

Outputs of module S2.8.2 are: Job Record Request, Pool Definition Update, VS Job Record Update, Working Hours Request, Job To Finish, and SS Transcription Message. Inputs are: User Transistion, Auto Finish, Job Record Response, New Header, Pool Definition, Port Information, Transcription Pool Assignment Change, Transcription Pool Assignment, User Profile, Working Hours Response, and VS Transcription Message.

VoiceFileSupport module S2.8.3 handles Voice File changes involving voiceSession V0. Module S2.8.3 is specified in MODULE SPECIFICATIONS set forth below.

The outputs of module S2.8.3 are: VS Job Record Update, Job Record Request, VF Copied, Voice Mail To Cancel, and SS Voice File Message. The module also has Write access to the Listen List Data Store. The inputs are: Job To Finish, Job Record Response, Redundancy, Update Failure, Job To Cancel, Job To Copy, Job To Discard, Online, Baskets, and VS Voice File Message.

DictationSupport module S2.8.4 supports the dictation functions of voiceSession V0. Module S2.8.4 is specified in MODULE SPECIFICATIONS set forth below.

The outputs of module S2.8.4 are: Job To Copy, New Header, and VS Job Record Update. The inputs are: User Profile Redundancy, VS Dictation Message.

VoiceMailSupport module S2.8.5 supports the Voice Mail functions of voiceSession module V0. Module S2.8.5 is specified in MODULE SPECIFICATIONS set forth below.

The outputs of module S2.8.5 are Job To Copy, Job To Discard, Online, Baskets, Basket, Job Record Request, New Header, VS Job Record Update, SS Voice Mail Message. The inputs are: Voice Mail To Cancel, Basket, Job Record Response, Redundancy, Port Information, User Profile, VS Mail Message.

Figure 28:
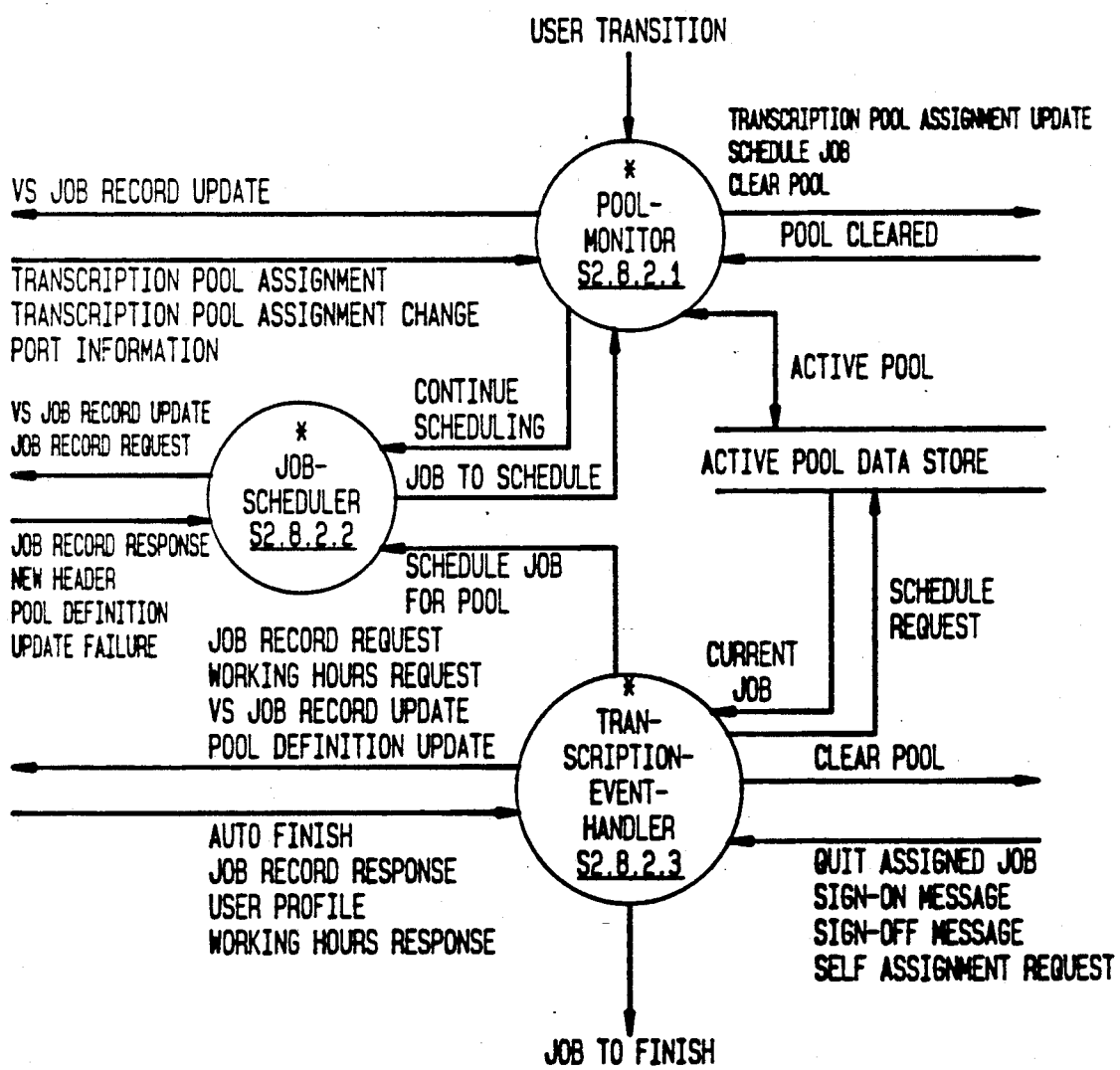

FIG. 28 shows the further decomposition of transcriptionSupport module S2.8.2 into poolMonitor module S2.8.2.1, jobScheduler module S2.8.2.2, and transcription Event Handler module S2.8.3.

PoolMonitor module 2.8.2.1 supports functions involving pools for voiceSession VO. Module 2.8.2.1 is specified in MODULE SPECIFICATIONS set forth below.

Outputs of module S2.8.2.1 are: Transcription Pool Assignment Update, Schedule Job, Clear Pool, Continue Scheduling, and VS Job Record Update. Inputs are: Transcription Pool Assignment, Transcription Pool Assignment Change, Port Information, Job To Schedule, Pool Cleared, and User Transistion. The module also has read and write access to the Active Pool data in the Active Pool Data Store.

JobScheduler module S2.8.2.2 schedules DJ's for pools according to their pool definitions. Module S2.8.2.2 is specified in MODULE SPECIFICATIONS set forth below.

Outputs of module S2.8.2.2 are: Job To Schedule, VS Job Record Update, and Job Record Request. Inputs are: Job Record Response, New Header, Pool Definition, Update Failure, Schedule Job For Pool, and Continue Scheduling.

TranscriptionEventHandler module 2.8.2.3 supports transcription events for Voice Session V0. Module S2.8.2.3 is specified in MODULE SPECIFICATIONS set forth below.

Outputs of module S2.8.2.3 are: Job To Finish, Clear Pool, Schedule Job For Pool, Job Record Request, Working Hours Request, VS Job Record Update, and Pool Definition Update. Inputs are: Auto Finish, Job Record Response, User Profile, Working Hours Response, Quit Assigned Job, Sign-On Message, Sign-Off Message, and Self Assignment Request. The module also has read access to the Current Job data in the Active Pool Data Store and write access to the Schedule Request data in that data store.

Figure 29:
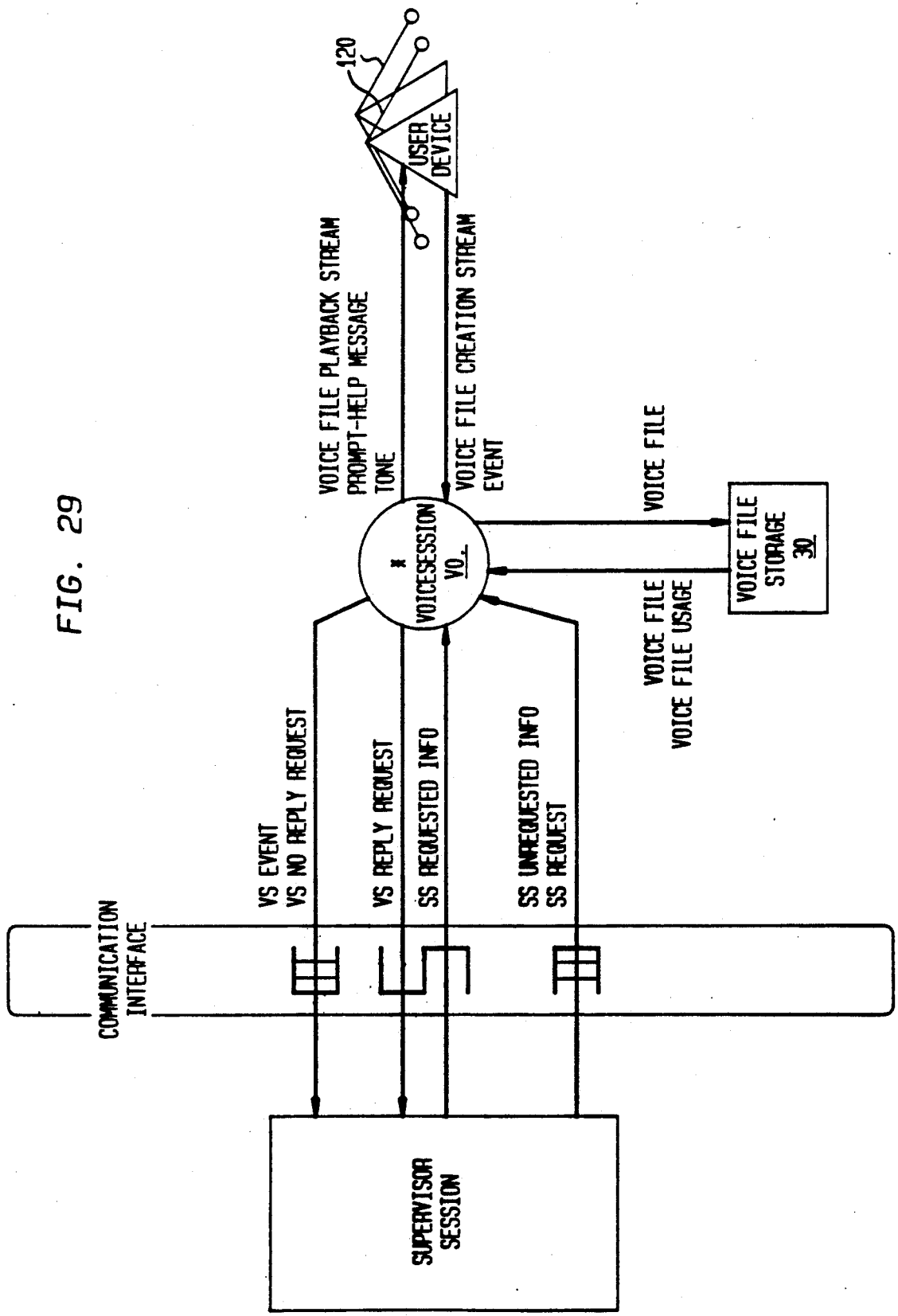
FIGS. 29-88 show a hierarchical model, including software modules and data flows, of the Voice Session software architecture.
Figure 88:
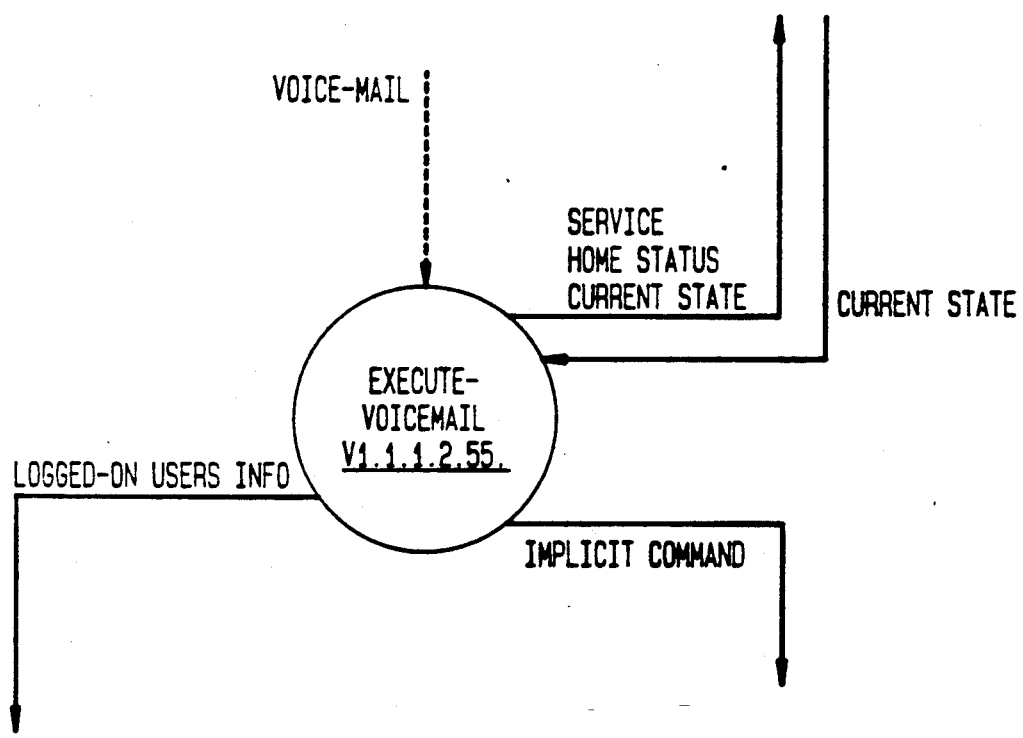
Figure 89:
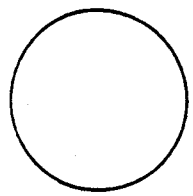
FIG. 89 and 90 illustrate conventions used in a FIG. 5-88.
Figure 89:
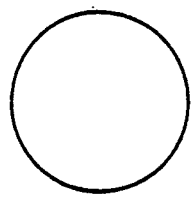
Figure 89:
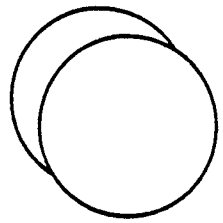
Figure 89:
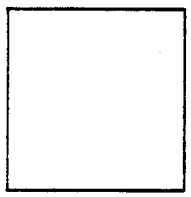
Figure 89:
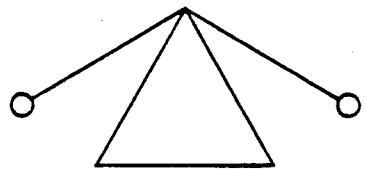
Figure 89:
Figure 89:
Figure 89:
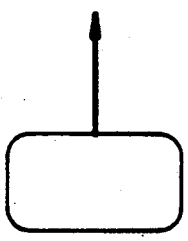
Figure 89:
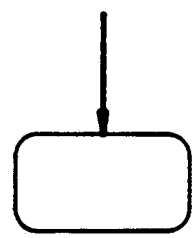
Figure 89:
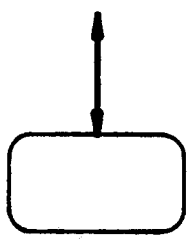
Figure 90:
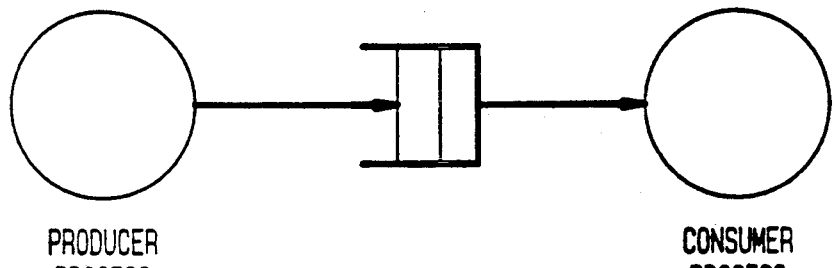
Figure 90:
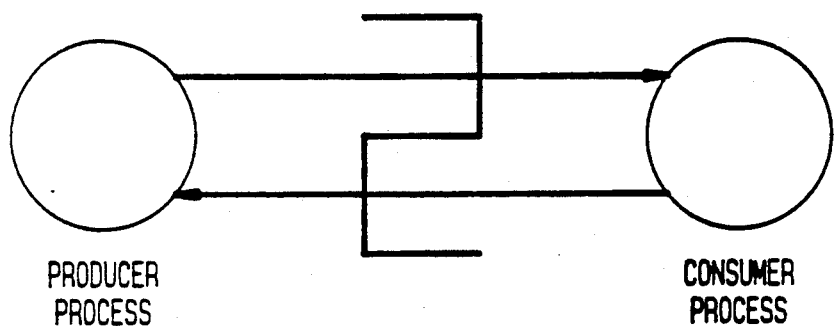
Figure 90:
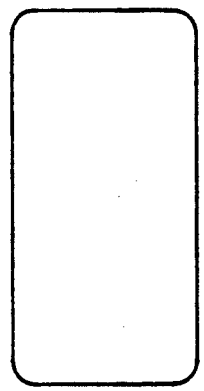

FIGS. 29-88 show the architecture for the Voice Session.

FIG. 29 shows voiceSession module V0 which performs all of the Voice Session functions.

VoiceSession V0 interfaces to SupervisorSession S0, which interface is complimentary to that described with respect to FIG. 5. Other outputs of module V0 are: Voice File Playback Stream, Prompt-Help Message, and Tone To Telephone-like User Devices 120, and Voice File to Voice File Storage 20. Other inputs are: Voice File Creation Stream and Event From User Devices 120, and Voice File and Voice File Usage From Voice File Storage 20.

Figure 30:
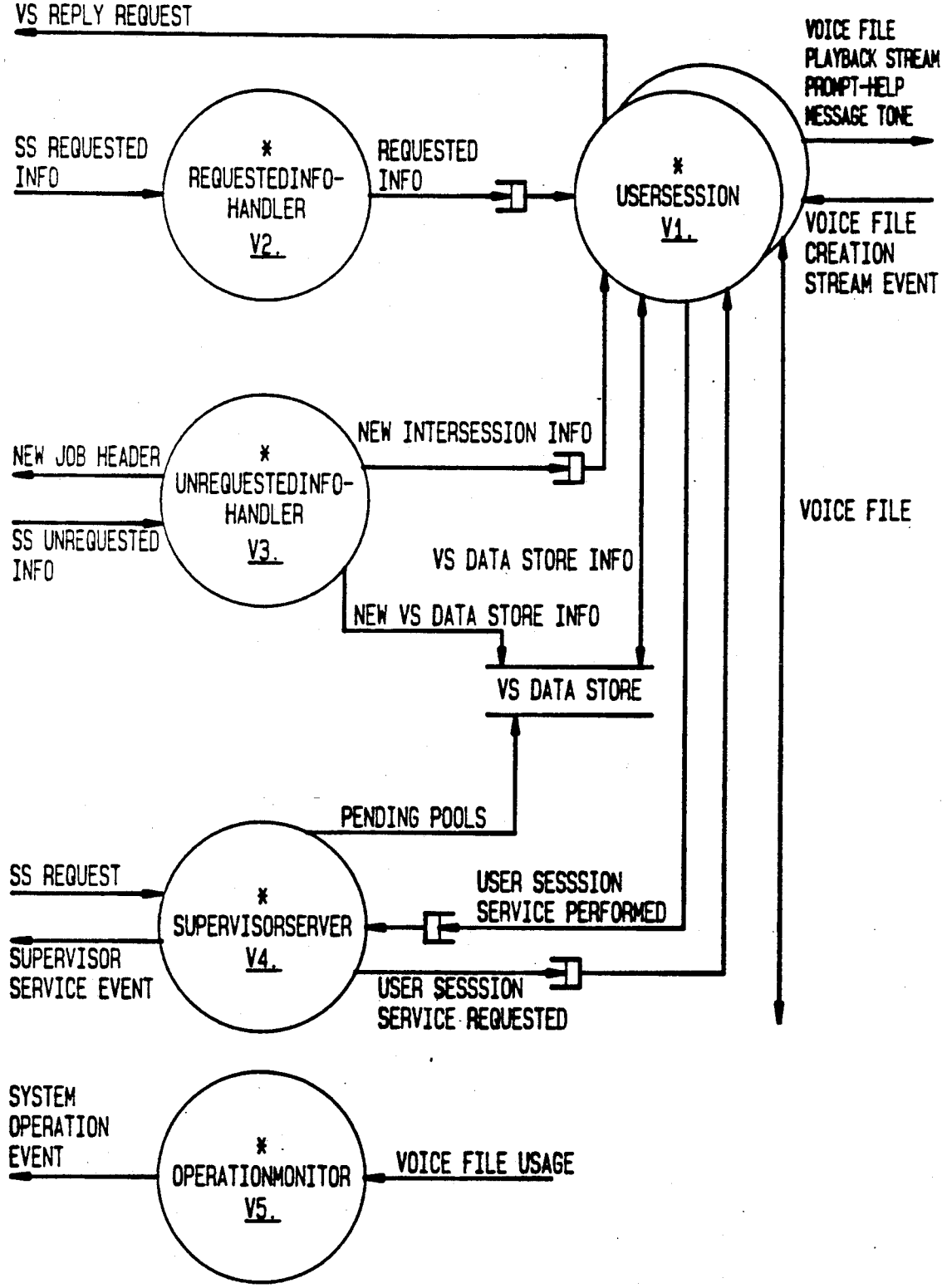

FIG. 30 shows VoiceSession module V0 decomposed to userSession module V1, requestedInfoHandler module V2, unrequestedInfoHandler module V3, SupervisorServer module V4, and operationMonitor module V5.

UserSession module V1 manages the interface presented to a user who is logged on to one of the Voice ports; there is one userSession process for each Voice port.

Outputs from userSession module V1 are: Voice File Playback Stream, Prompt-Help Message, and Tone (to User Device 120), and User Session Service Performed, User Session Event, VS No Reply Request, VS Replied Request. Inputs are: Voice File Creation Stream and Event (from User Devices 120), and User Session Service Performed, User Session Service Event, VS No Reply Request, and VS Reply Request. Module V1 also has read and write access for Voice File data to Voice File Storage 20 and to the VS Data Store.

RequestedInfoHandler module V2 receives messages sent by SupervisorSession module S0 in response to a request from voiceSession module V0, and routes the information to the appropriate userSession V1 process. (Note again that module V1 represents a process which may be multiply activated, once for each active Voice port.) Module V2 is specified in MODULE SPECIFICATIONS set forth below.

The output of module V2 is Requested Info, and the input is SS Requested Info.

UnrequestedInfoHandler module V3 receives messages sent by SupervisorSession S0 that are not in response to a voiceSession V0 request and routes this information to the VS Data Store or to the appropriate userSession V1 process. Module V3 is specified in MODULE SPECIFICATIONS set forth below.

Outputs of module V3 are: New Intersession Info, New Job Header, and New VS Data Store Info (to the VS Data Store). Its input is SS Unrequested Info.

SupervisorServer module V4 receives requests for service (e.g., copy a Voice File) from SupervisorSession S0 and carries out the requested service. Module V4 is specified in MODULE SPECIFICATIONS set forth below. Outputs of module V4 are Pending Pools (to the VS Data Store), Supervisor Service Event, and User Session Service Request. Inputs are User Session Service Performed and SS Request.

OperationMonitor module V5 checks the percentage of Voice File Storage 20 used and reports changes to SupervisorSession S0. Module V5 is specified in MODULE SPECIFICATIONS set forth below.

The output of module V5 is System Operation Event and the input is Voice File Usage.

Figure 31:
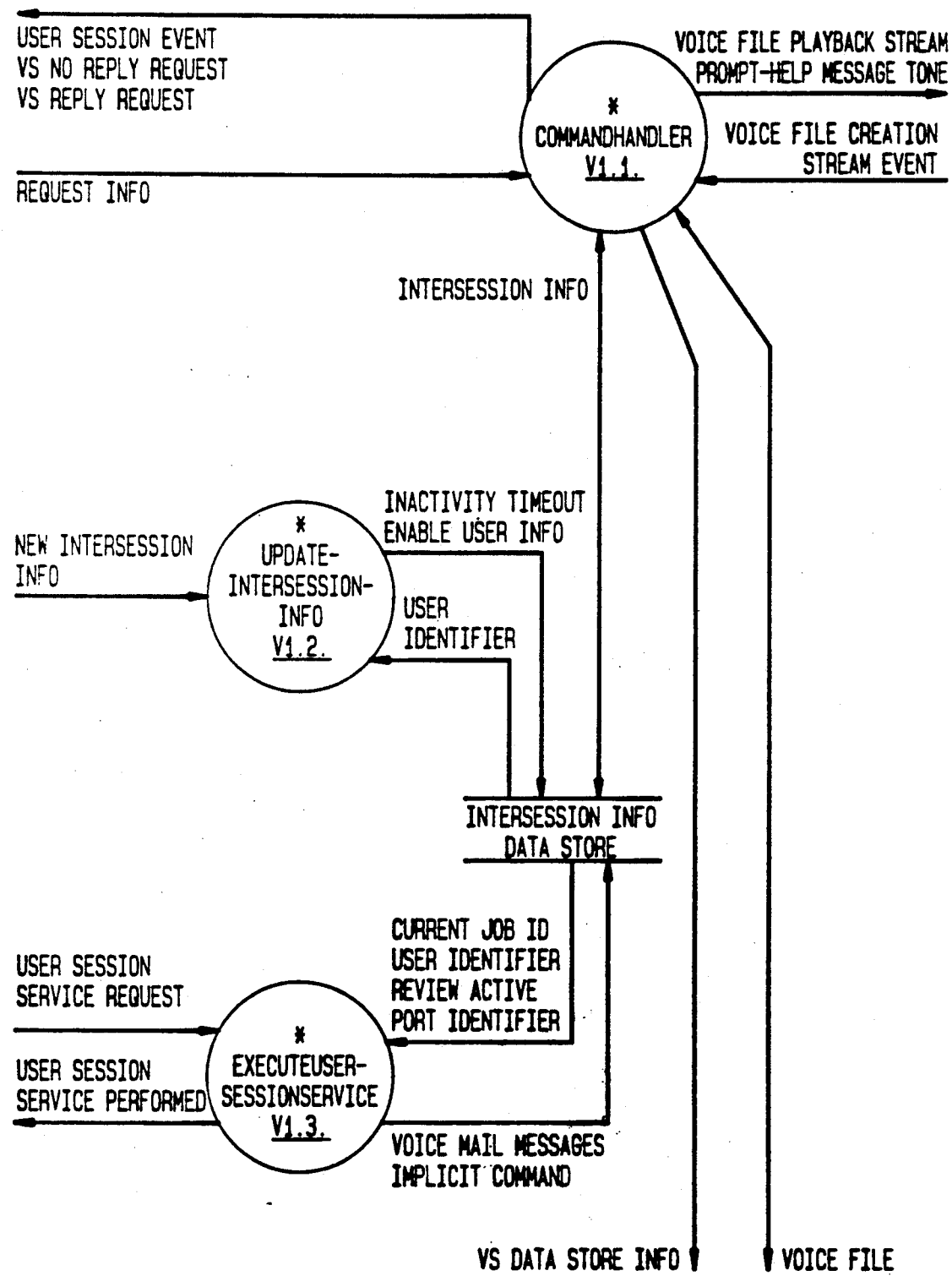

FIG. 31 further decomposes userSession module V1 in to commandHandler module V1.1, updateIntersessionInfo module V1.2, and executeUserSessionService module V1.3.

CommandHandler module V1.1 manages the functions provided to a user via VoiceSession V0. These functions may be invoked by commands from a user or may be automatically generated by the system.

Outputs of commandHandler module V1.1 are: Voice FilePlaybackStream, Prompt-Help Message, and Tone (to User Device 120), and User Session Event, VS No Reply Request, and VS Reply Request. Inputs are Voice File Creation Stream and Event (from User Device 120), and Requested Info. The module also has read and write access to the Intersession Info Data Store for Intersession Info data, VS Data store for VS Data Store Info data, and to Voice File Storage 20 for Voice File data.

UpdateIntersessionInfo module V1.2 receives and carries out updates for items in the Intersession Info Data Store which have been changed by SupervisorSession S0. Module V1.2 is specified in MODULE SPECIFICATIONS set forth below. The output of module V1.2 is Inactivity Timeout Enable. Inputs are User Identifier and New Intersession Info.

ExecuteUserSessionService module V1.3 executes parts of a SupervisorSession S0 request that affect a user session. Module V1.3 is specified in MODULE SPECIFICATIONS set forth below.

Outputs of module V1.3 are Voice Mail Messages, Implicit Command, and User Session Service Perform. Inputs are: Current Job ID, User Identifier, Review Active, Port Identifier, and User Session Service Request.

Figure 32:
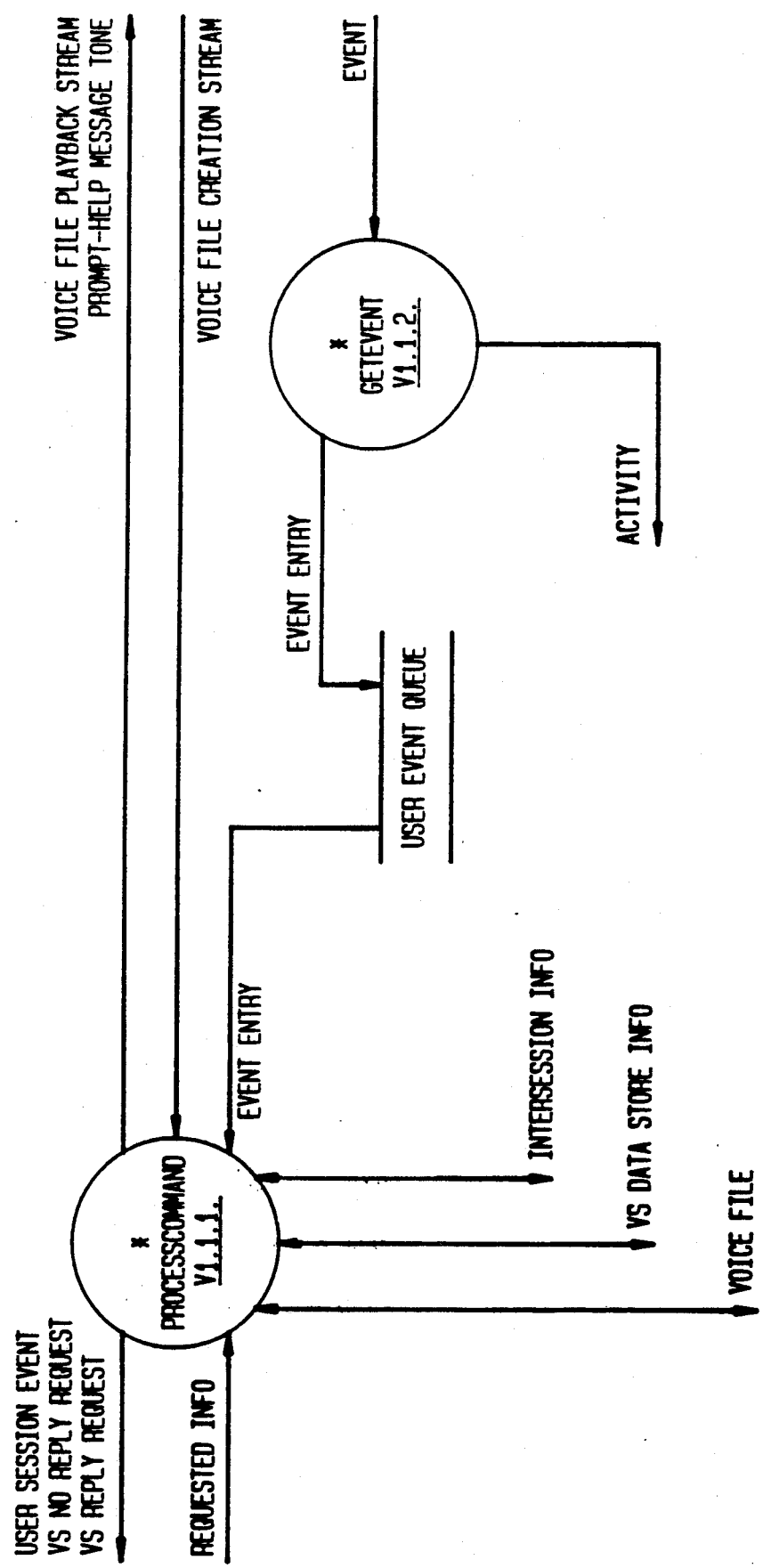

FIG. 32 further decomposes commandHandler module V1.1 into processCommand module V1.1.1 and getEvent module V1.1.2.

ProcessCommand module V1.1.1 processes a command.

Outputs of module V1.1.1 are: Voice File Playback Stream, Prompt-Help Message, and Tone (to User Device 120), and User Session Event, VS No Reply Request, and VS Reply Request. Inputs are: Requested Info, Event Entry (from User Event Queue data store) and Voice File Creation Stream. The module also has read and write access to Intersession Info, VS Data Store Info and Voice File.

GetEvent module V1.1.2 receives a telephony event from the associated Voice port and places it in the User Event Queue data store. Module V1.1.2 is specified in MODULE SPECIFICATIONS set forth below.

Outputs of module V1.1.2 are Event Entry and Activity, and the input is Event.

Figure 33:
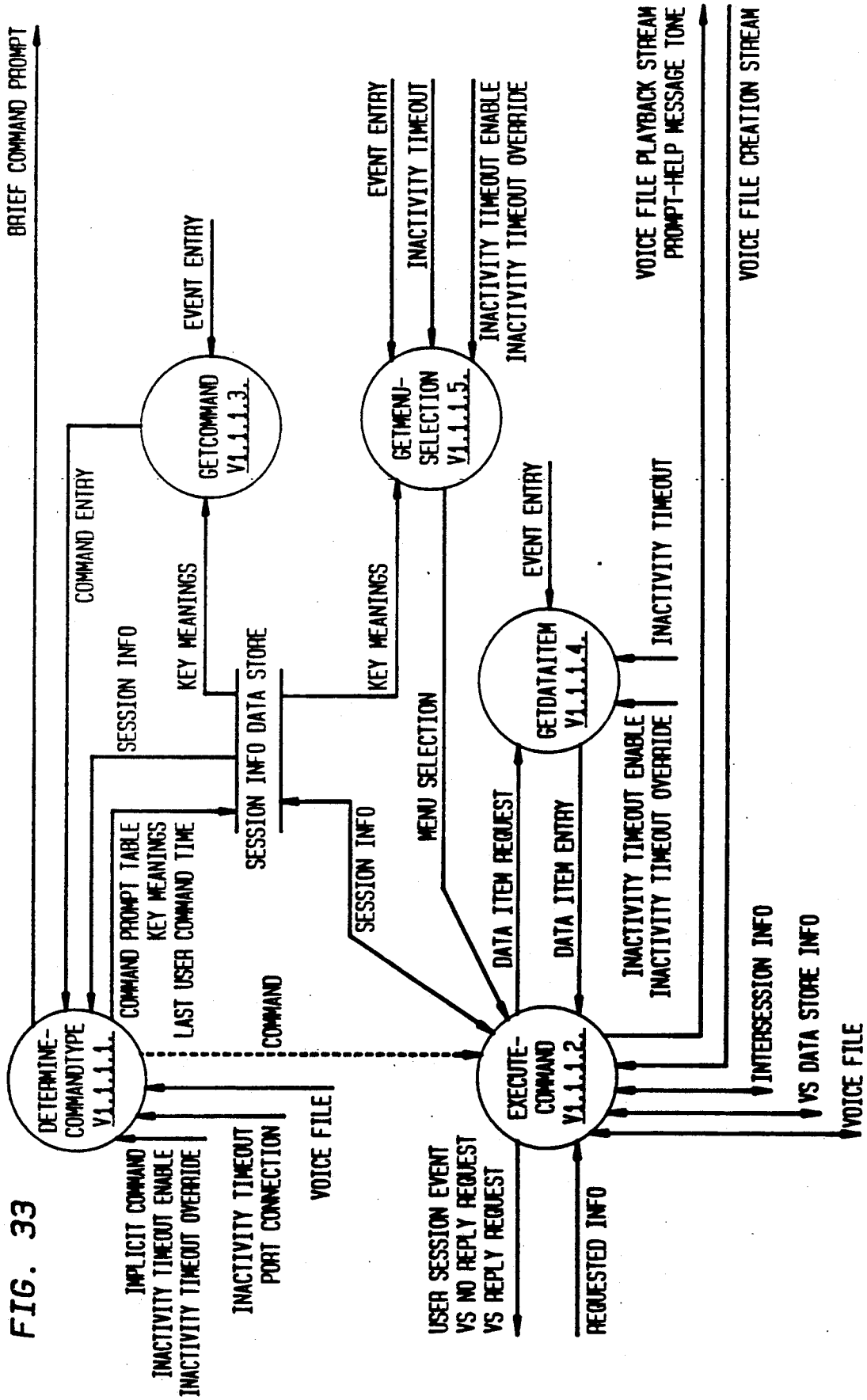

FIG. 33 shows process command module V1.1.1 further decomposed into determineCommandType module V1.1.1.1, executeCommand module V1.1.1.2, getCommand module V1.1.1.3, getDataItem module V1.1.1.4, and getMenuSelection module V1.1.1.5.

DetermineCommandType module V1.1.1.1 receives a command and invokes the appropriate command execution module. Module V1.1.1.1 is specified in MODULE SPECIFICATIONS set forth below.

Outputs of module V1.1.1.1 are: Brief Command Prompt, and Command Prompt Table, Key Meanings, and Last User Command Time (to the Session Info Data Store), and Command. Inputs are: Implicit Command, Inactivity Timeout Enable, Inactivity Timeout Override, Inactivity Timeout, Port Connection, Voice File, Session Info (from Session Info Data Store), and Command Entry.

ExecuteCommand module V1.1.1.2 executes a command.

Outputs of module V1.1.1.2 are: User Session Event, VS No Reply Request, VS Reply Request, Data Item Request, and Voice File Playback Stream, Prompt-Help Message, and Tone (to User Device 120). Inputs are: Requested Info, Voice File Creation Stream (from user device 120), Data Item Entry, Menu Selection, and Command. The module also has read and write access for VS Data Store Info, Intersession, Info Session Info, and Voice File.

GetCommand module V1.1.1.3 receives commands from the user. Module V1.1.1.3 is specified in MODULE SPECIFICATIONS set forth below.

The output of module V1.1.1.3 is Command Entry and the inputs are Event Entry, and Key Meanings (from Session Info Data Store).

GetDataItem module V1.1.1.4 receives a data item from the user. Module V1.1.1.4 is specified in MODULE SPECIFICATIONS set forth below.

The output of V1.1.1.4 is Data Item Entry. The inputs are: Data Item Request, Inactivity Timeout Enable, Inactivity Timeout Override, Inactivity Timeout, and Event Entry.

GetMenuSelection module V1.1.1.5 receives menu selections from the user. Module V1.1.1.5 is specified in MODULE SPECIFICATIONS set forth below.

The output of module V1.1.1.5 is Menu Selection. Inputs are: Key Meanings (from the Session Info Data Store), Inactivity Timeout Enable, Inactivity Timeout Override, Inactivity Timeout, and Event Entry.

Figure 34:
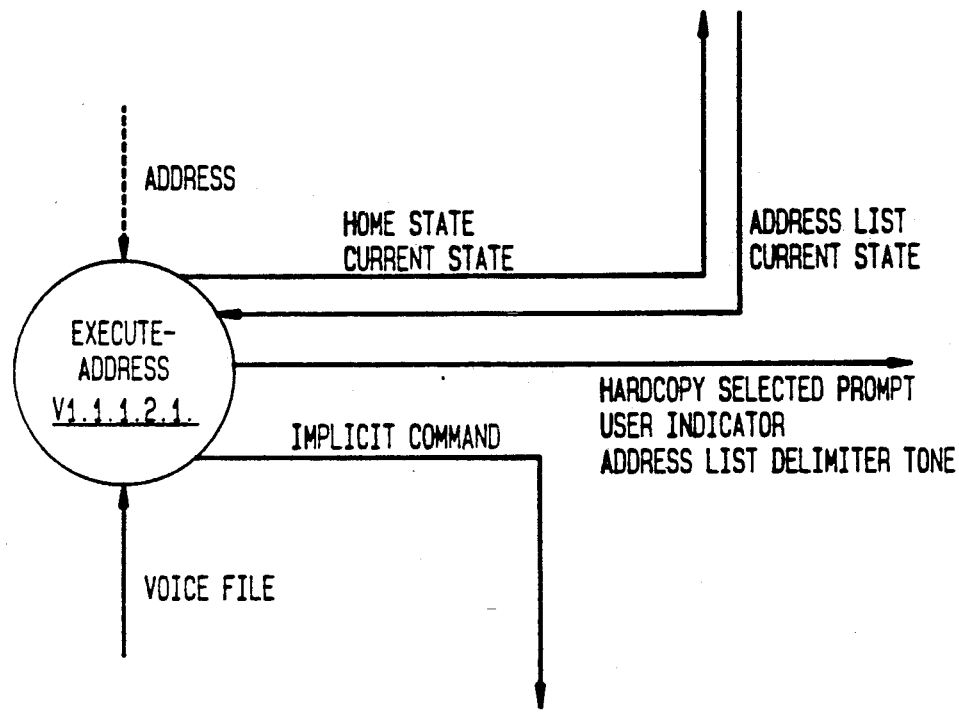

ExecuteCommand module V1.1.1.2 is further decomposed in FIGS. 34-88. Each module executes the corresponding command and is specified in MODULE SPECIFICATIONS set forth below.

FIG. 34 shows executeAddress module V1.1.1.2.1 which is invoked by ADDRESS. Its outputs are: Home State, Current State, Implicit Command, Hardcopy Selected Prompt, User Indicator and ADDRESS LIST DELIMITER TONE. Inputs are Address List, Current State, and Voice File.

Figure 35:
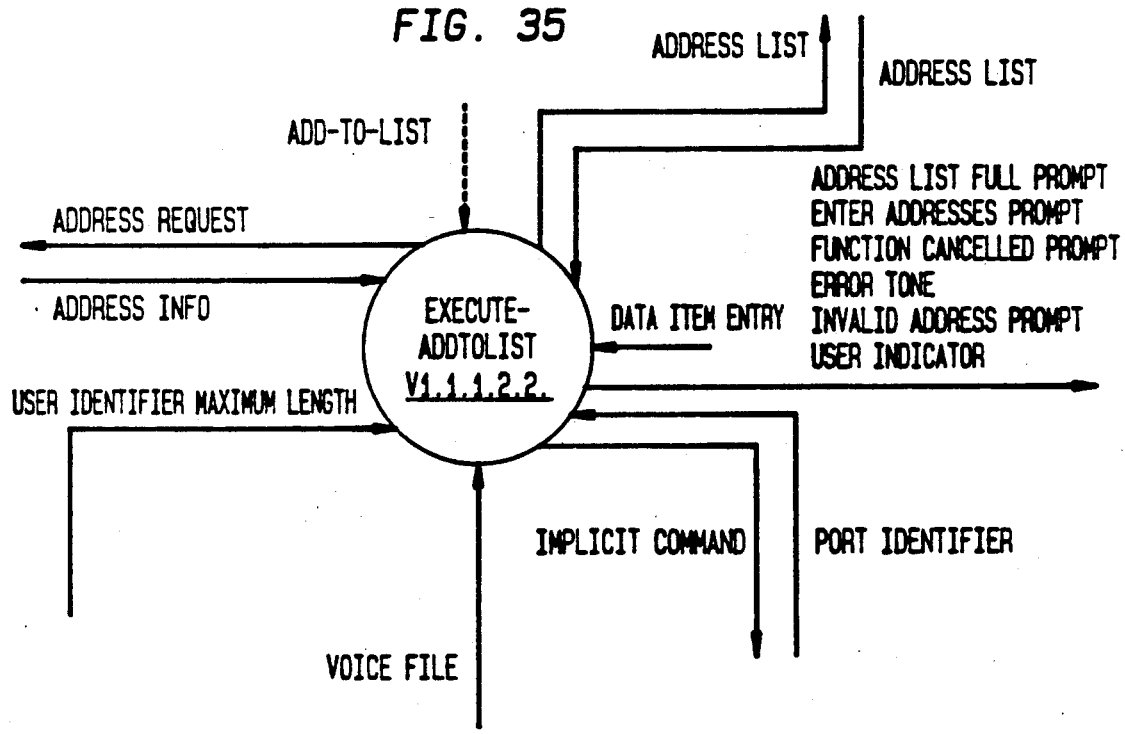

FIG. 35 shows executeAddToList module V1.1.1.2.2 which is invoked by ADD-TO-LIST. Its outputs are: Address List, Address Request, Implicit Command and Address List Full Prompt, Enter Address Prompt, Function Cancel Prompt, ERROR TONE, Invalid Address Prompt, and User Indicator. Inputs are: Address Info, User Identifier Maximum Length, Voice File, Port Identifier, Data Item Entry, and Address List.

Figure 36:
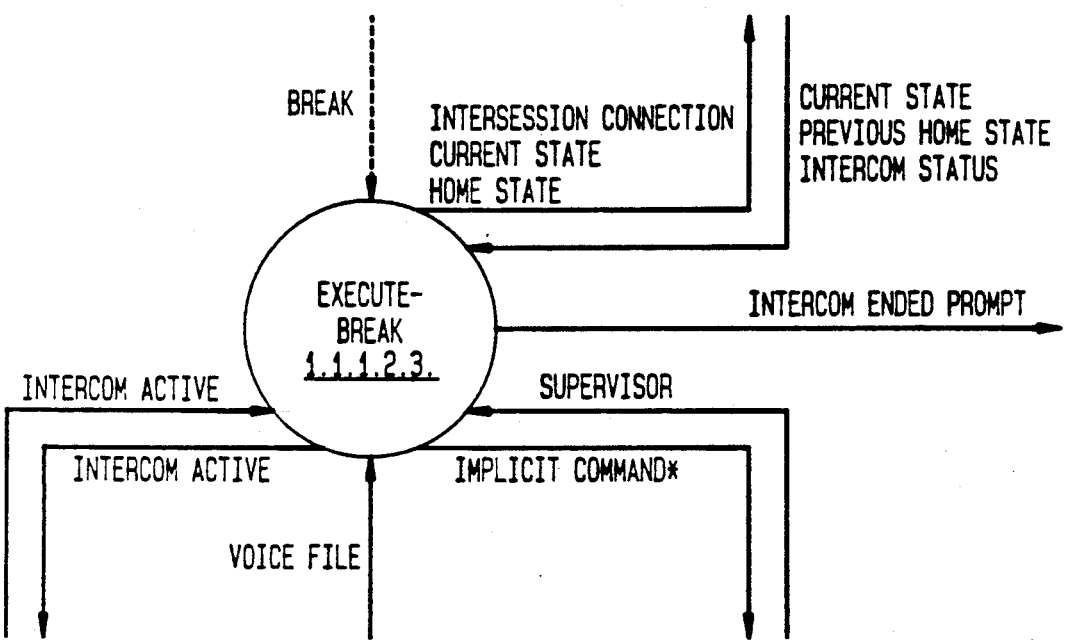

FIG. 36 shows executeBreak module V1.1.1.2.3 which is invoked by BREAK. Its outputs are: Intersession Connection, Current State, Home State, Intercom Active, Implicit Command and Intercom Ended Prompt. Inputs are: Intercom Active, Voice File, Supervisor, Current State, Previous Home State, and Intercome Status.

Figure 37:
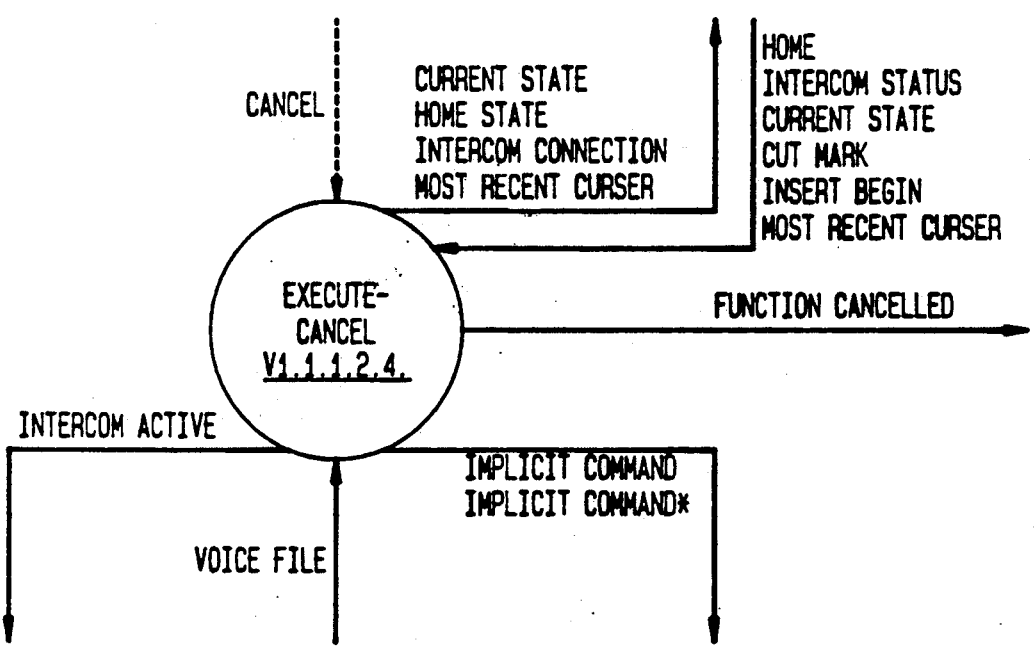

FIG. 37 shows executeCancel module V1.1.1.2.4 which is invoked by CANCEL. Its outputs are: Current State, Home State, Intercome Connection, Most Recent Cursor, Intercom Active, Implicit Command, Implicit Commands, and Function Cancelled Prompt. Inputs are: Voice File, Home State, Intercom Status, Current State, Cut Mark, Insert Begin, and Most Recent Cursor.

Figure 38:
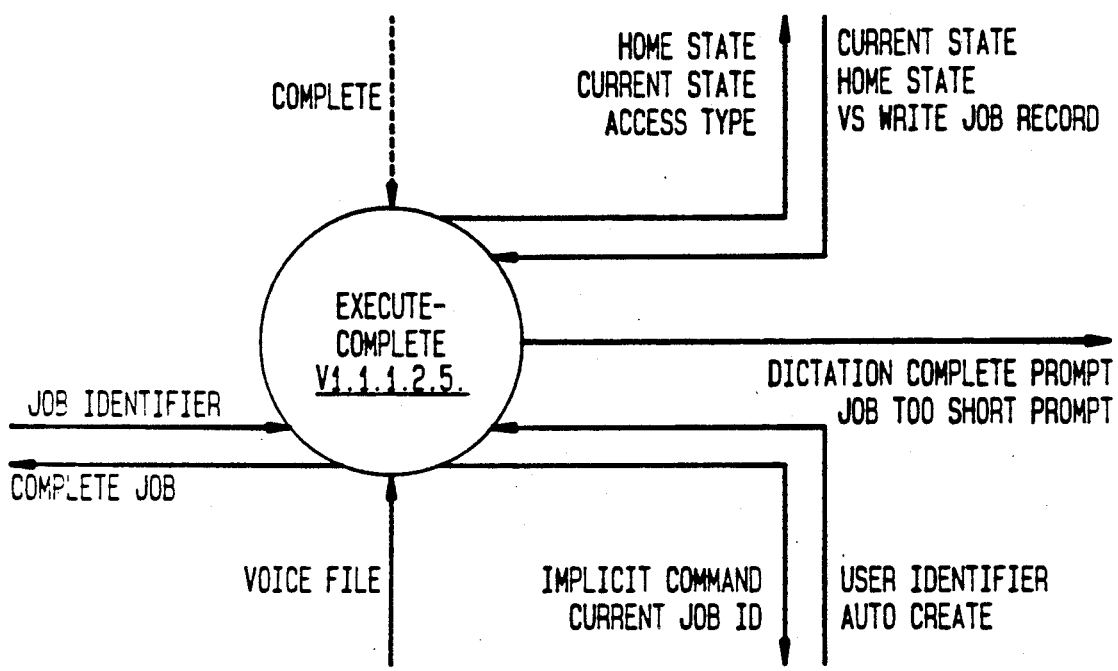

FIG. 38 shows executeComplete module V1.1.1.2.5 which is invoked by COMPLETE. Its outputs are: Home State, Current State, Access Type, Complete Job, Implicit Command, Current Job ID, Dictation Complete Prompt, and Job Too Short Prompt. Inputs are: Job Identifier, Voice File, User Identifier, Auto Create, Current State, Home State, and VS Write Job Record.

Figure 39:
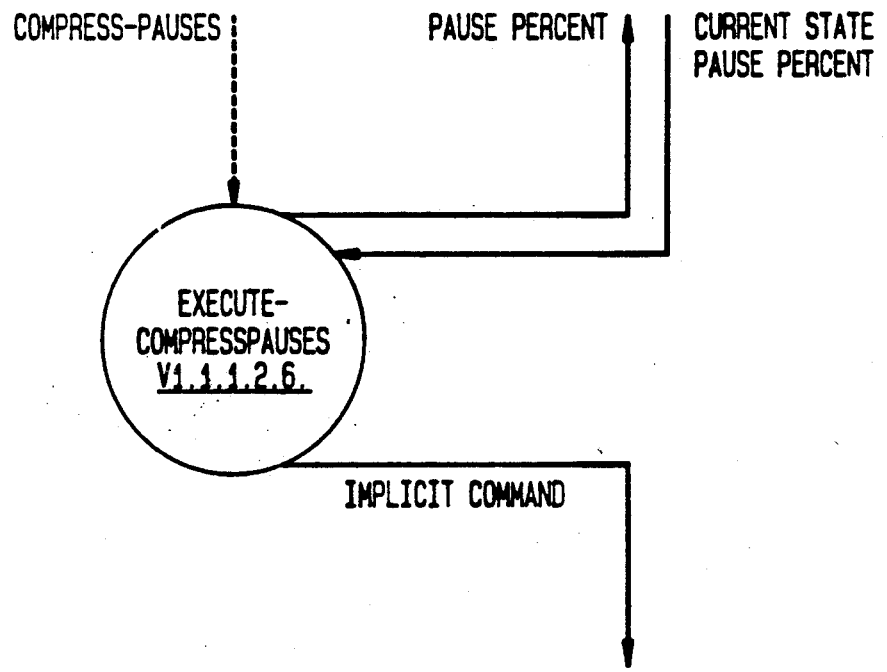

FIG. 39 Shows executeCompressPauses module V1.1.1.2.6 which is invoked by COMPRESS-PAUSES. Its outputs are Pause Percent and Implicit Command. Its inputs are Current State and Pause Percent.

Figure 40:
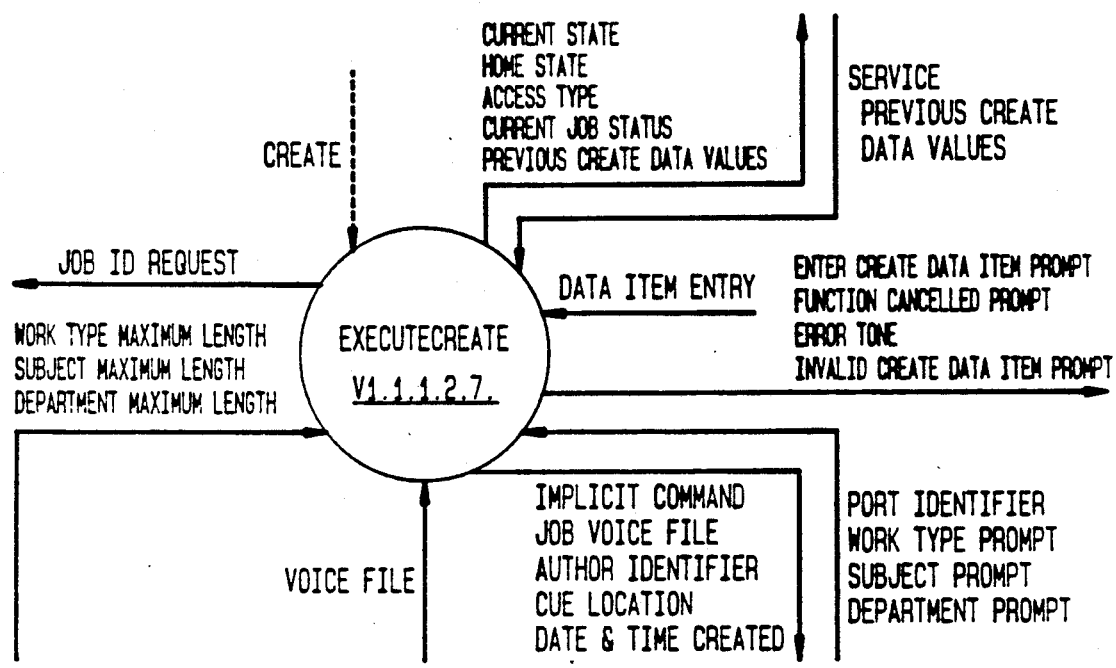

FIG. 40 shows executeCreate module V1.1.1.2.7 which is invoked by CREATE. Its outputs are: Current State, Home State, Access Type, Current Job Status, Previous Create Data Values, Job ID Request, Implicit Command, Job Voice File, Author Identifier, Que Location, Date and Time Created, Enter Create Data Item Prompt, Function Cancelled Prompt, ERROR TONE, and Invalid Create Data Item Prompt. Inputs are: Work Type Maximum Length, Subject Maximum Length, Department Maximum Length, Voice File, Port Identifier, Work Type Prompt, Subject Prompt, Department Prompt, Data Item Entry, Service, and Previous Create Data Values.

Figure 41:
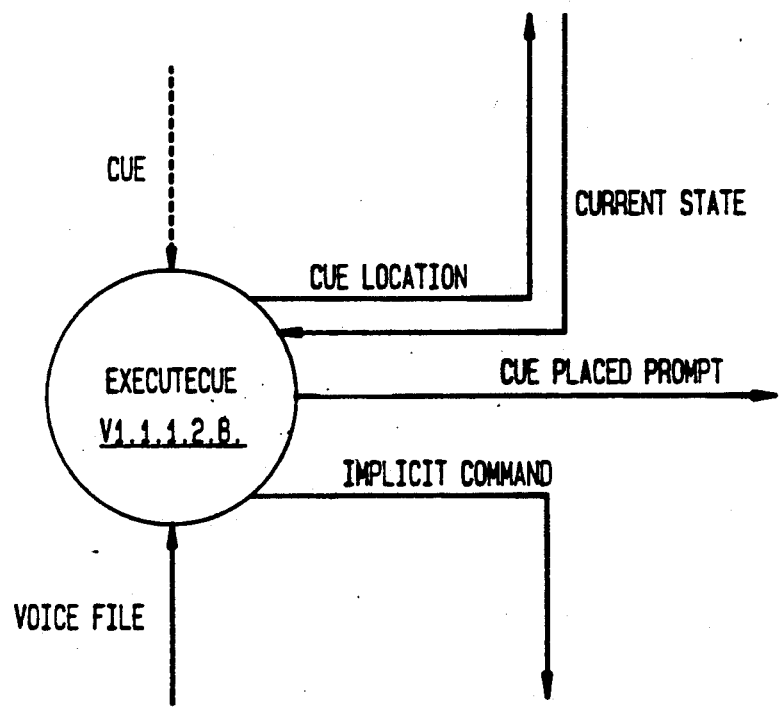

FIG. 41 shows executeCue module V1.1.1.2.8 which is invoked by CUE. Its outputs are: Cue Location, Implicit Command, and Cue Placed Prompt. Inputs are Voice File and Current State.

Figure 42:
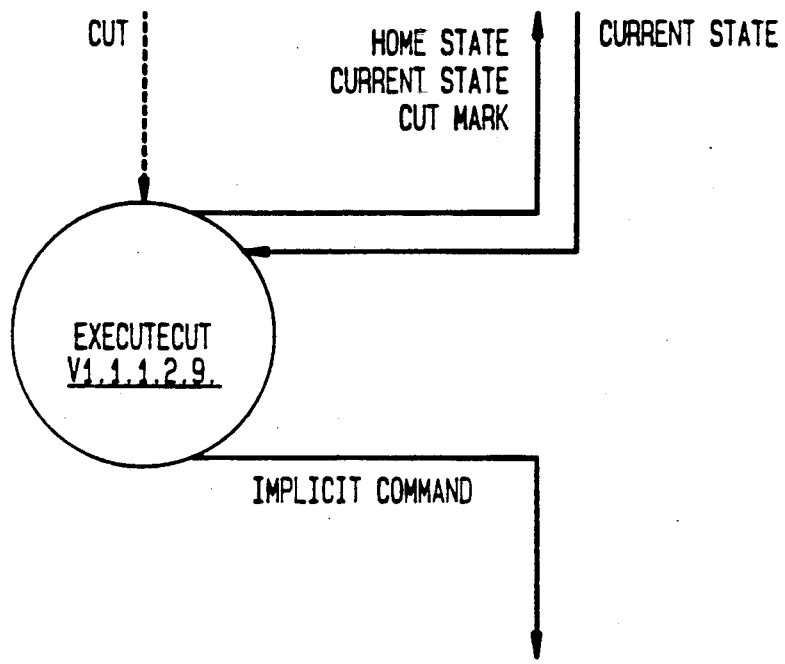

FIG. 42 shows executeCut module V1.1.1.2.9 which is invoked by CUT. Its outputs are Home State, Current State, Cut Mark, and Implicit Command. Its input is Current State.

Figure 43:
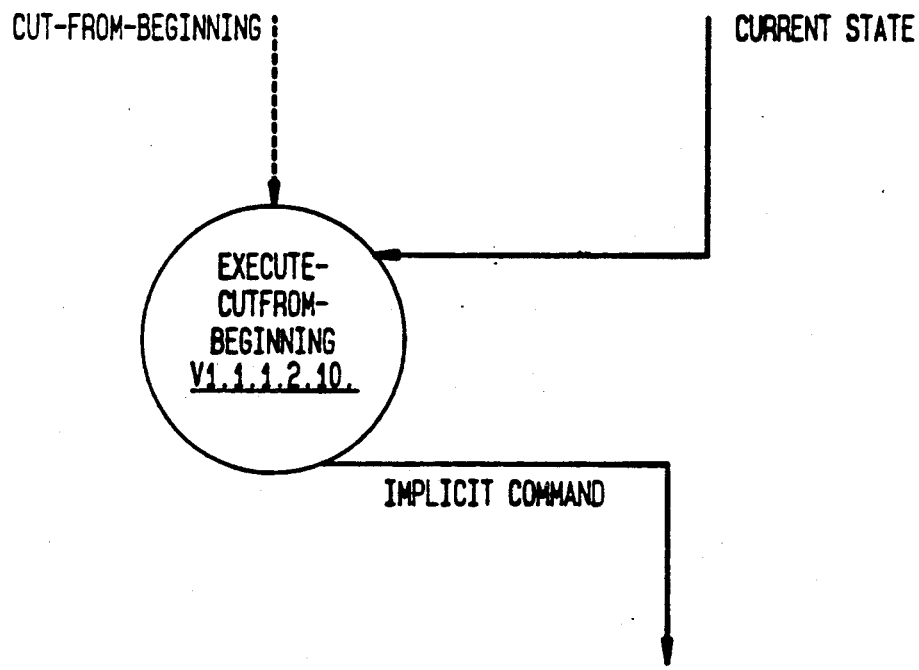

FIG. 43 shows executeCutFromBeginning module V1.1.1.2.10 which is invoked by CUT-FROM-BEGINNING. Its output is Implicit Command and its input is Current State.

Figure 44:
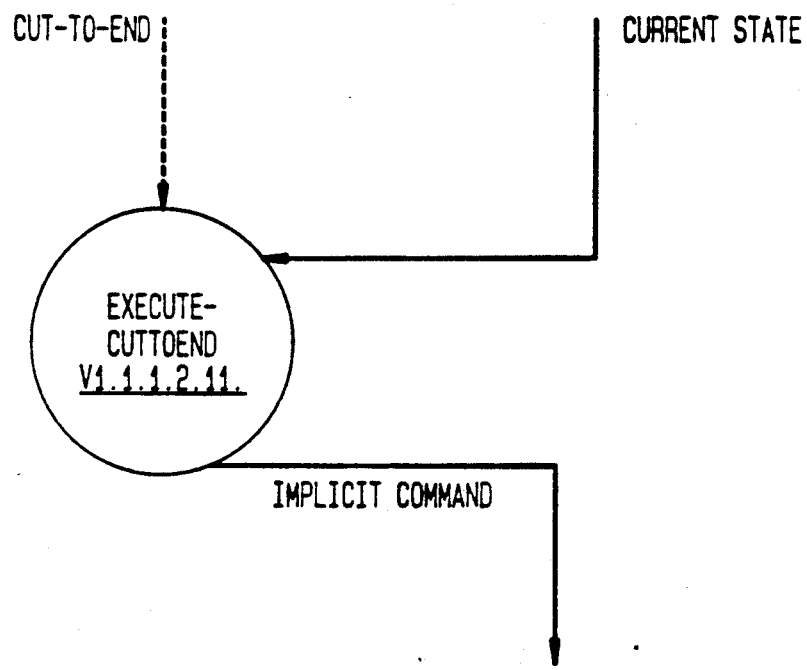

FIG. 44 shows executeCutToEnd module V1.1.1.2.11 which is invoked by CUT-TO-END. Its output is Implicit Command and its input is Current State.

Figure 45:
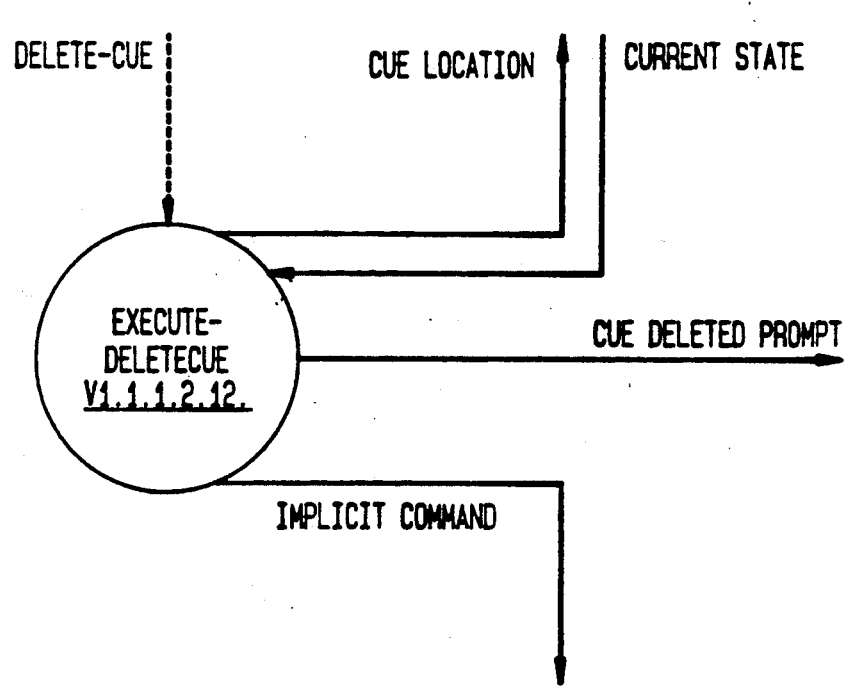

FIG. 45 Shows executeDeleteCue module V1.1.1.2.12 which is invoked by DELETE-CUE. Its outputs are: Cue Location, Implicit Command, and Cue Deleted Prompt. Its input is Current State.

Figure 46:
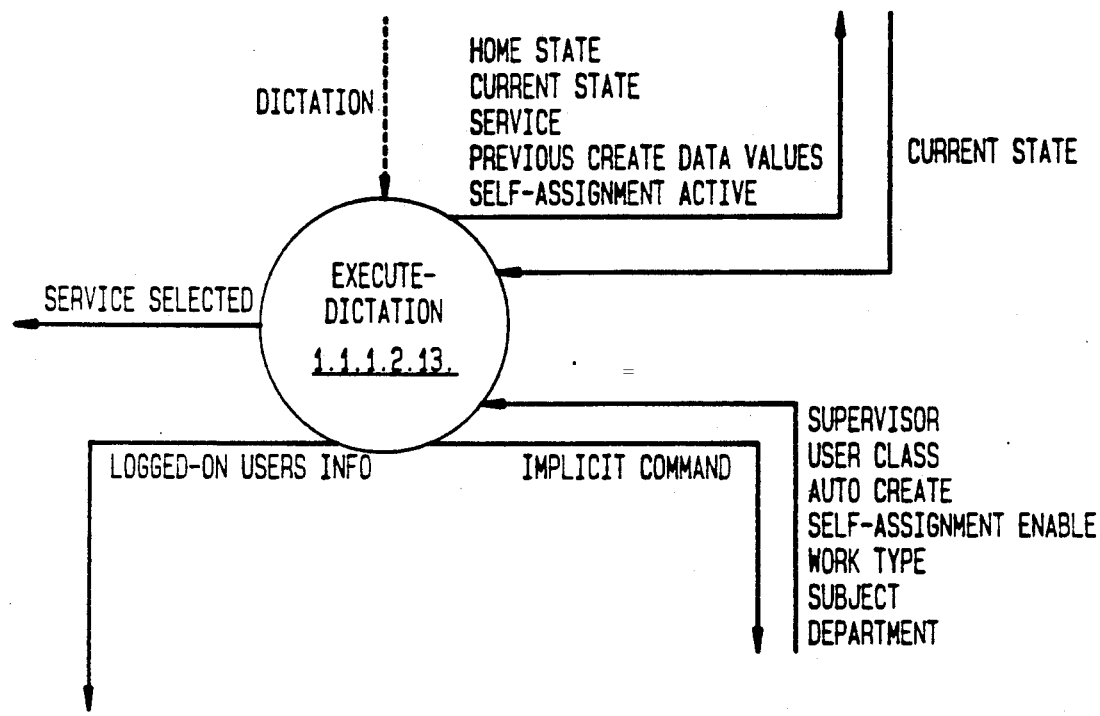

FIG. 46 shows executeDictation module V1.1.1.2.13 which is invoked by DICTATION. Its outputs are: Home State, Current State, Service, Previous Create Data Values, SelfAssignment Active, Service Selected, Logged On Users Info, and Implicit Command. Its inputs are: Supervisor, User Class, Auto Create, Self-Assignment Enable, Work Type, Subject, Department and Current State.

Figure 47:
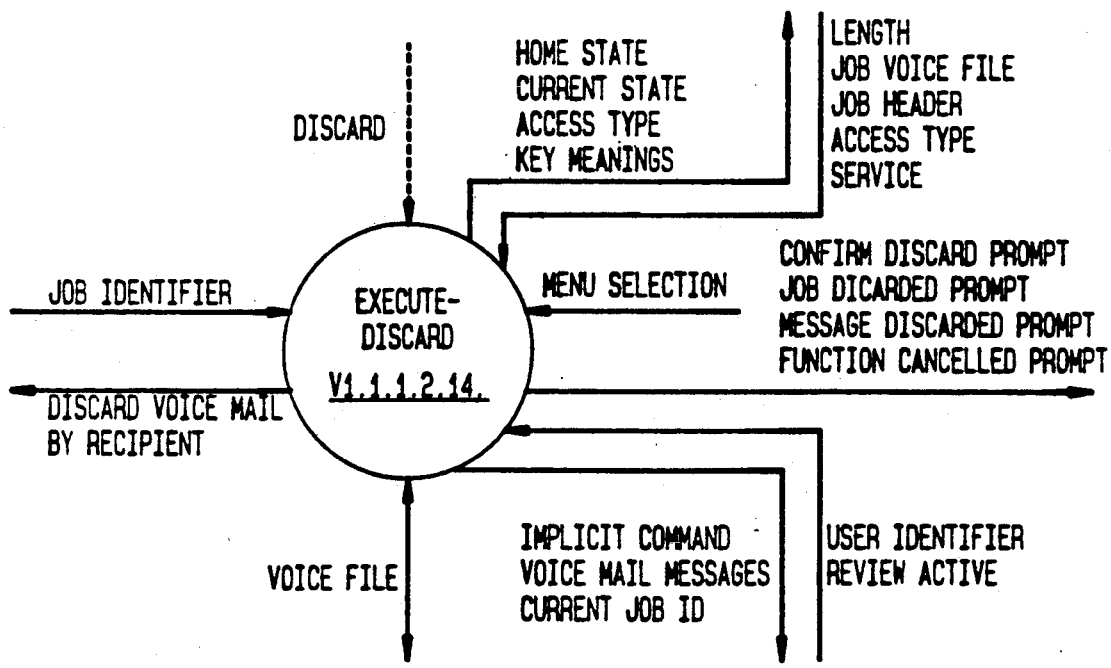

FIG. 47 shows executeDiscard module V1.1.1.2.14 which is invoked by DISCARD. Its outputs are: Home State, Current State, Access Type, Key Meanings, Discard Voice Mail By Recipient, Implicit Command, Voice Mail Messages, Current Job ID, Confirm Discard Prompt, Job Discarded Prompt, Message Discarded Prompt, Voice File, and Function Cancelled Prompt. Inputs are: Job Identifier, Voice File, User Identifier, Review Active, Menu Selection, Length, Job Voice File, Job Header, Access Type and Service.

Figure 48:
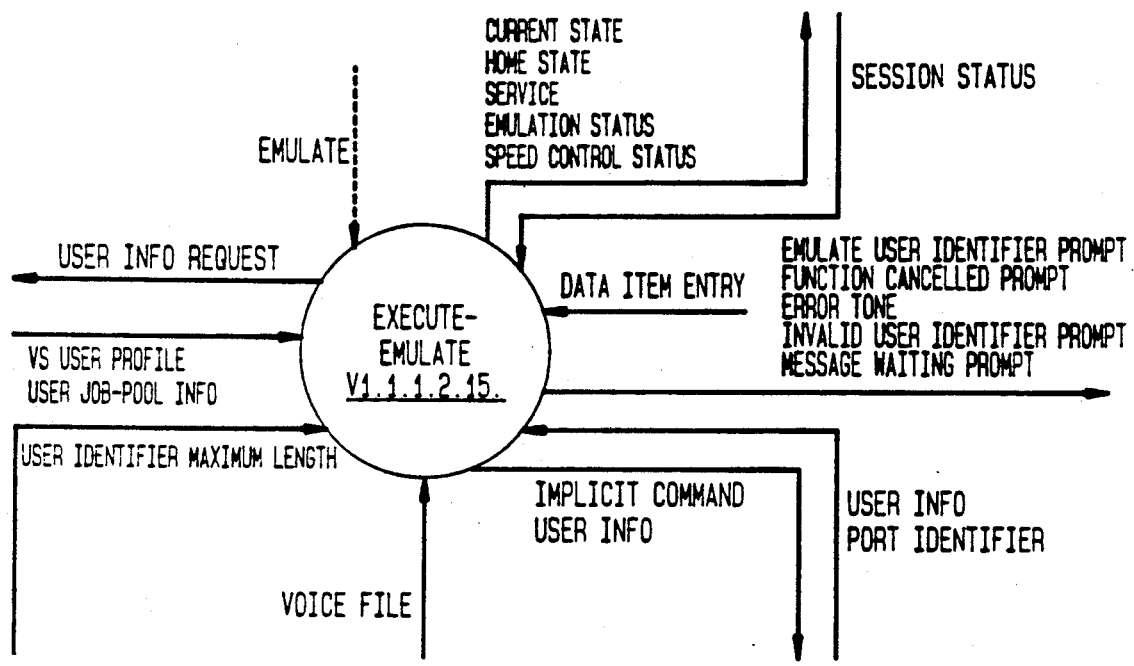

FIG. 48 shows executeEmulate module V1.1.1.2.15 which is invoked by EMULATE. Its outputs are: Current State, Home State, Service, Emulation Status, Speed Control Status, User Info Request, Implicit Command, User Info, Emulate User Identifier Prompt, Function Cancelled Prompt, ERROR TONE, Invalid User Identifier Prompt, and Message Waiting Prompt. Inputs are: DS User Profile, User Job Pool Info, User Identifier Maximum Length, Voice File, User Info, Port Identifier, Data Item Entry, and Session Status.

Figure 49:
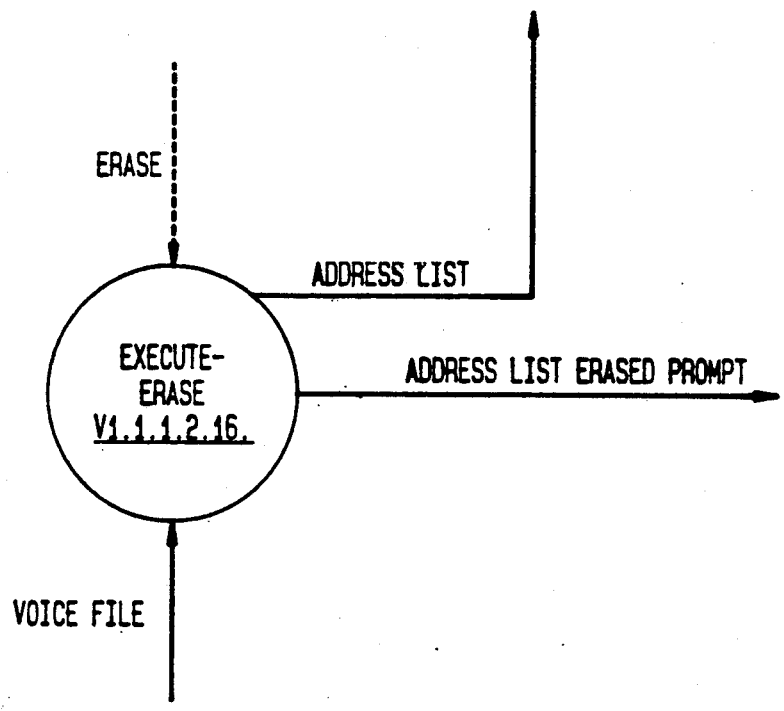

FIG. 49 shows executeErase module V1.1.1.2.16 which is invoked by ERASE. Its outputs are Address List and Address List Erased Prompt. Its input is Voice File.

Figure 50:
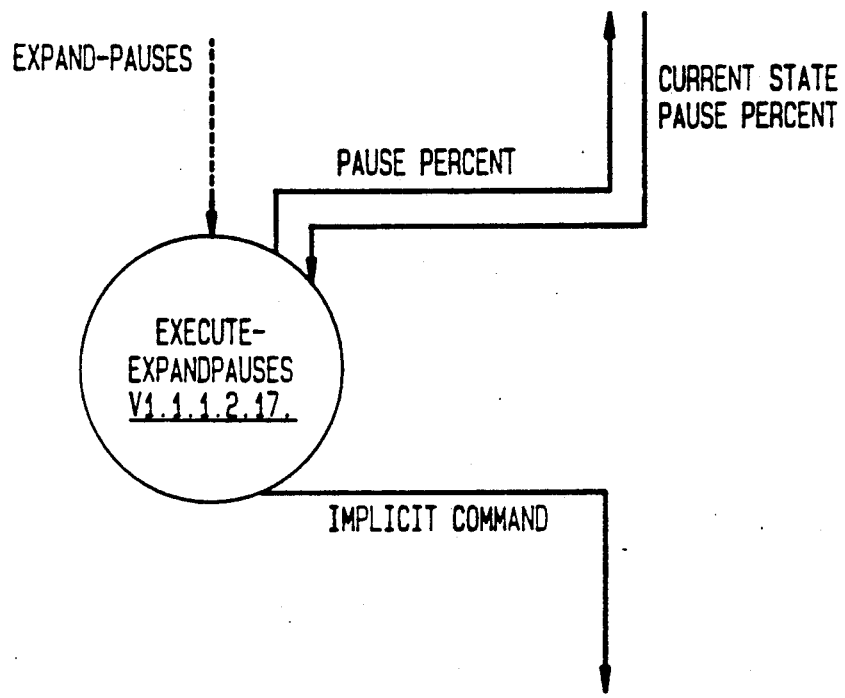

FIG. 50 shows executeExpand Pauses module V1.1.1.2.17 which is invoked by EXPAND PAUSES. Its outputs are Pause Percent and Implicit Command. Its inputs are Current State and Pause Percent.

Figure 51:
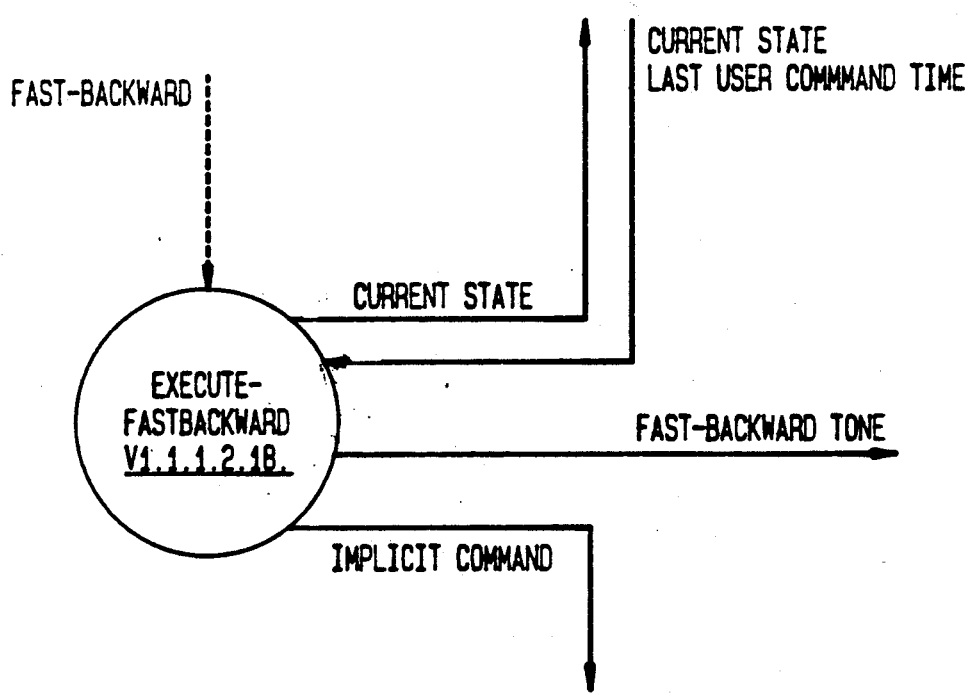

FIG. 51 shows executeFastBackward module V1.1.1.2.18 which is invoked by FAST-BACKWARD. Its outputs are Current State, Implicit Command and FAST-BACKWARD TONE. Its inputs are Current State and Last User Command Time.

Figure 52:
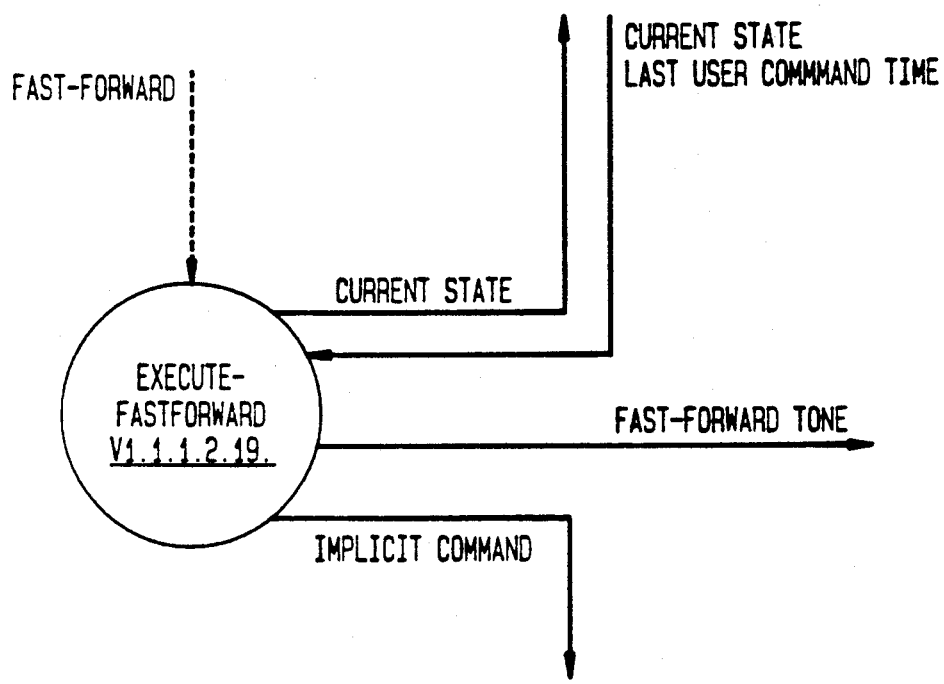

FIG. 52 shows executeFast Forward module V1.1.1.2.19 which is invoked by FAST-FORWARD. Its outputs are Current State, Implicit Command and FAST-FORWARD TONE. Its inputs are Current State and Last User Command Time.

Figure 53:
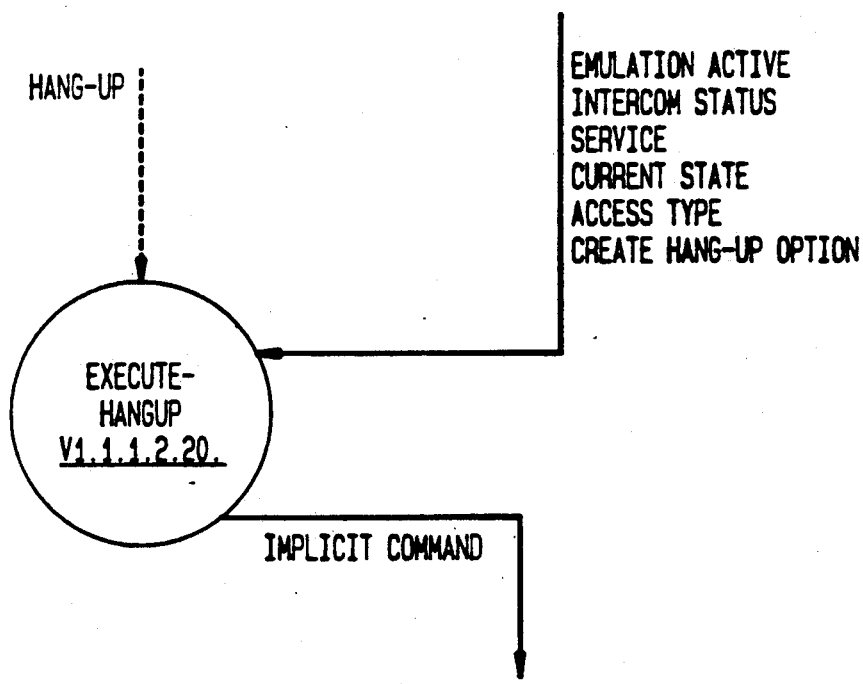

FIG. 53 shows executeHangUp module V1.1.1.2.20 which is invoked by HANG-UP. Its output is Implicit Command. Its inputs are: Emulation Active, Intercom Status, Service, Current State, Access Type, and Create Hand-Up Option.

Figure 54:
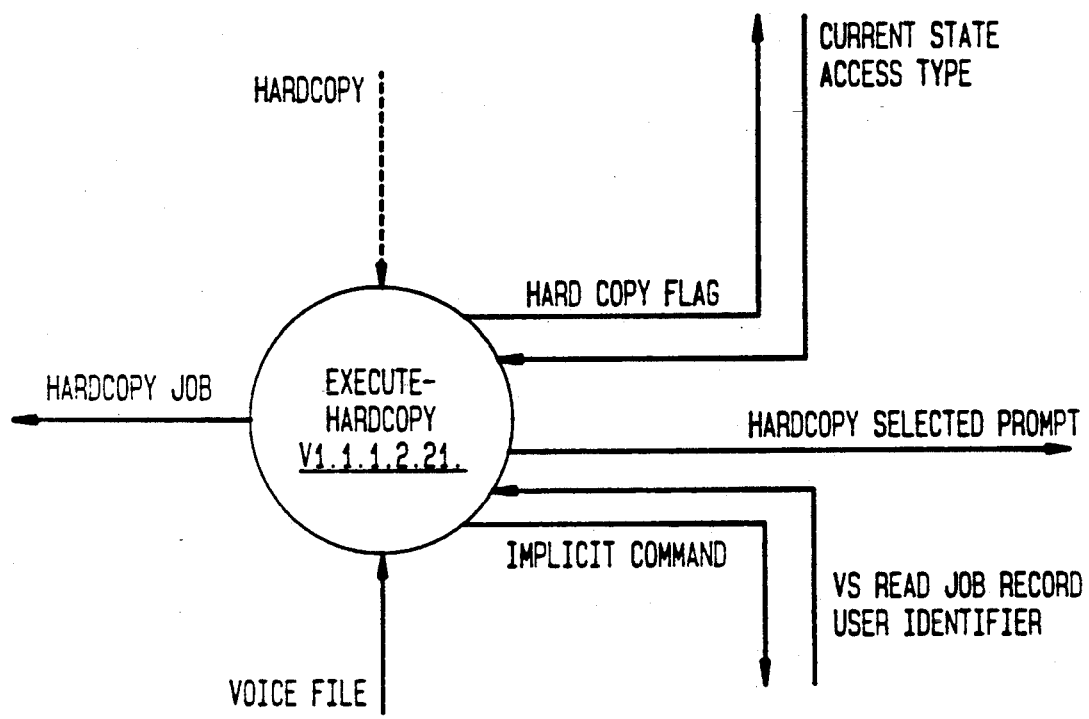

FIG. 54 shows executeHardcopy module V1.1.1.2.21 which is invoked by HARDCOPY. Its outputs are: Hardcopy Flag, Hardcopy Job, Implicit Command and Hardcopy Selected Prompt. Inputs are: Voice File, VS Read Job Record, User Identifier, Current State, and Access Type.

Figure 55:
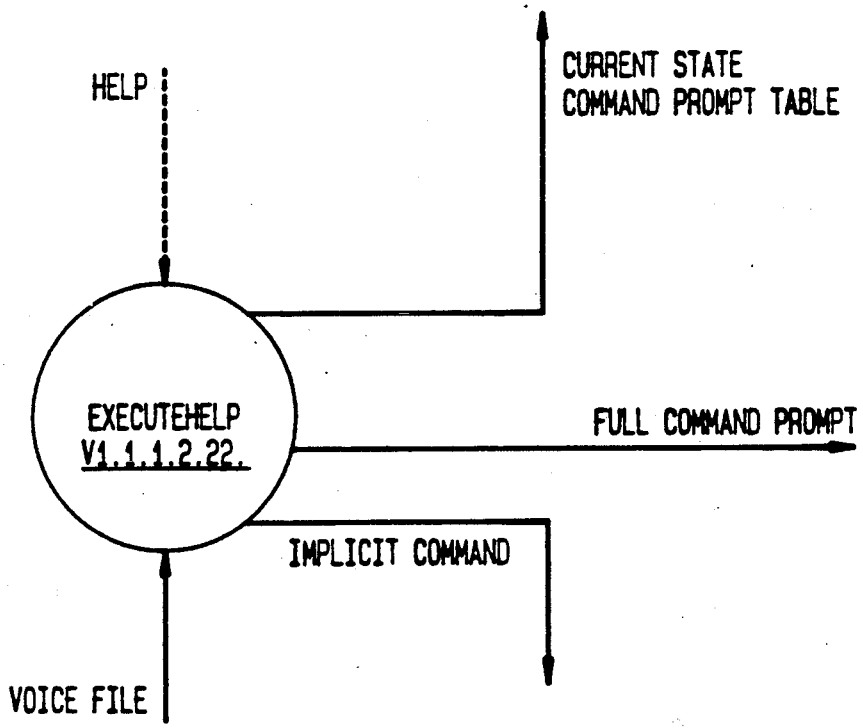

FIG. 55 shows executeHelp module V1.1.1.2.22 which is invoked by HELP. Its outputs are Full Command Prompt and Implicit Command. Its inputs are Current State, Command Prompt Table and Voice File.

Figure 56:
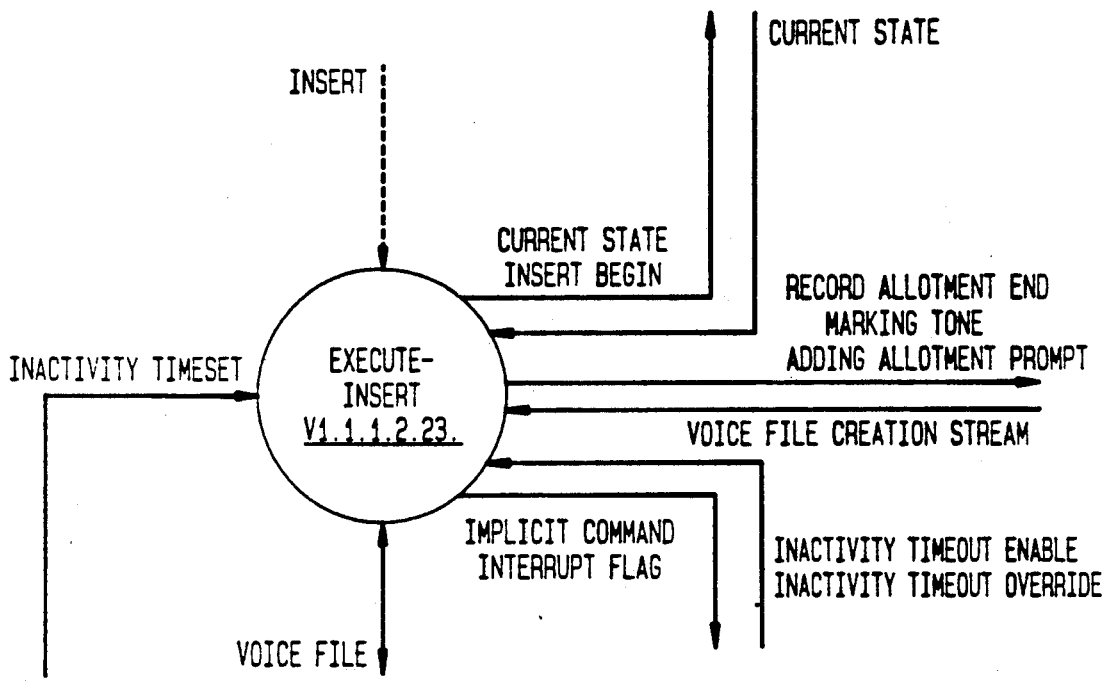

FIG. 56 shows executeInsert module V1.1.1.2.23 which is invoked by INSERT. Its outputs are: Current State, Insert Begin, Voice File, Implicit Command, Interrupt Flag, RECORD ALLOTMENT AND WARNING TONE, and Adding Allotment Prompt. Its inputs are: Inactivity Timeout, Voice File, Inactivity Timout Enable, Inactivity Timout Override, Voice File Creation Stream, and Current State.

Figure 57:
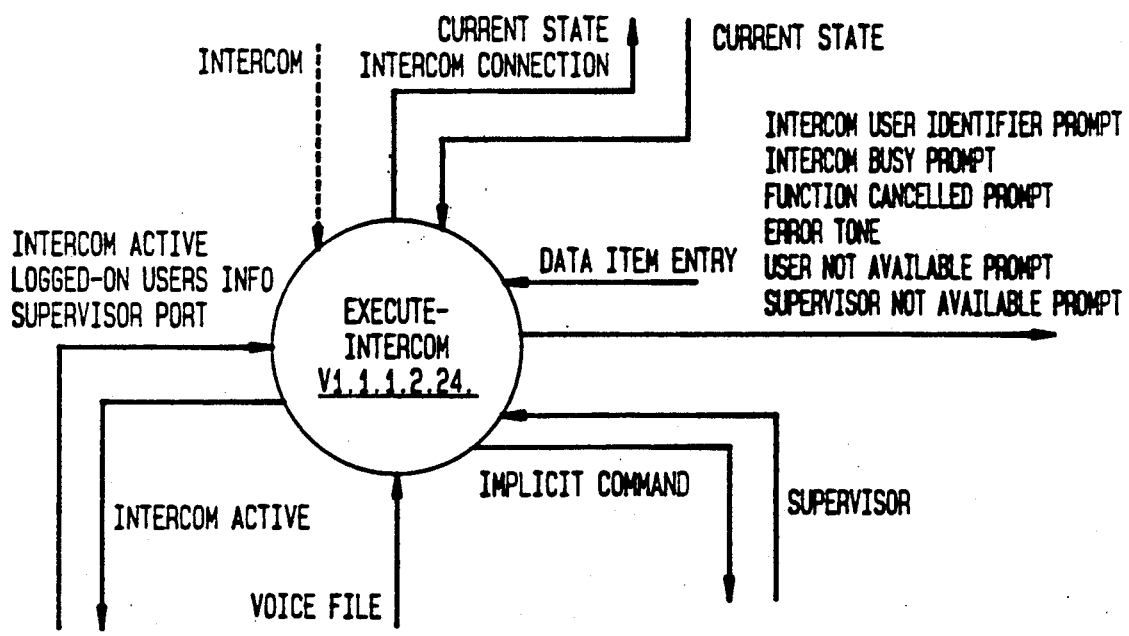

FIG. 57 shows executeIntercom module V1.1.1.2.24 which is invoked by INTERCOM. Its outputs are Current State, Intercom Connection, Intercom Active, Implicit Command, Intercome User Identifier Prompt, Intercom Busy Prompt, Function Cancel Prompt, ERROR TONE, User Not Available Prompt, and Supervisor Not Available Prompt. Its inputs are: Intercome Active, Logged On Users Info, Supervisor Port, Voice File, Supervisor, Data Item Entry, and Current State.

Figure 58:
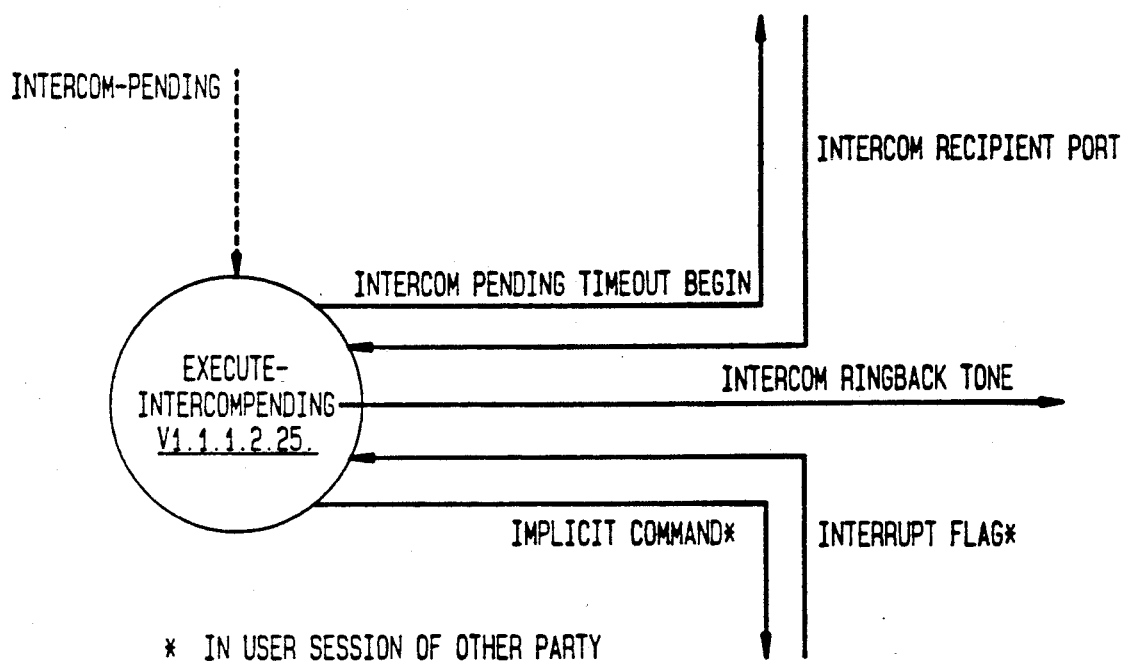

FIG. 58 shows executeIntercomPending module V1.1.1.2.25 which is invoked by INTERCOM-PENDING. Its outputs are: Intercom Pending, Timeout Begin, Implicit Command*, INTERCOM RINGBACK TONE. Its inputs are: Interrupt Flag* and Intercom Recipient Port. (*In user session of another user)

Figure 59:
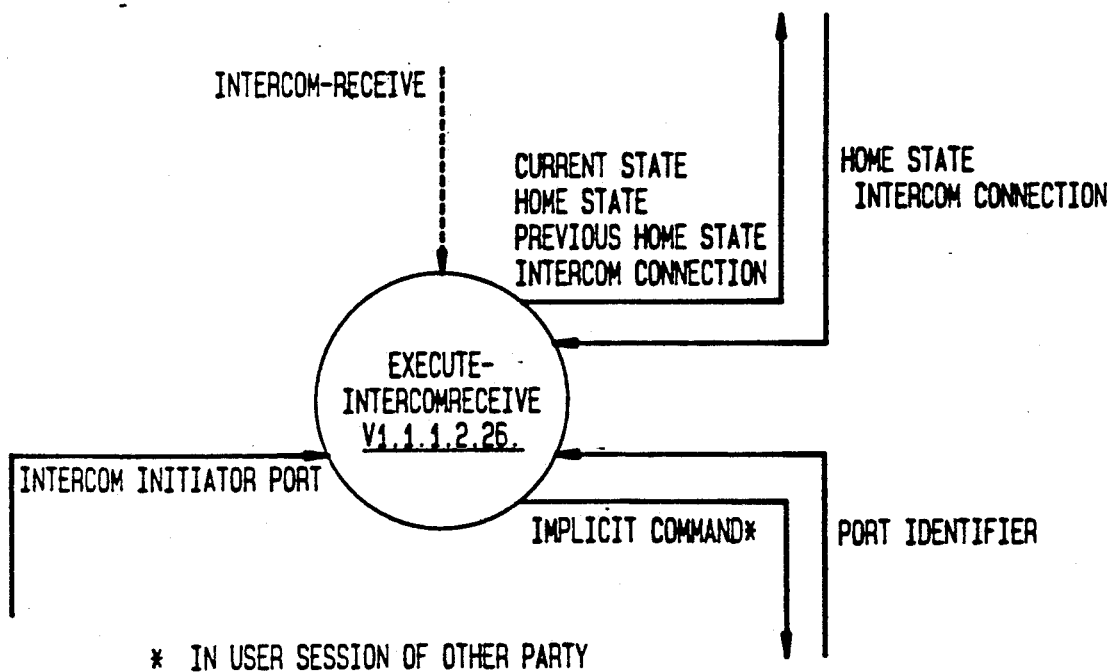

FIG. 59 shows executeIntercomReceive module V1.1.1.2.26 which is invoked by INTERCOM-RECEIVE. Its outputs are: Current State, Home State, Previous Home State, Intercom Connection, and Implicit Command*. Its inputs are: Intercom Initiator Port, Port Identifier, Home State and Intercom Connection. (*In user session of another user)

Figure 60:
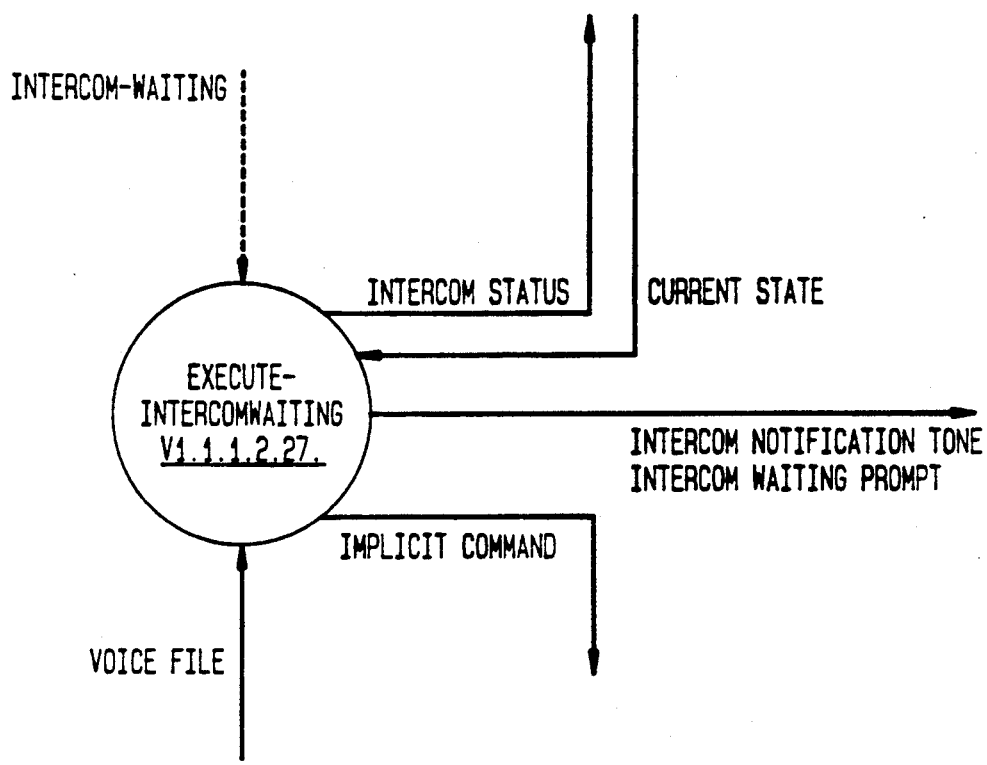

FIG. 60 shows executeIntercomWaiting module V1.1.1.2.27 which is invoked by INTERCOM-WAITING. Its outputs are: Intercom Status, Implicit Command, INTERCOM NOTIFICATION TONE, and Intercom Waiting Prompt. Its inputs are Current State and Voice File.

Figure 61:
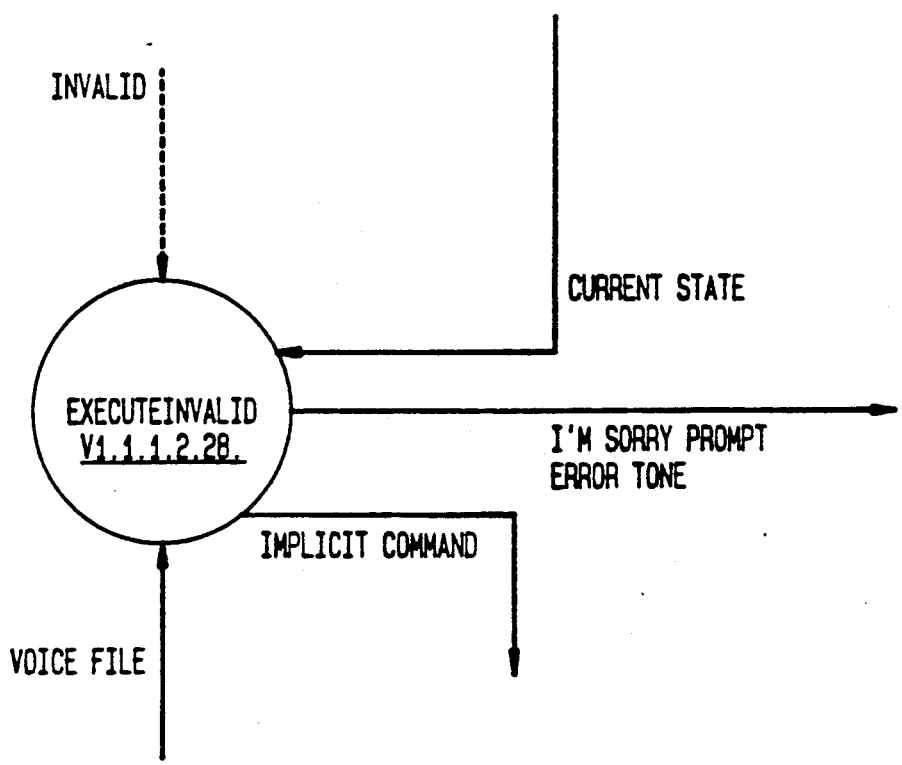

FIG. 61 shows executeInvalid module V1.1.1.2.28 which is invoked by INVALID. Its outputs are Implicit Command, I'm Sorry Prompt, and ERROR TONE. Its inputs are Current State and Voice File.

Figure 62:
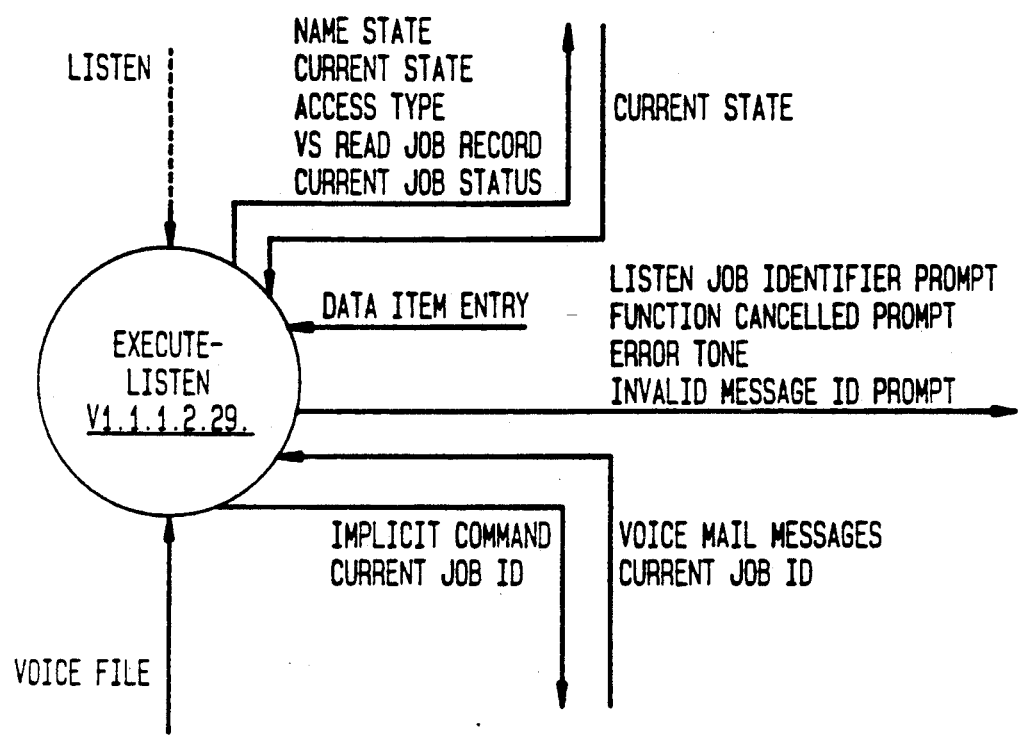

FIG. 62 shows executeListen module V1.1.1.2.29 which is invoked by LISTEN. Its outputs are: Home State, Current State, Access Type, VS Read Job Record, Current Job Status, Implicit Command, Current Job ID, Listen Job Identifier Prompt, Function Cancelled Prompt, ERROR TONE and Invalid Message ID Prompt. Its inputs are: Voice File, Voice Mail Messages, Current Job ID, Data Item Entry and Current State.

Figure 63:
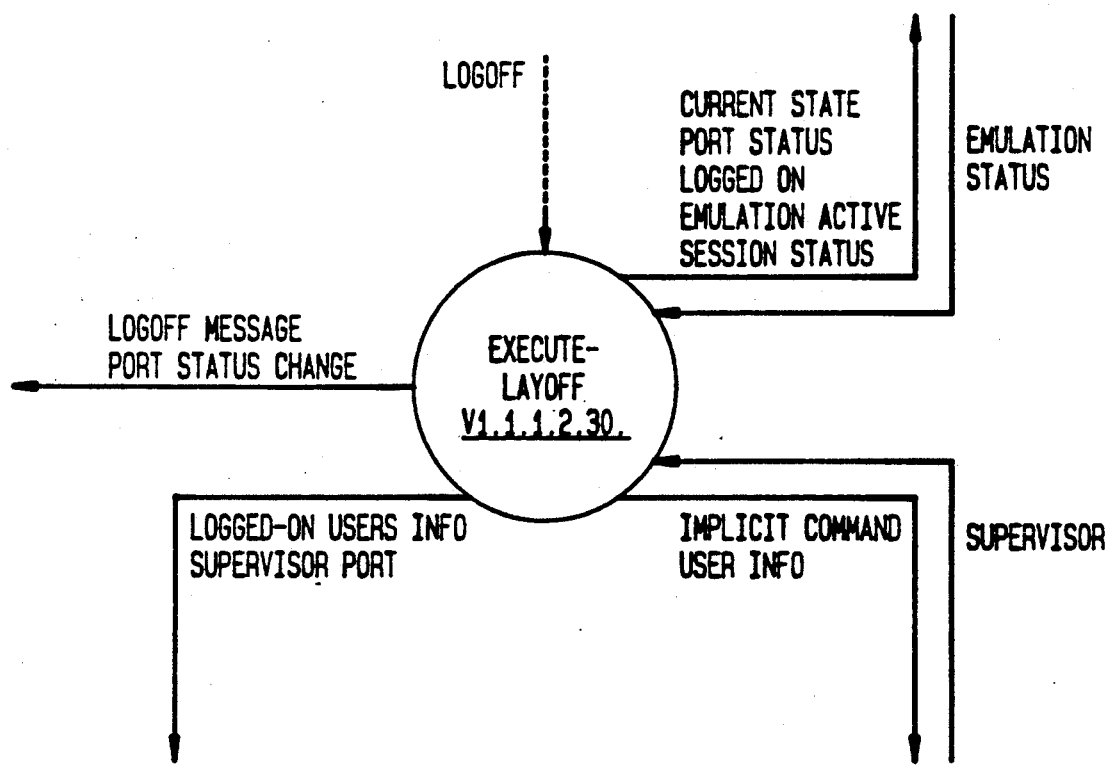

FIG. 63 shows executelog-off module V1.1.1.2.30 which is invoked by log-off. Its outputs are: Current State, Port Status, Logged On, Emulation Active, Session Status, log-off Message, Port Status Change, Logged On User Info, Supervisor Port, Implicit Command, and User Info. Its inputs are Supervisor and Emulation Status.

Figure 64:
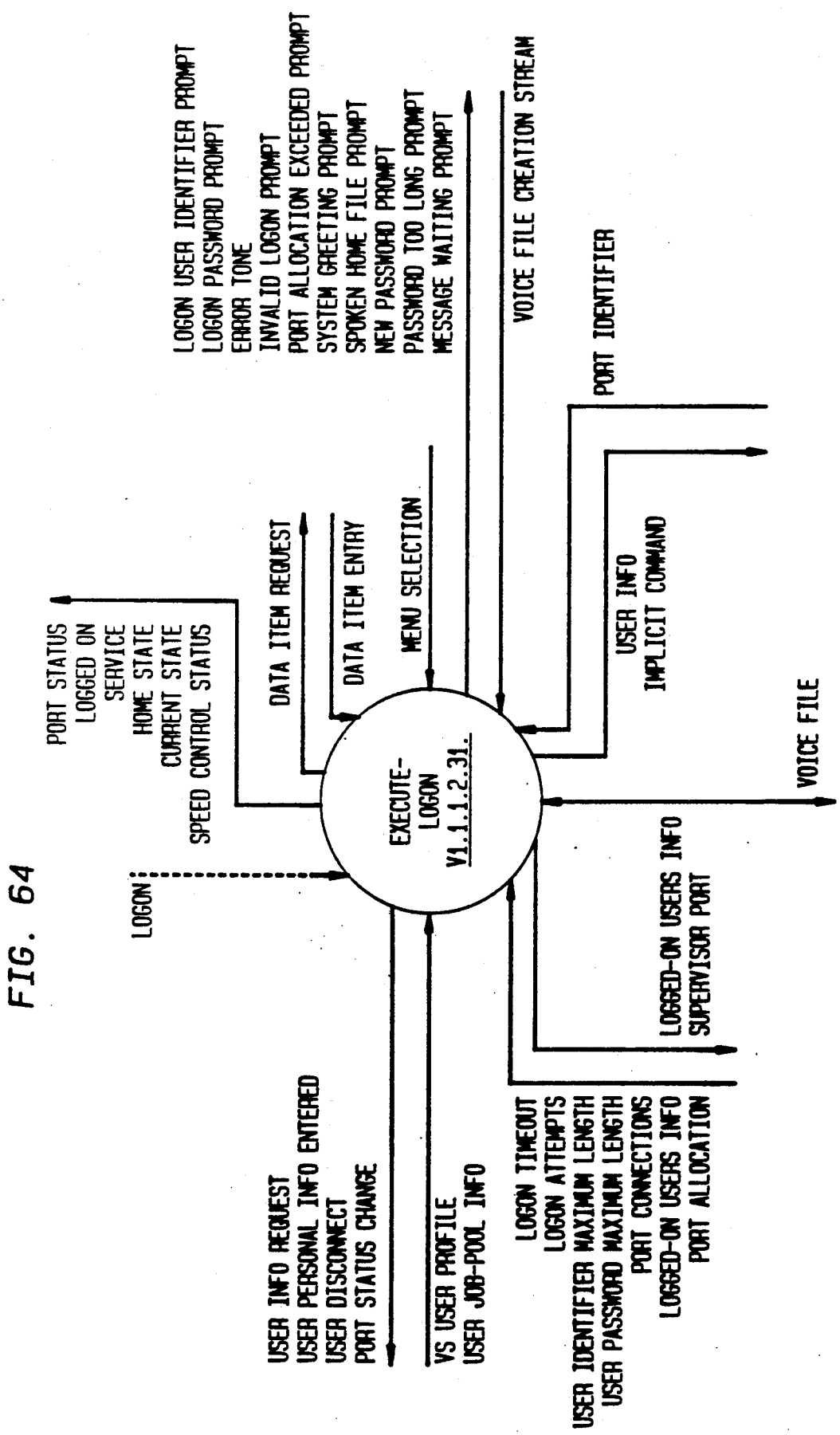

FIG. 64 shows executeLog-on module V1.1.1.2.31 which is invoked by LOG-ON. Its outputs are: Port Status, Logged On, Service, Home State, Current State, Speed Control Status, User Info Request, User Personal Info Entered, User Disconnect, Port Status Change, Logged On Users Info, Supervisor Port, Voice File, User Info, Implicit Command, Log On User Identifier Prompt, Log On Password Prompt, ERROR TONE, Invalid Log On Prompt, Port Allocation Exceeded Prompt, System Greeting Prompt, Spoken Name File Prompt, New Password Prompt, Password Too Long Prompt, Message Waiting Prompt, and Data Item Request. Its inputs are: VS User Profile, User Job Pool Info, Log On Timeout, Log On Attempts, User Identifier Maximum Length, User Password Maximum Length, Port Connections, Logged On Users Info, Port Allocation, Voice File, Port Identifier, Voice File Creation Stream, Menu Selection, and Data Item Entry.

Figure 65:
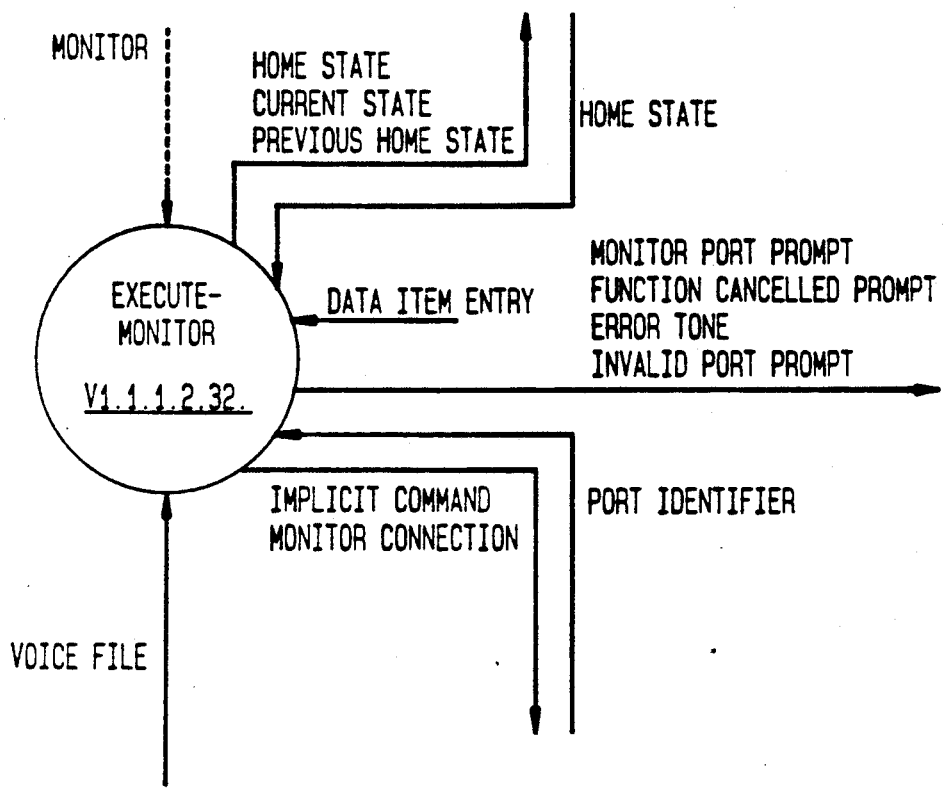

FIG. 65 shows executeMonitor module V1.1.1.2.32 which is invoked by MONITOR. Its outputs are: Home State, Current State, Previous Home State, Implicit Command, Monitor Connection, Monitor Port Prompt, Function Cancelled Prompt, ERROR TONE, and Invalid Port Prompt. Its inputs are: Home State, Voice File, Port Identifier, and Data Item Entry.

Figure 66:
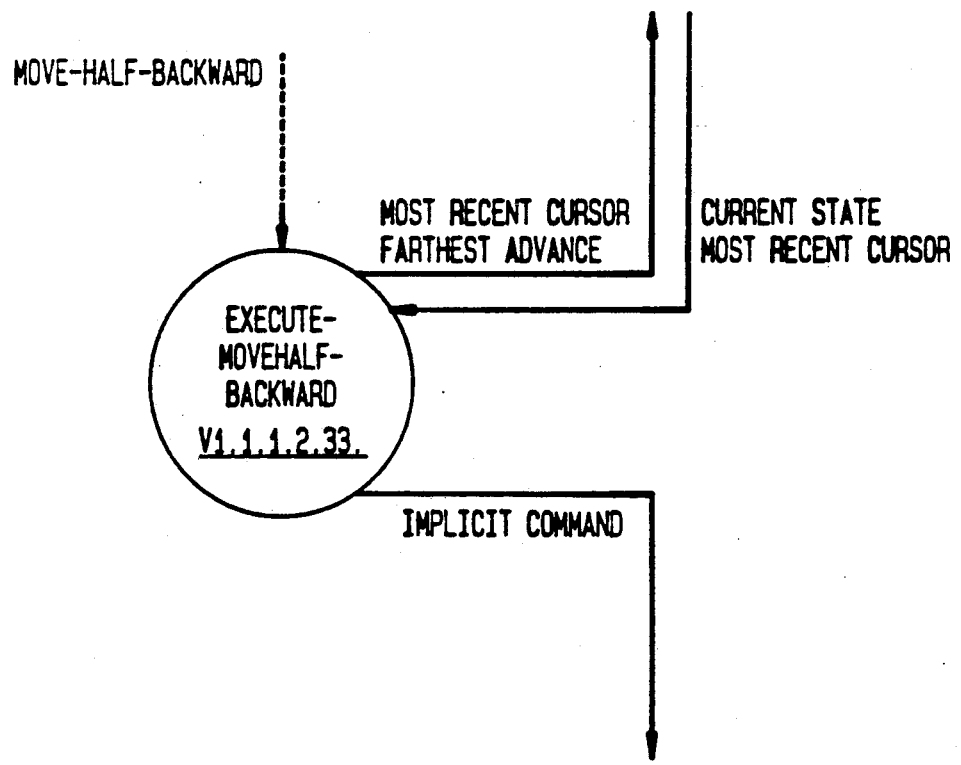

FIG. 66 shows executeMoveHalfBackward module V1.1.1.2.33 which is invoked by MOVE-HALF BACKWARD. Its outputs are Most Recent Cursor, Farthest Advance, and Implicit Command. Its inputs are Current State and Most Recent Cursor.

Figure 67:
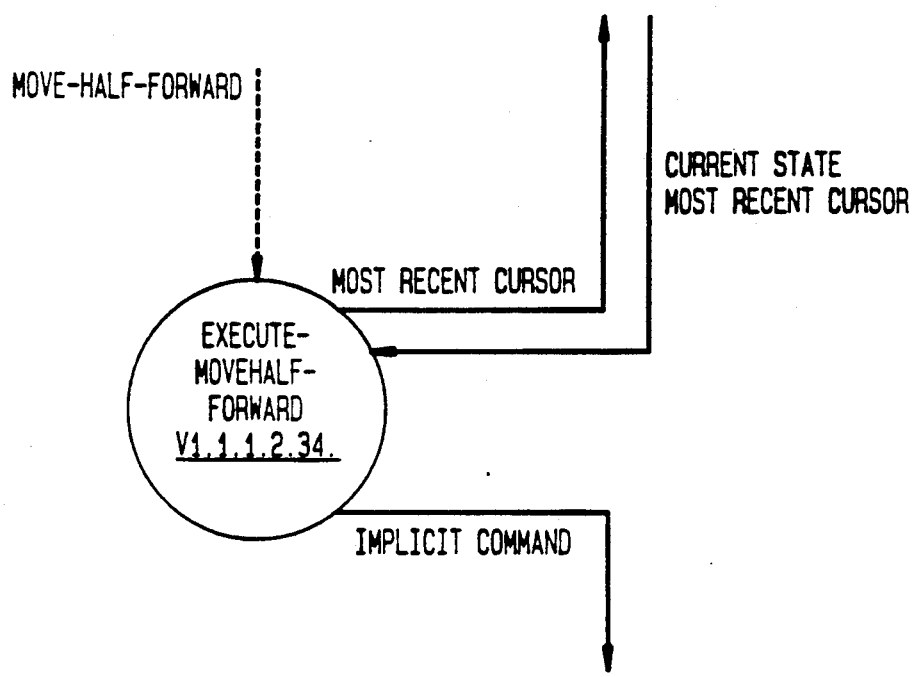

FIG. 67 shows executeMoveHalfForward module V1.1.1.2.34 which is invoked by MOVE-HALF-FORWARD. Its outputs are Most Recent Cursor and Implicit Command. Its inputs are Current State and Most Recent Cursor.

Figure 68:
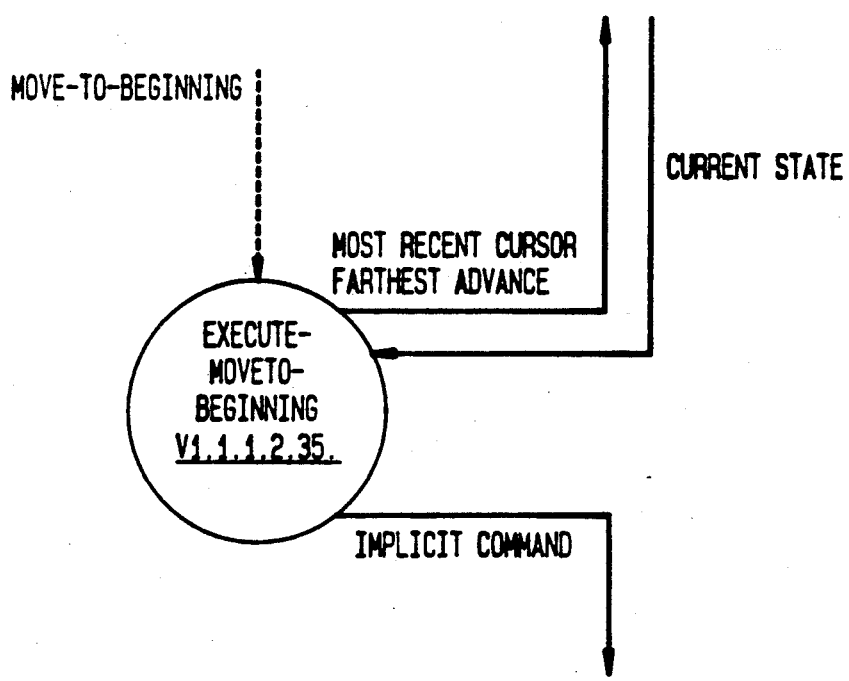

FIG. 68 shows executeMoveToBeginning module V1.1.1.2.35 which is invoked by MOVE-TO-BEGINNING. Its outputs are Most Recent Cursor, Farthest Advance, and Implicit Command. Its inputs is Current State.

Figure 69:
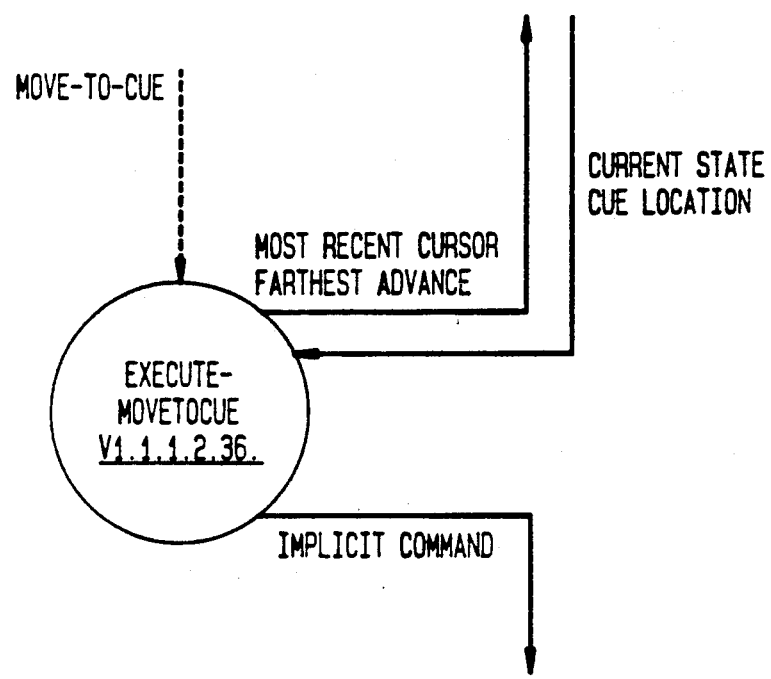

FIG. 69 shows executeMoveToCue module V1.1.1.2.36 which is invoked by MOVE-TO-CUE. Its outputs are Most Recent Cursor, Farthest Advance and Implicit Command. Its inputs are Current State and Cue Location.

Figure 70:
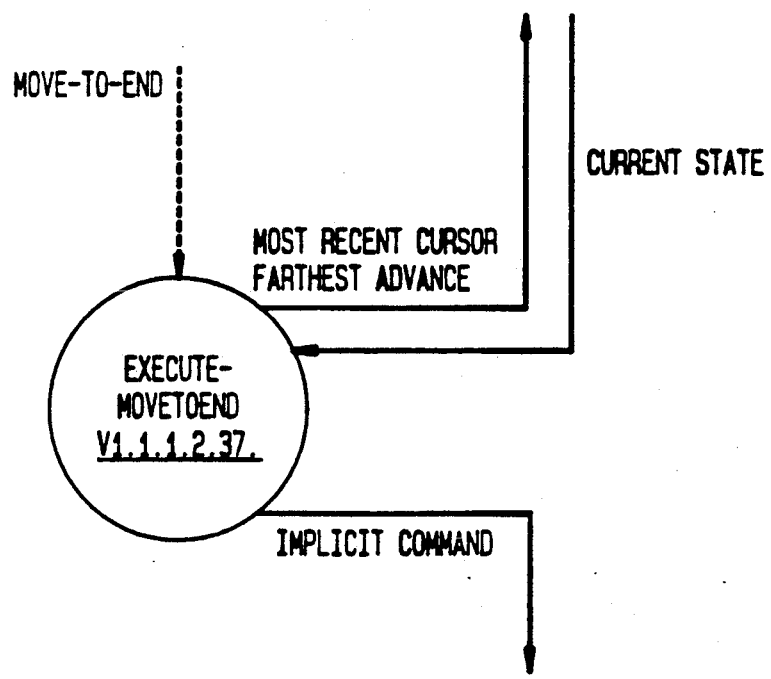

FIG. 70 shows executeMoveToEnd module V1.1.1.2.37 which is invoked by MOVE-TO-END. Its outputs are Most Recent Cursor, Farthest Advance, and Implicit Command. Its input is Current State.

Figure 71:
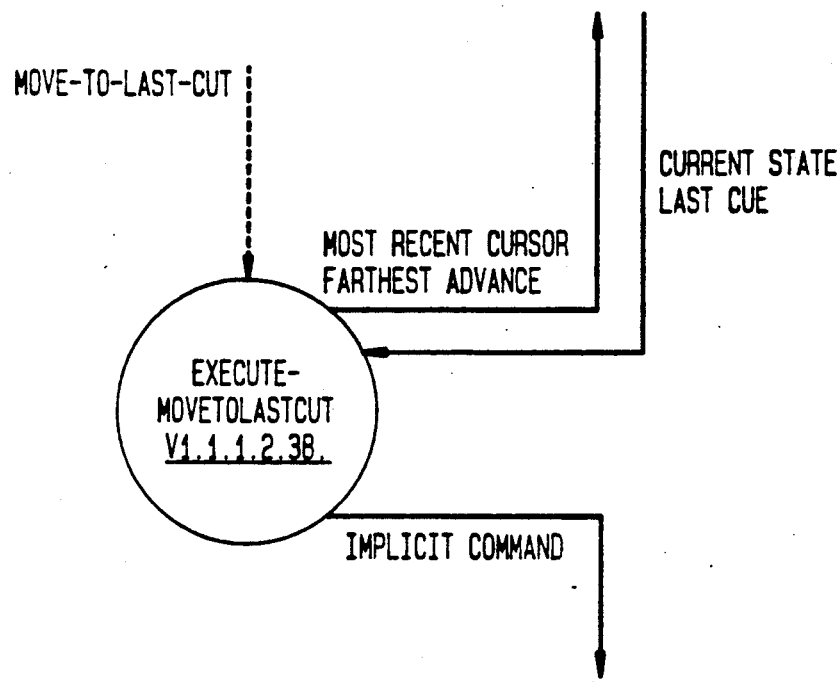

FIG. 71 shows executeMoveToLastCut module V1.1.1.2.38 which is invoked by MOVE-TO-LAST-CUT. Its outputs are Most Recent Cursor, Farthest Advance and Implicit Command. Its inputs are Current State and Last Cut.

Figure 72:
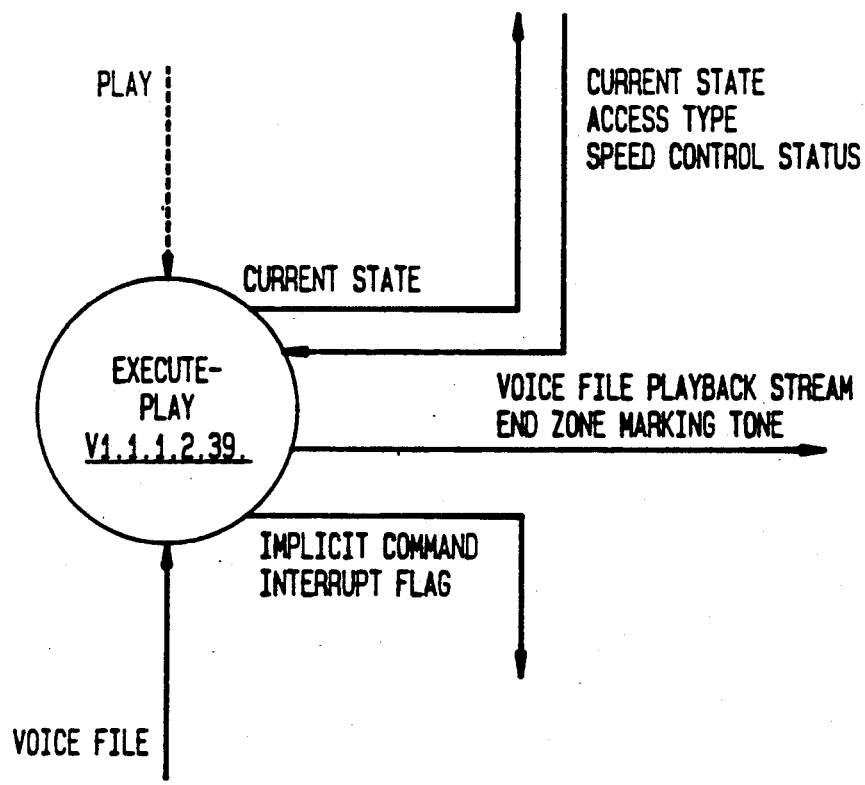

FIG. 72 shows executePlay module V1.1.1.2.39 which is invoked by PLAY. Its outputs are Current State, Implicit Command, Interrupt Flag, Voice File Playback Stream, and End Zone Warning Tone. Its inputs are Current State, Access Type, Speed Control Status, and Voice File.

Figure 73:
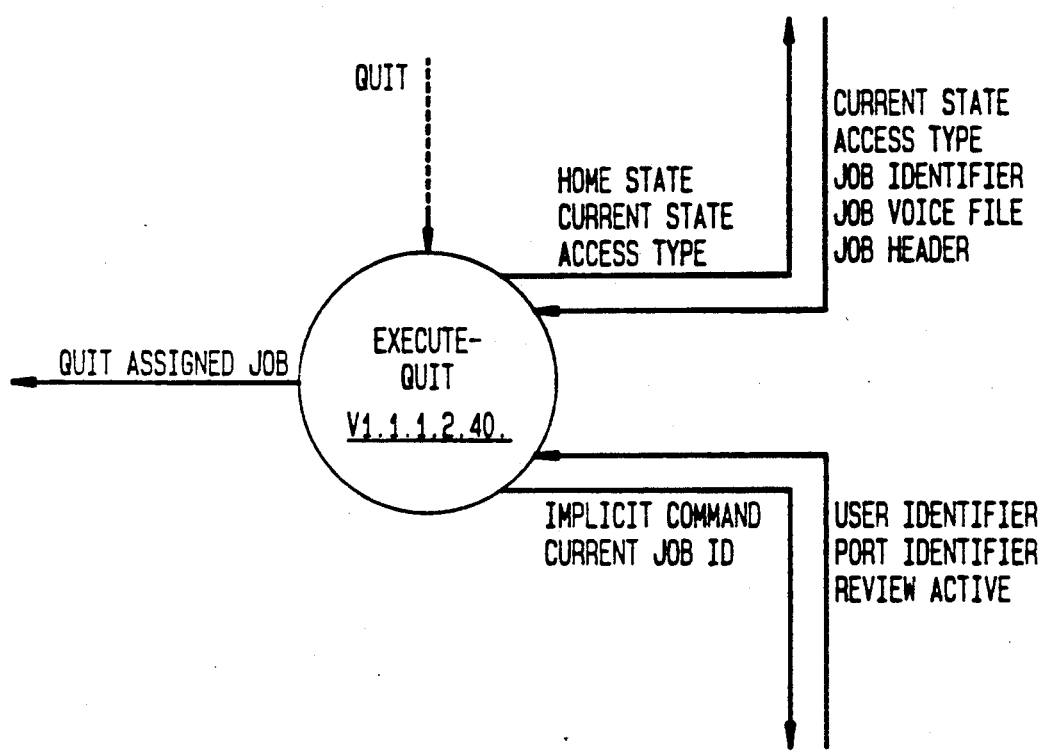

FIG. 73 shows executeQuit module V1.1.1.2.40 which is invoked by QUIT. Its outputs are: Home State, Current State, Access Type, Quit Assigned Job, Implicit Command, and Current Job ID. Its inputs are: Current State, Access Type, Job Identifier, Job Voice File, Job Header, User Identifier, Port Identifier, and Review Active.

Figure 74:
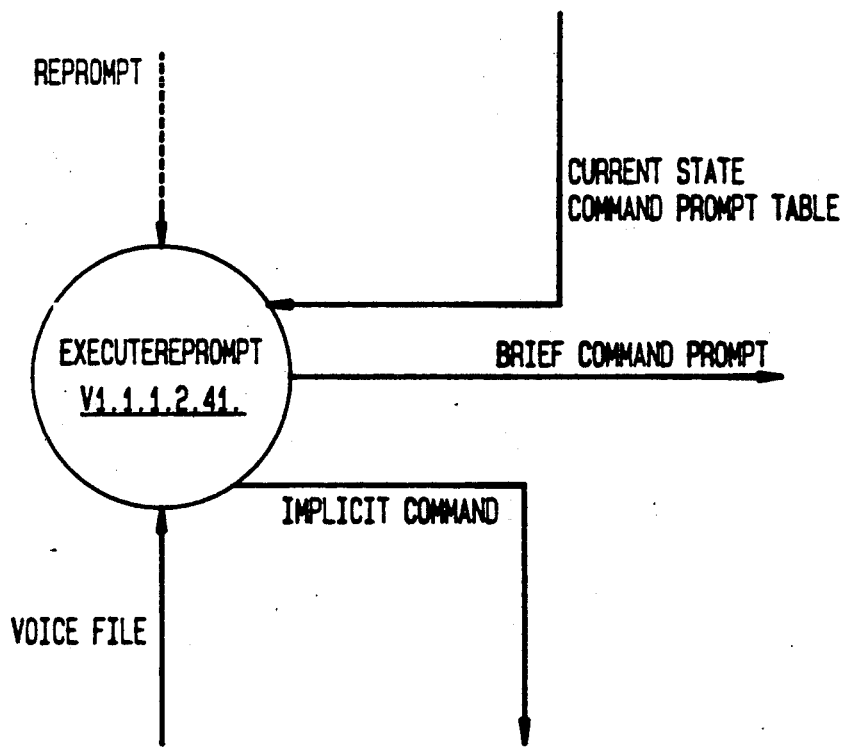

FIG. 74 shows executeReprompt module V1.1.1.2.41 which is invoked by REPROMPT. Its outputs are Implicit Command and Brief Command Prompt. Its inputs are Current State, Command Prompt Table, and Voice File.

Figure 75:
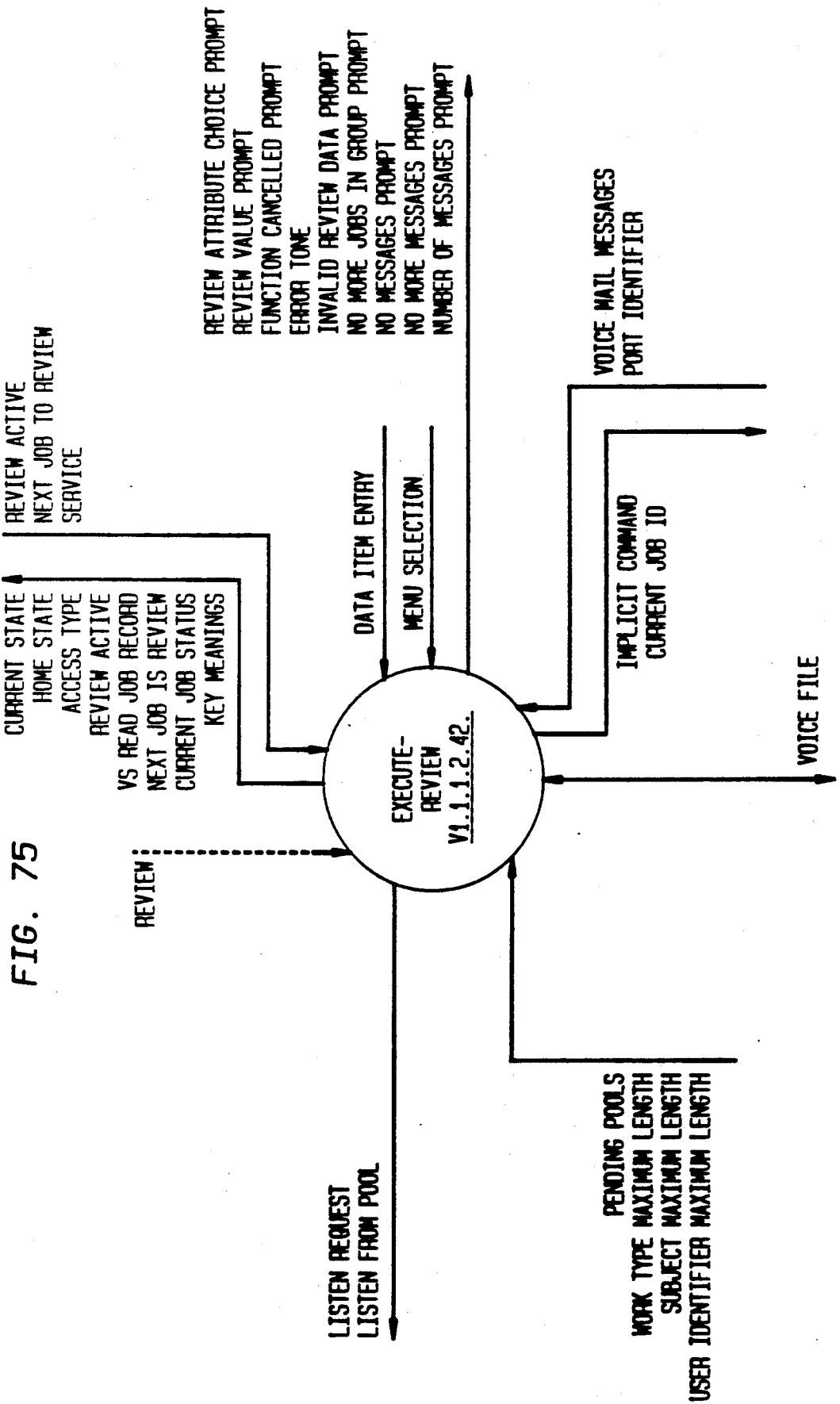

FIG. 75 shows executeReview module V1.1.1.2.42 which is invoked by REVIEW. Its outputs are: Current State, Home State, Access Type, Review Active, VS Read Job Record, Next Job To Review, Current Job Status, Key Meanings, Listen Request, Listen From Pool, Implicit Command, Current Job ID, Review Attribute Choice Prompt, Review Value Prompt, Function Cancelled Prompt, ERROR TONE, Invalid Review Data Prompt, No More Jobs In Group Prompt, No Messages Prompt, No More Messages Prompt, and Number of Messages Prompt. Its inputs are: Pending Pools, Work Type Maximum Length, Subject Maximum Length, User Identifier Maximum Length, Voice File, Voice Mail Messages, Port Identifier, Menu Selection, Data Item Entry, Review Active, Next Job To Review, and Service.

Figure 76:
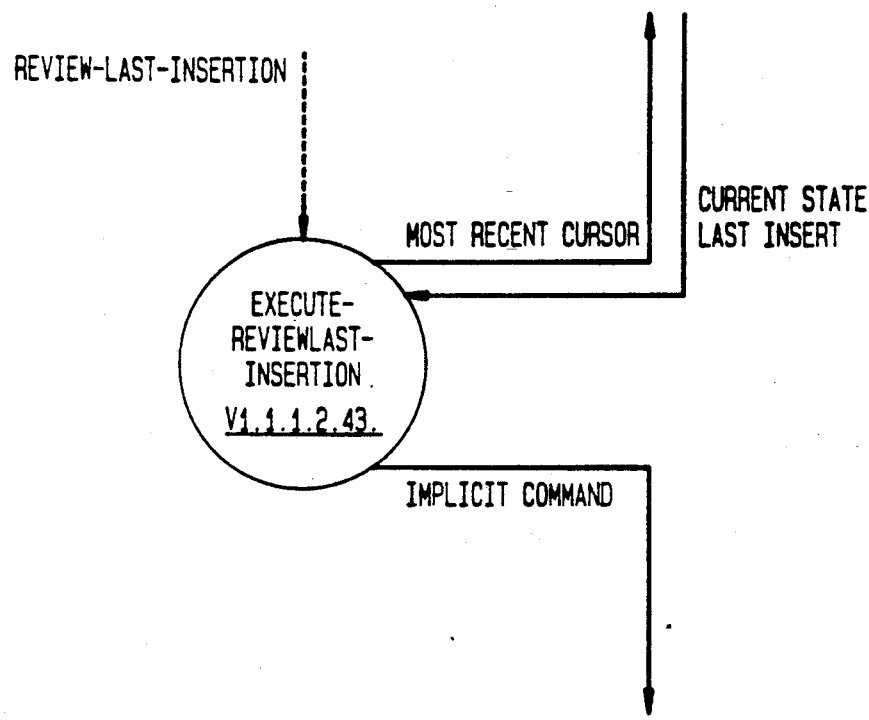

FIG. 76 shows executeReviewLastInsertion module V1.1.1.2.43 which is invoked by REVIEW-LAST-INSERTION. Its outputs are Most Recent Cursor and Implicit Command. Its inputs are Current State and Last Insert.

Figure 77:
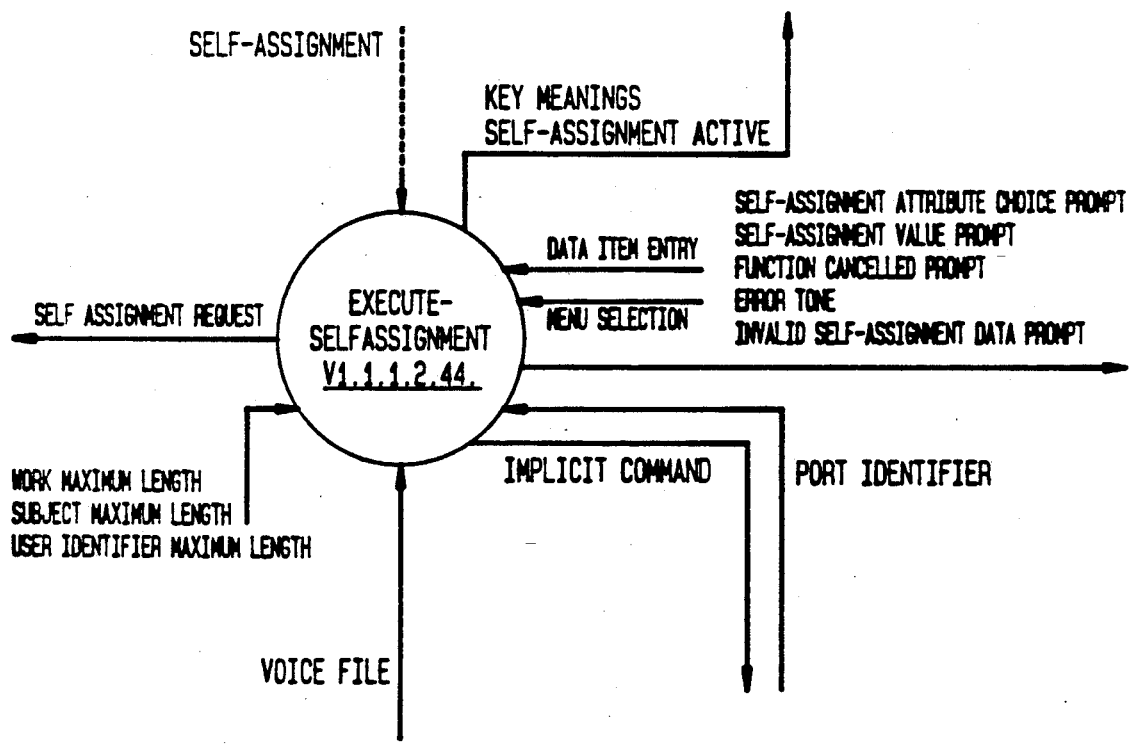

FIG. 77 shows executeSelfAssignment module V1.1.1.2.44 which is invoked by SELF-ASSIGNMENT. Its outputs are: Key Meanings, Self-Assignment Active, Self Assignment Request, Implicit Command, Self-Assignment Attribute Choice Prompt, Self-Assignment Value Prompt, Function Cancelled Prompt, ERROR TONE, and Invalid Self-Assignment Data Prompt. Its inputs are: Work Type maximum Length, Subject Maximum Length, User Identifier Maximum Length, Voice File, Port Identifier, Menu Selection and Data Item Entry.

Figure 78:
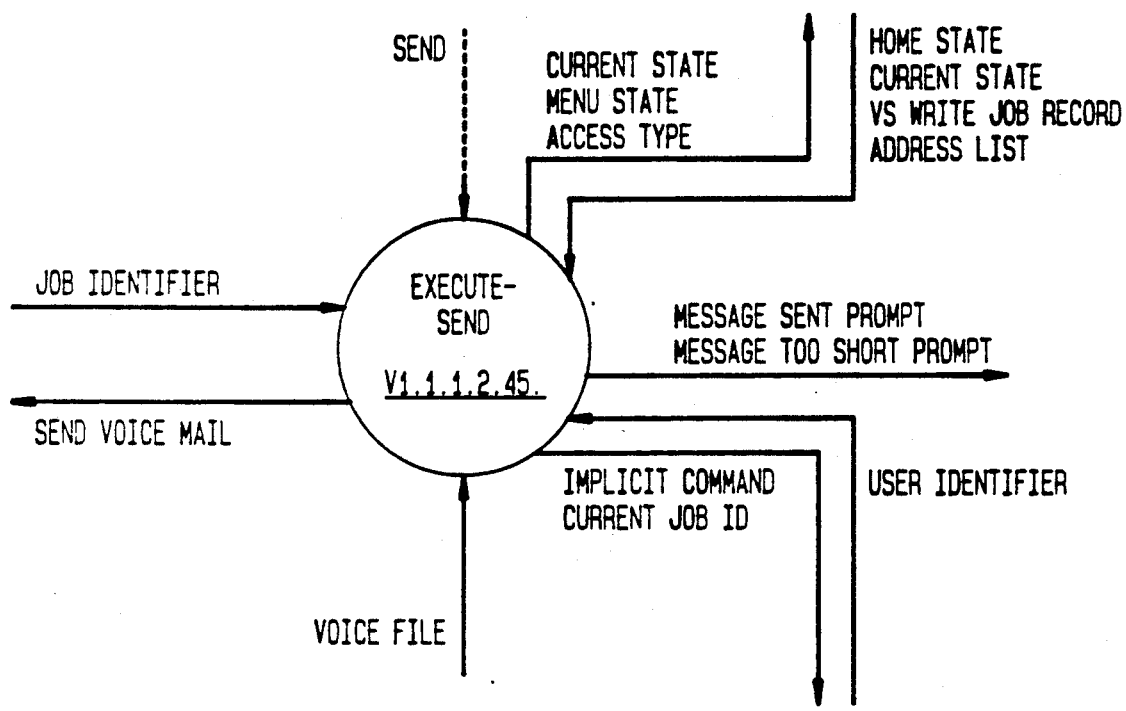

FIG. 78 shows executeSend module V1.1.1.2.45 which is invoked by SEND. Its outputs are: Current State, Home State, Access Type, Send Voice Mail, Implicit Command, Current Job ID, Message Sent Prompt, and Message Too Short Prompt. Its inputs are: Home State, Current State, VS Write Job Record, Address List, Job Identifier, Voice File and User Identifier.

Figure 79:
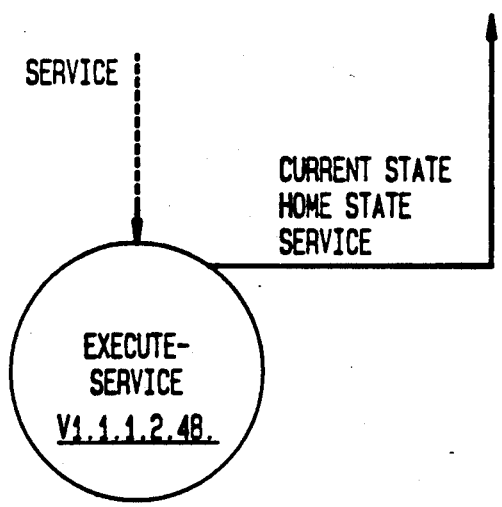

FIG. 79 shows executeService module V1.1.1.2.46 which is invoked by SERVICE. Its outputs are Current State, Home State and Service.

Figure 80:
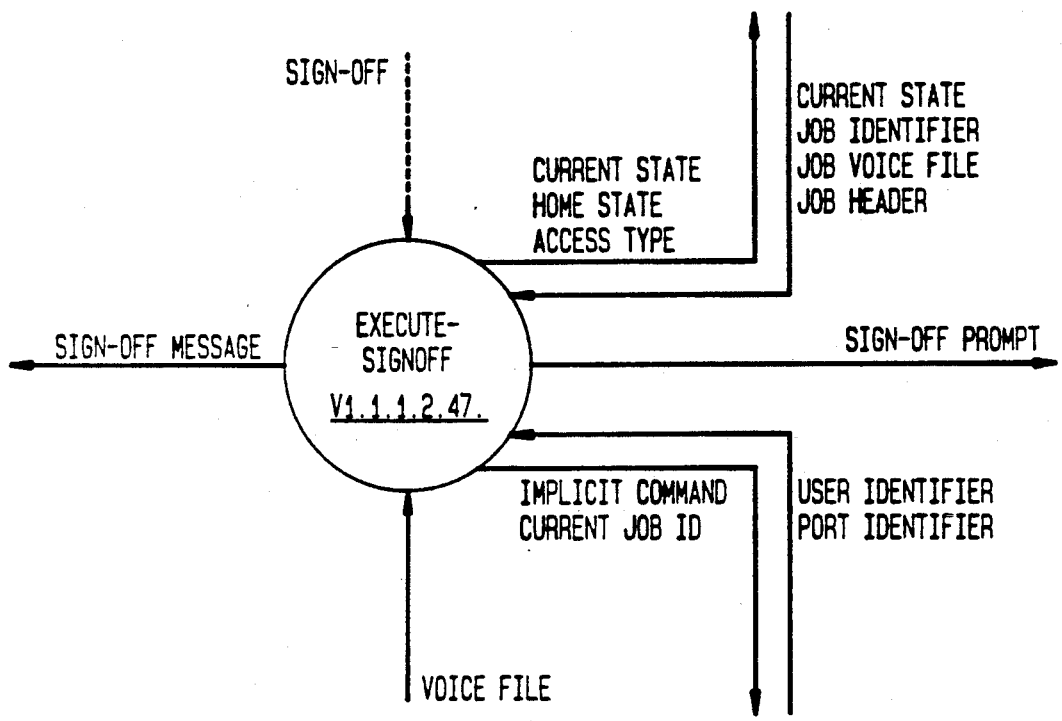

FIG. 80 shows executeSignOff module V1.1.1.2.47 which is invoked by SIGN-OFF. Its outputs are: Current State, Home State, Access Type, Signoff Message, Implicit Command, Current Job ID, and Sign-Off Prompt. Its inputs are: Voice File, User Identifier, Port Identifier, Current Job State, Job Identifier, Job Voice File, and Job Header.

Figure 81:
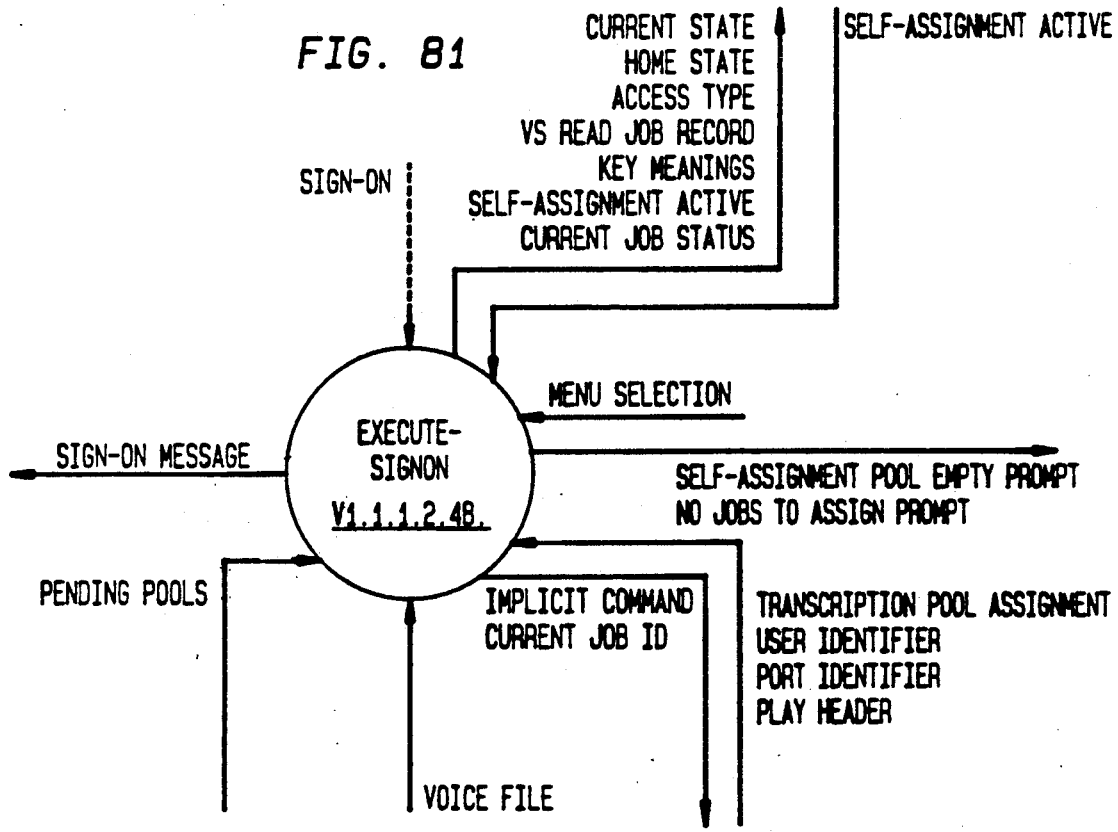

FIG. 81 shows executeSignOn module V1.1.1.2.48 which is invoked by SIGN-ON. Its outputs are: Current State, Home State, Access Type, VS Job Read Record, Key Meanings, SelfAssignment Active, Current Job Status, Sign-On Message, Implicit Command, Current Job ID, Self Assignment Pool Empty Prompt, and No Jobs to Assign Prompt. Its inputs are: Pending Pools, Voice File, Transcription Pool Assignment, User Identifier, Port Identifier, Play Header, Menu Selection, and Self-Assignment Active.

Figure 82:
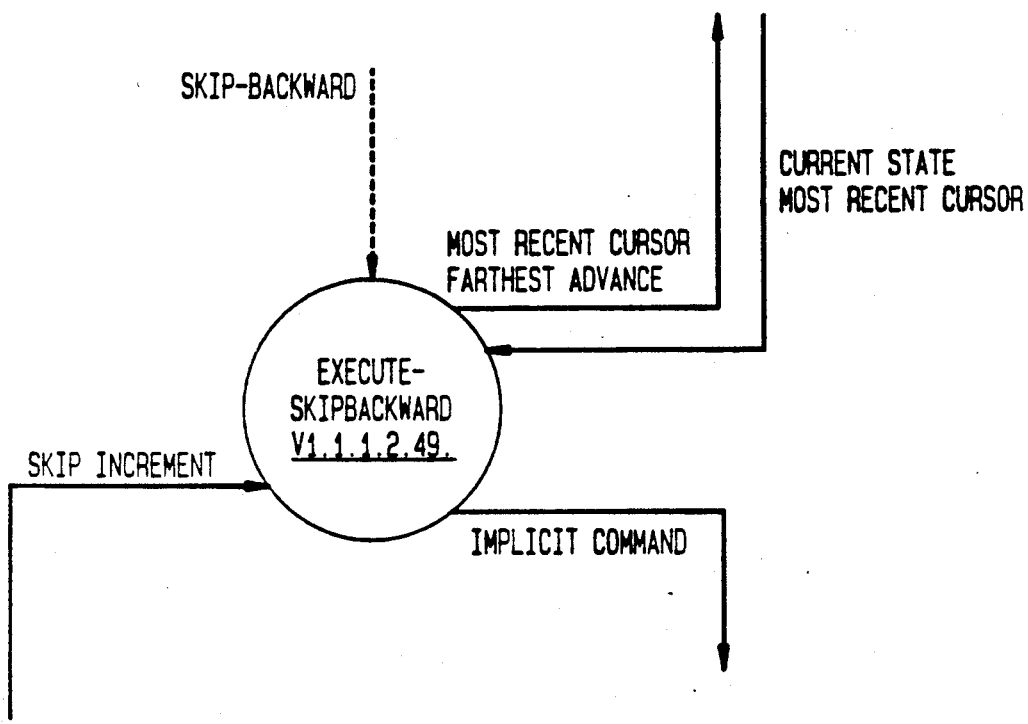

FIG. 82 shows executeSkipBackward module V1.1.1.2.49 which is invoked by SKIP-BACKWARD. Its outputs are Most Recent Cursor, Farthest Advance, and Implicit Command. Its imputs are Current State, Most Recent Cursor and Skip Increment.

Figure 83:
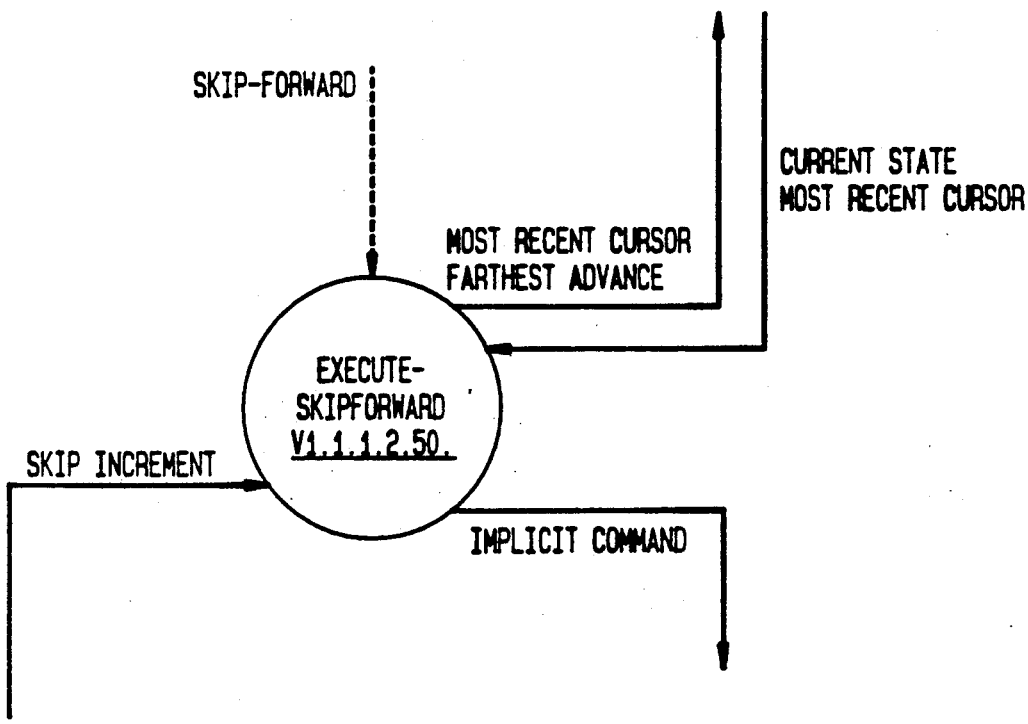

FIG. 83 shows executeSkipForward module V1.1.1.2.50 which is invoked by SKIP-FORWARD. Its outputs are: Most Recent Cursor, Farthest Advance, Skip Increment, and Implicit Command. Its inputs are Current State and Most Recent Cursor.

Figure 84:
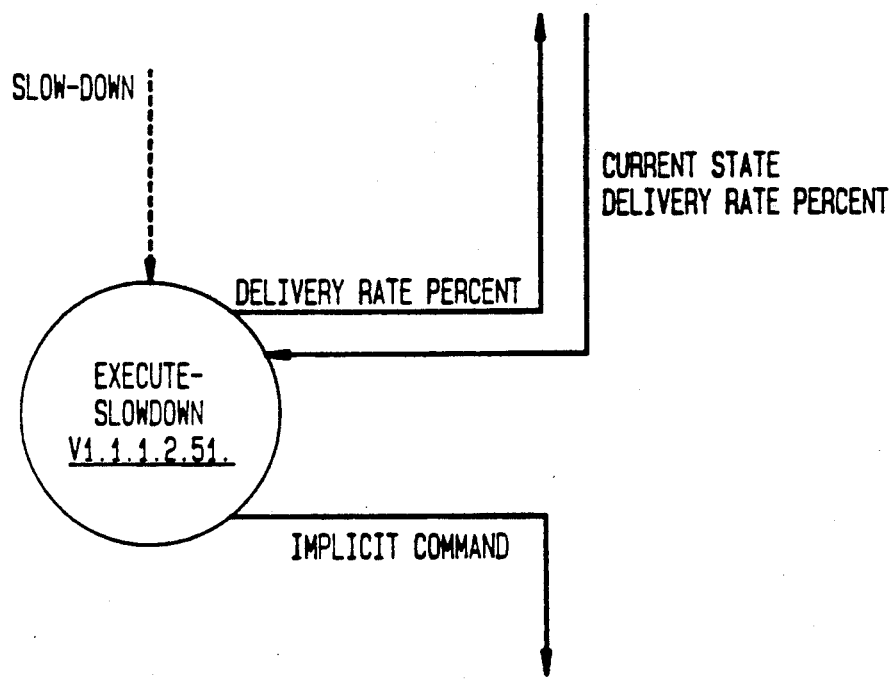

FIG. 84 shows executeSlowDown module V1.1.1.2.51 which is invoked by SLOW DOWN. Its outputs are Delivery Rate Percent and Implicit Command. Its inputs are Current State and Delivery Rate Percent.

Figure 85:
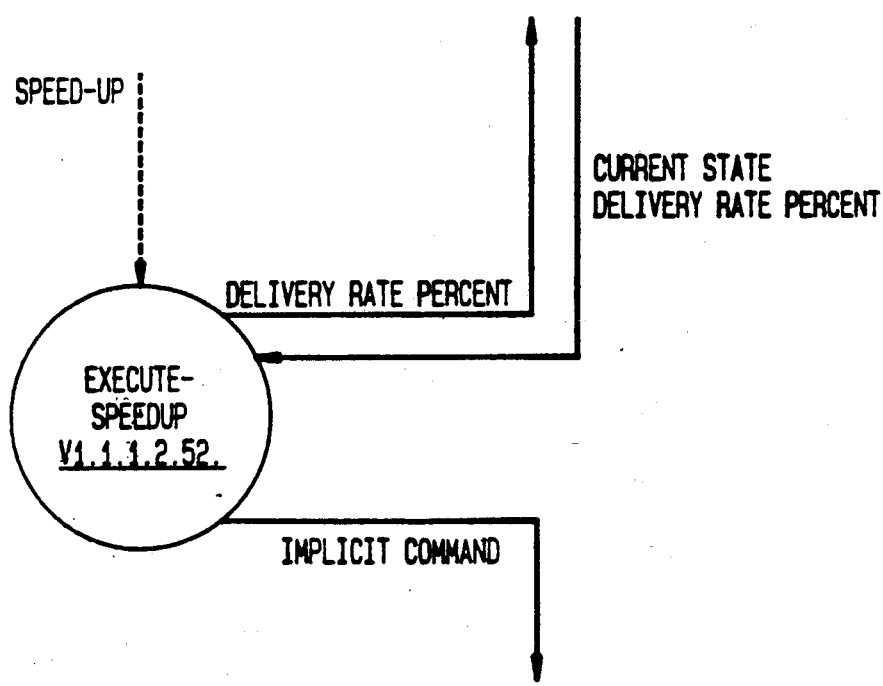

FIG. 85 shows executeSpeedUp module V1.1.1.2.52 which is invoked by SPEED UP. Its outputs are Delivery Rate Percent and Implicit Commnd. Its inputs are Current State and Delivery Rate Percent.

Figure 86:
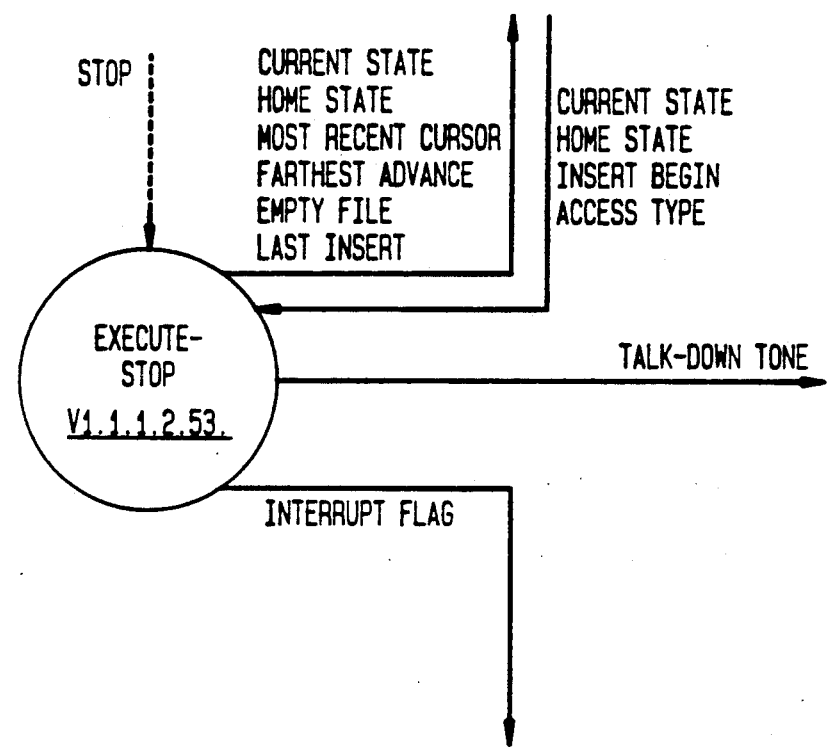

FIG. 86 shows executeStop module V1.1.1.2.53 which is invoked by STOP. Its outputs are: Current State, Home State, Most Recent Cursor, Farthest Advance, Empty File, Last Insert, Interrupt Flag, and TALK-DOWN TONE. Its inputs are: Current State, Home State, Insert Begin and Access Type.

Figure 87:
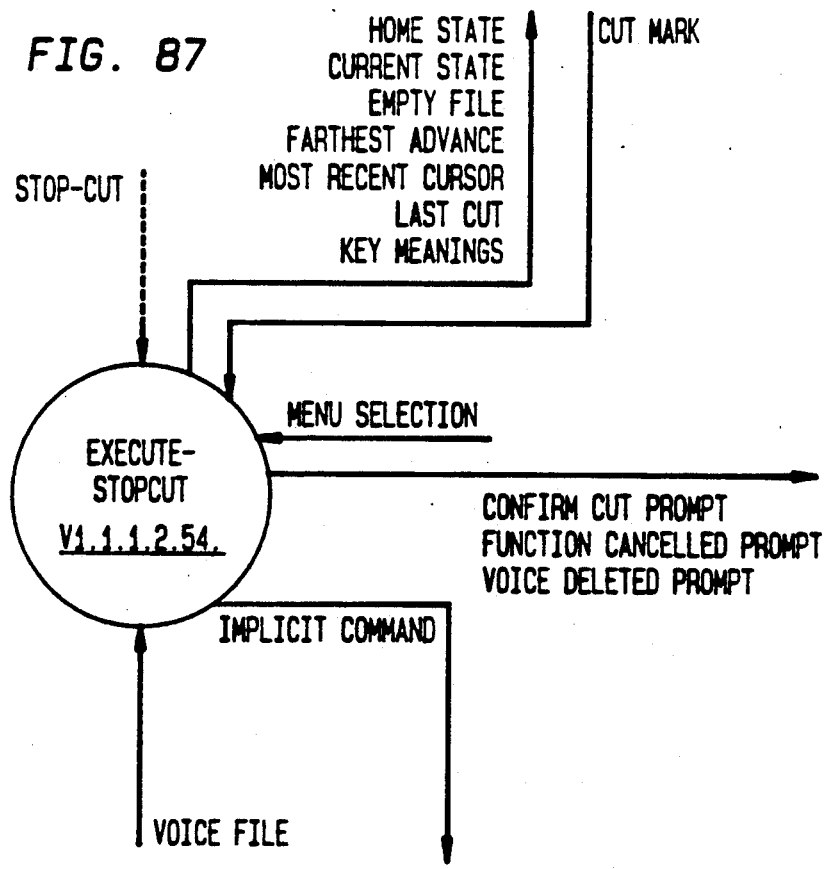

FIG. 87 shows executeStopCut module V1.1.1.2.54 which is invoked by STOP-CUT. Its outputs are: Home State, Current State, Empty File, Farthest Advanced, Most Recent Cursor, Last Cut, Key Meanings, Implicit Command, Confirm Cut Prompt, Function Cancel Prompt, Voice Deleted Prompt. Its inputs are Voice File, Menu Selection and Cut Mark.

FIG. 88 shows executeVoiceMail module V1.1.1.2.55. Its outputs are: Service, Home State, Current State, Logged-On Users Info and Implicit Command. Its input is Current State.

The above descriptions of preferred embodiments have been given by way of illustration only and numerous other embodiments of the subject invention may become apparent to those skilled in the art upon consideration of the above description and the attached drawings. Accordingly, limitations on the scope of the subject invention are to be found only in the claims set forth below.

What is claimed is:

1. A method for storing and retrieving Voice Files in a system, comprising the steps of:
   a) inputting log-on signals;
   b) designating users as dictator or transcriptionists in accordance with said log-on signals;
   c) inputting and storing said Voice Files;
   d) inputting control signals associated with said Voice Files;
   e) designating at least some of said Voice Files as either Dictation Jobs or as Voice Mail Messages in accordance with said control signals;
   f) associating an address list with each of said Voice Mail Messages;
   g) retrieving and outputting said Dictation Jobs for transcription by said transcriptionists;
   h) inputting control signals designating an addressee on said associated address list and outputting said Voice Mail Messages to said designated addressee.

2. A method as described in claim 1 wherein said system comprises Supervisory input output means for providing access to a Supervisor monitoring the operation of said system and controlling the allocation of said system's resources through said Supervisory input-output means.

3. A method as described in claim 2 comprising the further preliminary step of selecting in accordance with signals input through said Supervisory input output means particular users of said system to have the capability of inputting or receiving Voice Mail Messages.

4. A method as described in claim 1 comprising the further step of inputting a hardcopy control signal associated with an input Voice File, said system responding to said hardcopy control signal to treat said associated input Voice File as both a Voice Mail Message and a Dictation Job.

5. A method as described in claim 3 comprising the further step of inputting a hardcopy control signal associated with an input Voice File, said system responding to said hardcopy control signal to treat said associated input Voice File as both a Voice Mail Message and a Dictation Job.

6. A method as described in claim 5 wherein said hardcopy control signal is input by one of said particular users who is inputting said associated input Voice File.

7. A method as described in claim 5 wherein said hardcopy control signal is input by one of said particular users who is receiving said associated input Voice File as a Voice Mail Message.

8. A method as described in claim 1 comprising the further steps of:

a) responding to said log-on signals input by at least certain of said dictators to allow said certain dictators to designate certain of said Voice Files as either Dictation Jobs or as Voice Mail Messages; and, b) responding to said long-on signals input by at least certain of said transcriptionists to output one of said stored Dictation Jobs for transcription.

9. A method as described in claim 5 comprising the further steps of:

a) responding to log-on signals input by said selected particular users to allow said particular users to designate certain of said Voice Files as either Dictation Jobs or as Voice Mail Messages; and, b) responding to said log-on signals input by at least certain of said transcriptionists to output one of said stored Dictation Jobs for transcription.

10. A method as described in claim 9 comprising the further step of responding to a hardcopy control signal input by one of said particular users who is inputting an associated Voice File to treat said associated input Voice File as both a Dictation Job and as a Voice Mail Message.

11. A method as described in claim 8 comprising the further step of responding to a hardcopy control signal input by a particular user who is receiving an associated Voice Mail Message to treat said associated Voice Mail Message both a Dictation Job and Voice Mail Message.

* * * * *